US011872583B2

(12) United States Patent
Strykowski et al.

(10) Patent No.: US 11,872,583 B2
(45) Date of Patent: Jan. 16, 2024

(54) COUNTERFLOW MIXER AND ATOMIZER

(71) Applicant: Regents of the University of Minnesota, Minneapolis, MN (US)

(72) Inventors: Paul John Strykowski, Plymouth, MN (US); Alison Hoxie, Duluth, MN (US); Vinod Srinivasan, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 400 days.

(21) Appl. No.: 16/973,926

(22) PCT Filed: Jun. 13, 2019

(86) PCT No.: PCT/US2019/036926
§ 371 (c)(1),
(2) Date: Dec. 10, 2020

(87) PCT Pub. No.: WO2019/241488
PCT Pub. Date: Dec. 19, 2019

(65) Prior Publication Data

US 2021/0268526 A1 Sep. 2, 2021

Related U.S. Application Data

(60) Provisional application No. 62/684,969, filed on Jun. 14, 2018.

(51) Int. Cl.
*B05B 7/04* (2006.01)
*B05B 1/34* (2006.01)

(52) U.S. Cl.
CPC . *B05B 7/04* (2013.01); *B05B 1/34* (2013.01)

(58) Field of Classification Search
CPC .................................... B05B 7/04; B05B 1/34
USPC ............................ 239/8, 419, 424, 431, 433
See application file for complete search history.

(56) References Cited

U.S. PATENT DOCUMENTS

| | | | |
|---|---|---|---|
| 2,149,115 A | 11/1936 | De Foe et al. | |
| 3,685,743 A | 8/1972 | Sebastiani | |
| 4,526,322 A | 7/1985 | Voorheis | |
| 5,617,997 A * | 4/1997 | Kobayashi | F23D 11/106 239/8 |
| 5,692,678 A | 12/1997 | Ishibashi et al. | |
| 5,868,322 A | 2/1999 | Loucks, Jr. et al. | |
| 6,189,214 B1 | 2/2001 | Skeath et al. | |

(Continued)

FOREIGN PATENT DOCUMENTS

| | | |
|---|---|---|
| AU | 2003267884 A1 | 5/2003 |
| CN | 102272524 A1 | 12/2011 |

(Continued)

OTHER PUBLICATIONS

Ganan Calvo, "Enhanced liquid atomization: From flow-focusing to flow-blurring", Applied Physics Letters, 86, 214101 (2005) (4 pgs.).

(Continued)

*Primary Examiner* — Steven J Ganey
(74) *Attorney, Agent, or Firm* — Dicke, Billig & Czaja, PLLC

(57) ABSTRACT

A nozzle assembly including a primary tube and an outer housing, and configured to generate a counterflowing stream to break up another fluid into small droplets.

13 Claims, 39 Drawing Sheets

(56) References Cited

U.S. PATENT DOCUMENTS

| | | | |
|---|---|---|---|
| 6,382,526 B1 * | 5/2002 | Reneker ............... D01D 5/0985 239/424 |
| 8,028,934 B2 | 10/2011 | Wurz et al. |
| 8,201,351 B2 | 6/2012 | Ganan Calvo |
| 8,590,812 B2 | 11/2013 | Wurz |
| 8,967,496 B1 | 3/2015 | Blake |
| 9,981,229 B2 | 5/2018 | Matsunaga et al. |
| 2002/0191483 A1 | 12/2002 | Ohtsuki et al. |
| 2003/0122266 A1 | 7/2003 | Nau et al. |
| 2004/0222317 A1 | 11/2004 | Huffman |
| 2005/0172476 A1 | 8/2005 | Stone et al. |
| 2006/0169800 A1 | 8/2006 | Rosell et al. |
| 2008/0271350 A1 | 11/2008 | Ganan Calvo |
| 2009/0166448 A1 | 7/2009 | Wurz et al. |
| 2011/0045425 A1 | 2/2011 | Agrawal et al. |
| 2013/0319301 A1 | 12/2013 | Okazaki et al. |
| 2018/0320085 A1 | 11/2018 | Brosten et al. |

FOREIGN PATENT DOCUMENTS

| | | | |
|---|---|---|---|
| CN | 104768638 A | 7/2015 |
| EP | 1252679 B1 | 4/2004 |
| GB | 2298808 A | 9/1996 |
| GB | 201516795 | 9/2015 |
| JP | H08173781 A | 7/1996 |
| JP | 2002306938 A | 10/2002 |
| JP | 2012145026 A | 8/2012 |
| JP | 2013081924 A | 5/2013 |
| JP | 2015202437 A | 11/2015 |
| JP | 2016501706 A | 1/2016 |
| KR | 950003165 U | 2/1995 |
| RU | 2652707 C1 | 4/2018 |
| WO | 00/76673 A1 | 12/2000 |
| WO | 0202210 A1 | 1/2002 |
| WO | 03/095097 A1 | 11/2003 |
| WO | 2005/018817 A2 | 3/2005 |
| WO | 2014064109 A1 | 5/2014 |
| WO | 2017/040314 A1 | 3/2017 |

OTHER PUBLICATIONS

K. Merkle et al., "Effect of co- and counter-swirl on the isothermal flow- and mixture-field of an airblast atomizer nozzle", International Journal of Heat and Fluid Flow, 24(4):529-537, Aug. 2003 (9 pgs.).

S. Sadik et al., "On the mechanism of spray formation from liquid jets", Journal of Colloid and Interface Science, 259 (2003) 261-274 (14 pgs.).

Search Report and Written Opinion for International Application No. PCT/US16/49069 dated Dec. 30, 2016 (14 pgs.).

Extended European Search Report for related Application No. 16842701.1 dated Mar. 11, 2019 (8 pages).

Search Report and Written Opinion for International Application No. PCT/US19/36926 dated Oct. 25, 2019 (14 pgs.).

European Search Report for related Application No. PCT/US2019/036926 dated Jan. 31, 2022 (13 pages).

* cited by examiner

COUNTERFLOW MIXER AND ATOMIZER

CROSS-REFERENCE TO RELATED APPLICATIONS

This Utility Patent Application claims priority under 35 U.S.C. § 371 to International Application Serial No. PCT/US2019/36926, filed Jun. 13, 2019, which claims the benefit of U.S. Provisional Patent Application No. 62/684,969, filed Jun. 14, 2018; which are both incorporated herein by reference in their entirety.

BACKGROUND

Nozzles, such as atomizer nozzles, are sometimes used to atomize liquid flows. Atomized liquid flows (e.g., sometimes referred to as aerosolized liquid flows, such as aerosol sprays) include droplets of the liquid dispersed in a gas, such as air. For example, a liquid flow may be atomized by directing a gas flow into the liquid flow to create the liquid droplets. In some examples, liquid fuels might be atomized for use in gas-turbine combustors, boilers, etc. In other examples, liquids, such as paints or other coatings, might be atomized for spray-coating applications, such as painting applications. Liquid pesticides, herbicides, etc. might be atomized, for example, for spraying.

By way of further example, combustion engines rely on rapid atomization of liquid fuel prior to combustion. In general, atomization of a liquid spray is governed by its fluid properties, density, viscosity, and surface tension, as well as the inertial forces created by the delivery setup. Conventional air assist atomizer nozzle constructions (e.g., air is blasted along the liquid stream as it exits the nozzle) employed with gas turbine engines and the like are well-suited for the rapid atomization of petroleum fuels. However, air assist atomizer nozzle constructions are less able to sufficiently atomize some alternative fuel sources such as biomass-based neat oils (bio-oil), etc., due in large part to the significantly higher viscosity of the bio-oil component (as compared to the viscosity of diesel and other petroleum fuels). For example, while soybean oil is akin to diesel in terms of density and surface tension, the viscosity of soybean oil is 25 times greater than that of diesel. Straight vegetable oil has been shown to cause operational and durability problems in compression engines due to this high viscosity and low ignitability. With conventional air assist atomizer nozzle constructions, the dynamic effect of this increased viscosity is to significantly reduce the Reynolds number of the jet as it leaves the nozzle, inhibiting liquid jet breakup and leading to insufficient levels of atomization.

An alternative atomization nozzle configuration is described in U.S. Pat. No. 8,201,351 (Ganan Calvo), and is referred to as flow-blurring atomization. Flow-blurring is developed by bifurcating the atomizing gas stream within and outside of the exit region of the nozzle. It is believed that flow-blurring atomization with high viscosity fuels may be possible. However, onset of the flow-burring regime may be dependent upon specific geometry relationships of the nozzle components, and may not afford the ability to selectively alter properties of the atomized liquid.

In light of the above, a need exists for nozzles capable of atomizing high viscosity liquids, such as, for example, bio-oils, as well as other fluid mixing applications (e.g., liquid-gas mixing or systems, gas-gas systems, or liquid-liquid systems).

SUMMARY

Some aspects of the present disclosure are directed toward a nozzle assemblies and corresponding methods for generating a mixed fluid flow, for example atomizing a liquid flow.

The nozzle assemblies and methods of the present disclosure are well-suited for atomizing a plethora of different liquids and useful with a multitude of spraying applications, as well as many other fluid mixture scenarios (e.g., gas-gas mixtures and liquid-liquid mixtures).

DETAILED DESCRIPTION

Aspects of the present disclosure relate to nozzles or nozzle assemblies, and related methods of use, in which two fluid flows are mixed by directing a first fluid flow into a second fluid flow in a direction that is counter to the direction of the second flow to create a mixed fluid flow. In some non-limiting embodiments, the nozzle assemblies of the present disclosure and related methods of use entail generating an atomized liquid-gas two phase flow that includes droplets of the liquid dispersed within the gas. In some aspects, the nozzles, nozzle assemblies and related methods of use of the present disclosure are akin to those described in PCT Publication No. WO 2017/040314 to Hoxie et al., ("WO '314") the entire teachings of which are incorporated herein by reference. In general terms, WO '314 describes nozzle assemblies (or "counterflow nozzles") comprising an inner tubular body assembled to an outer tubular body such that an outlet end of the inner tubular body is retained within a chamber of the outer tubular body. A first fluid flow is conveyed through the inner tubular body, and a second fluid flow is conveyed through a space between the inner and outer tubular bodies. A guide structure directs at least a portion of the second fluid flow toward the outlet end, generating a mixed fluid flow that is dispensed through an exit orifice of the outer tubular body. The structures and related methods of the present disclosure may differ in certain respects from the disclosures of WO '314; however, unless otherwise stated, the techniques for assembling tubular bodies or components to one another as set forth in WO '314 are equally applicable to the structures of the present disclosure.

Figure 1A:
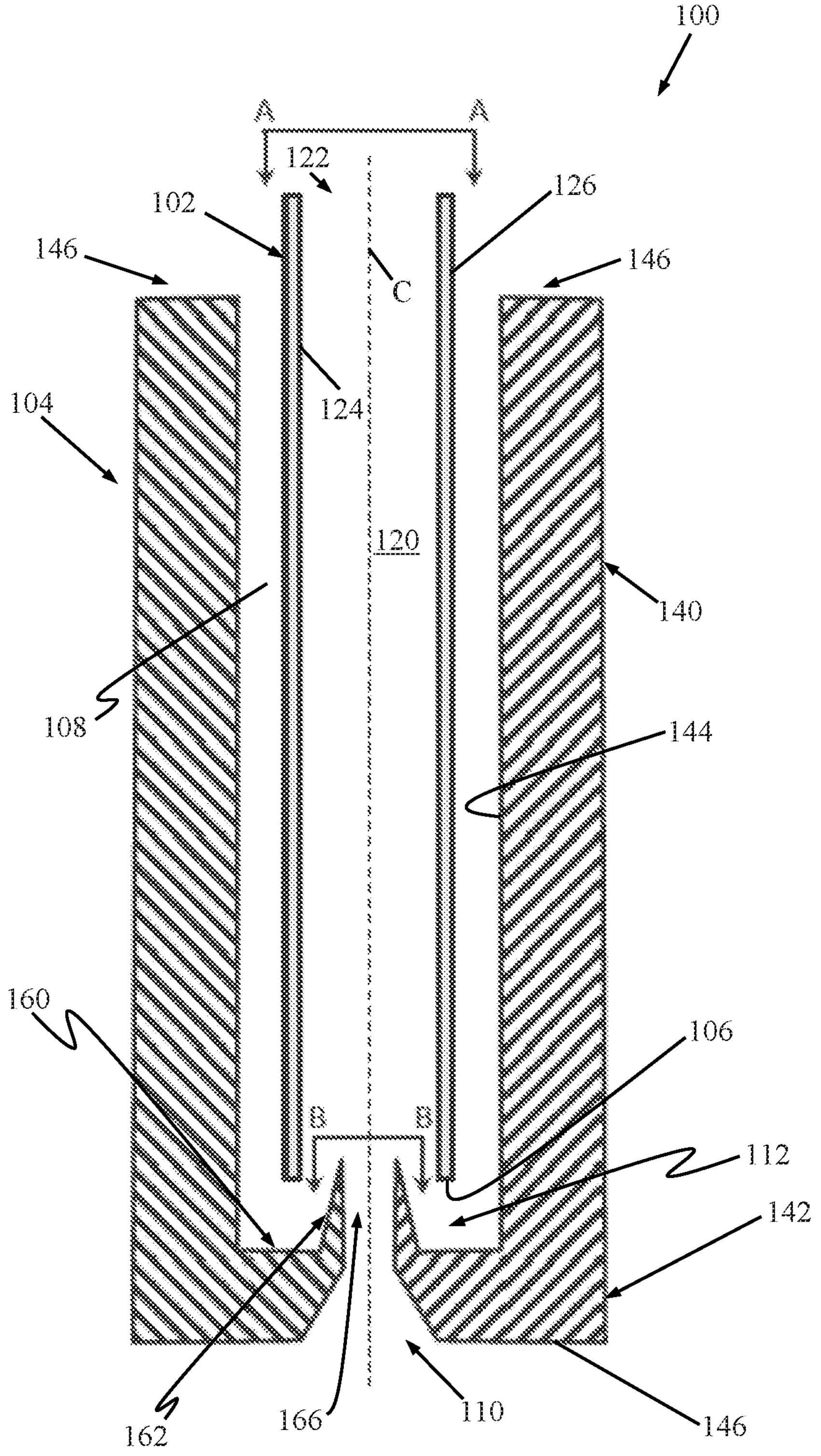
FIG. 1A is a simplified cross-sectional view of portions of a nozzle assembly in accordance with principles of the present disclosure.
Figure 1B:
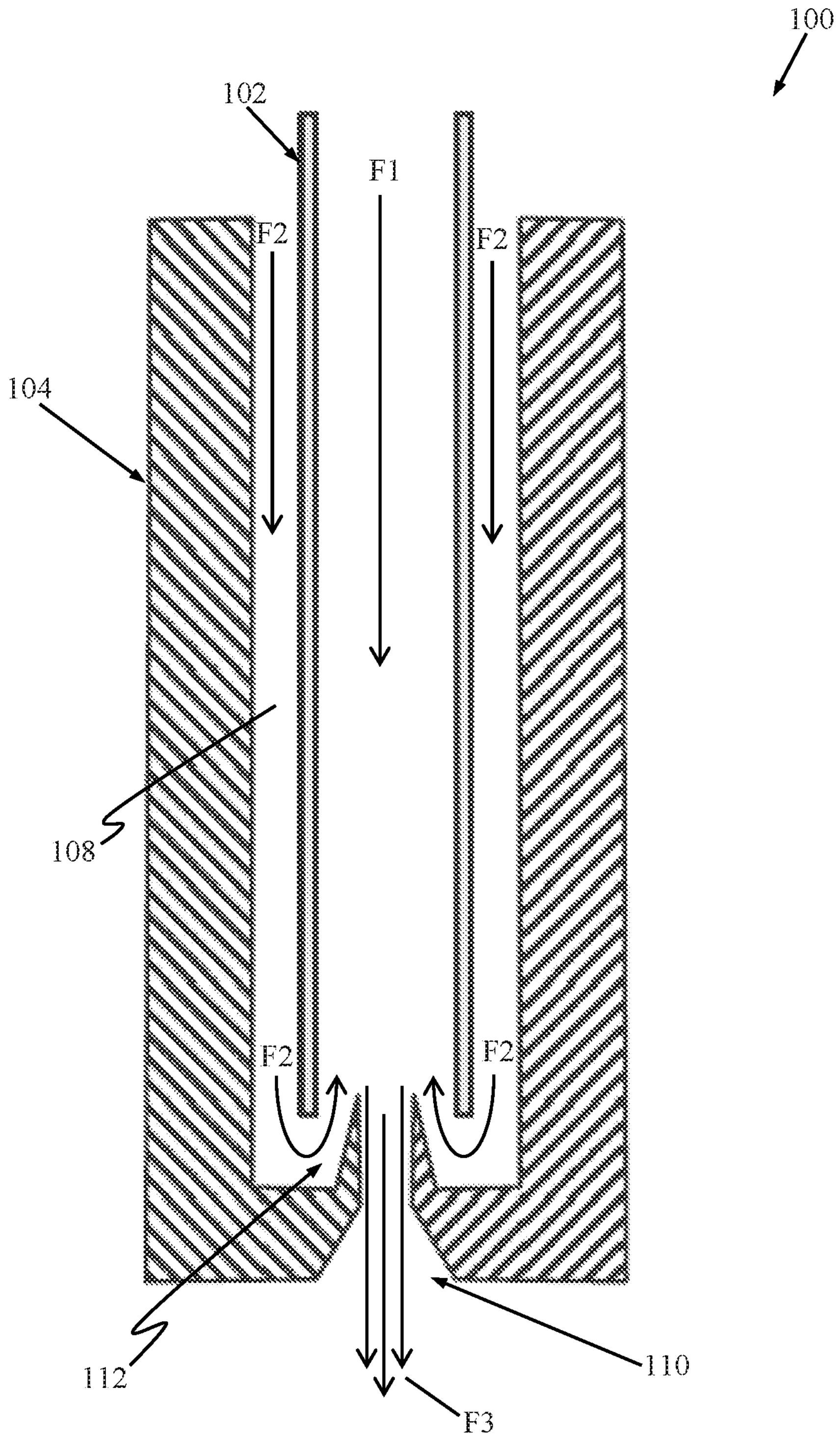
FIG. 1B illustrates use of the nozzle assembly of FIG. 1A in generating a mixed fluid flow.

Portions of one embodiment of a nozzle assembly (or "counterflow nozzle") 100 in accordance with principles of the present disclosure are shown in FIG. 1A. The nozzle assembly 100 includes an inner or primary tube 102 and an outer housing or outer tube 104. The inner tube 102 defines an outlet end 106. The outer housing 104 defines a chamber 108 and an exit orifice 110. The inner tube 102 is mounted relative to the outer housing 104 such that the outlet end 106 is within the chamber 108 and axially aligned and radially symmetric with the exit orifice 110. As a point of reference, various features of the nozzle assemblies of the present disclosure can be described with reference to a central (or longitudinal) axis C defined by the outer housing 104 (e.g., as used herein, directional terms such as "axial" and "radial" are relative to the central axis C) alone or as defined by an optional coaxial arrangement of the inner tube 102 and the outer housing 104. During use, and as generally reflected by FIG. 1B, a first fluid flow F1 (liquid or gas) is conveyed through the inner tube 102 and a second fluid flow F2 (liquid or gas) into the chamber 108. The second fluid flow F2 within the chamber 108 (e.g., between the inner tube 102 and the outer housing 104) is at least partially directed toward the outlet end 106 (identified in FIG. 1A), generating a mixed fluid flow F3 adjacent, within, or into the inner tube 102 (e.g., a gas flow (either F1 or F2) atomizes a liquid flow (the other of F1 or F2) in some non-limiting embodiments); the mixed fluid flow F3 is then directed or dispensed through the exit orifice 110. As described below, an interior guide structure 112 (referenced generally) provided with the outer housing 104 is configured and arranged relative to the outlet end 106 such that at least a portion of the second fluid flow F2 is directed toward (or into) the outlet end 106 in a direction that is initially opposite, optionally fully opposite, the primary direction of the first fluid flow F1. In some embodiments, the nozzle assembly 100 is configured such that an axial arrangement of the outlet end 106 relative to the interior guide structure 112 can be selectively altered to generate a pulsed mixed fluid flow (e.g., a pulsed atomized flow) at the exit orifice 110, with the pulse rate of the pulsing mixed fluid flow optionally being selected by a user.

Returning to FIG. 1A, the inner tube 102 can assume various forms appropriate for interfacing with a desired fluid, either liquid (e.g., bio-oil fuel) or gas (e.g., air). A cross-sectional shape or structure of the inner tube 102 can assume various forms as described in greater detail below. The inner tube 102 defines a first flow passage 120 that is open to the outlet end 106 such that the first fluid (not shown) can be directed to the outlet end 106 from an inlet end 122 (referenced generally) via the first flow passage 120. The first flow passage 120 is bounded or defined by an inner surface 124 of the inner tube 102, with the inner surface 124 being opposite an outer surface 126. While the inner tube 102 is illustrated as being substantially linear, other shapes are also envisioned; for example, portions of the inner tube 102 that are otherwise beyond or outside of the outer housing 104 can incorporate one or more curves, can be flexible, etc. In some embodiments, the inner tube 102 is continuous from the inlet end 122 to the outlet end 106.

The outer housing 104 can be formed from one or more parts, and generally includes or provides a tubular side wall 140 and an end wall 142. The chamber 108 is bounded by an inner face 144 of the tubular side wall 140 (e.g., the chamber 108 can have a cylindrical shape), and is fluidly open to one or more fluid entry ports 146 (referenced generally). The outer housing 104 is generally configured to slidably or fixedly receive the inner tube 102, and can include one or more features that promote fixed mounting of the inner tube 102 as will be understood by one of ordinary skill.

The end wall 142 forms or defines the exit orifice 110. The exit orifice 110 is open to an exterior face 146 of the end wall 142, and can have a variety of shapes and sizes (e.g., the exit orifice 110 can have an expanding diameter in a direction of the exterior face 146 as shown). The exit orifice 110 is axially or longitudinally aligned with the central axis C in some embodiments.

In addition to the exit orifice 110, the end wall 142 includes, forms, or carries the interior guide structure 112 (referenced generally). The interior guide structure 112 includes a guide surface 160 and a guide post 162. The guide surface 160 is opposite the exterior face 146, and projects or extends radially inwardly from the inner face 144 of the tubular side wall 140. In some embodiments, the guide surface 160 can be highly flat or planar (e.g., within 10% of a truly flat surface) and defines a plane substantially perpendicular (e.g., within 10% of a truly perpendicular relationship) to the central axis C. The guide surface 160 can have other constructions that may or may not be highly flat or planar, for example a curved configuration.

Figure 1C:
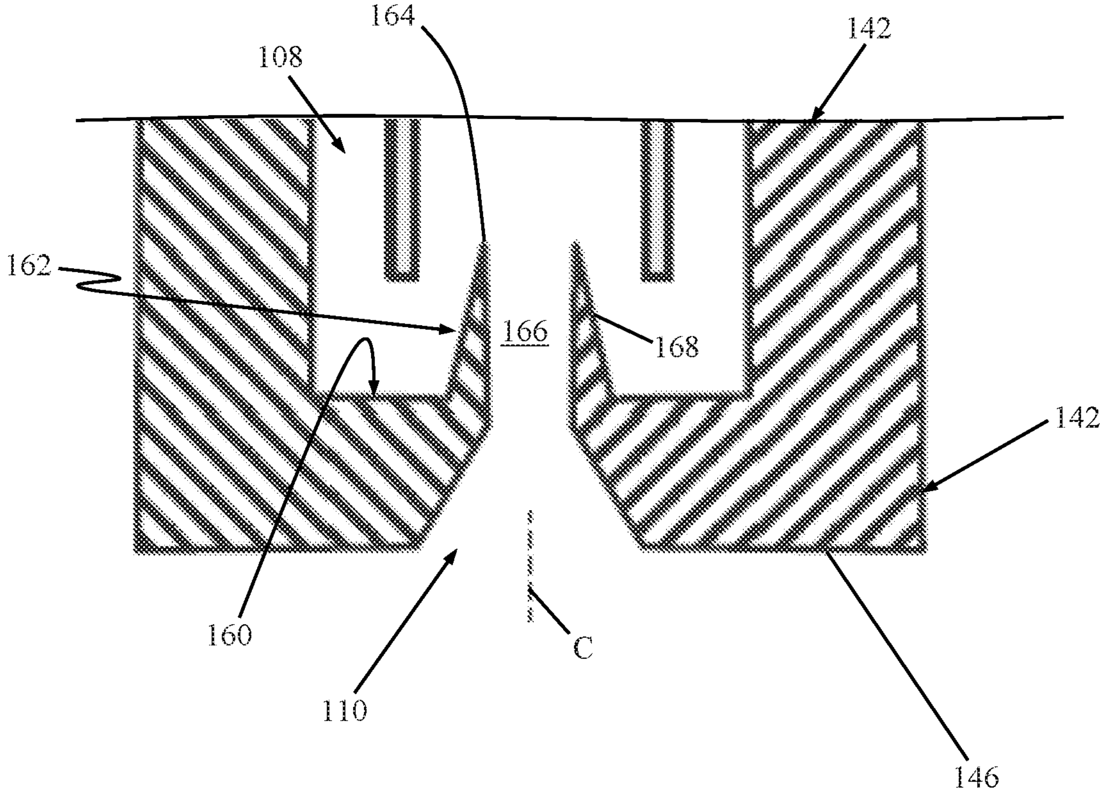
FIG. 1C is an enlarged view of a portion of the nozzle assembly of FIG. 1A.

With additional reference to FIG. 1C, the guide post 162 projects from the guide surface 160 in a direction opposite the exterior face 146 of the end wall 142, terminating at a post end 164. The guide post 162 is axially aligned with the exit orifice 110, and forms a lumen 166 that is open to the exit orifice 110 and the post end 164. A cross-sectional shape or structure of the guide post 162 can assume various forms as described in greater detail below. In general terms, an exterior face 168 of the guide post 162 serves to direct fluid flow from the guide face 160 in a desired direction, with the guide post 162 optionally having a tapering outer diameter in extension from the guide face 160 to the post end 164. The taper can be uniform along an axial length of the exterior face 168; in other embodiments, differing degrees of taper can be incorporated and/or portions of the exterior face 168 can be linear (i.e., parallel with the central axis C) in axial length. The exterior face 168 can be substantially smooth in some embodiments. Alternatively, one or more flow-affecting features can be incorporated, such as a spiral (e.g., a helical) step (e.g., ramp) as described below. With optional embodiments in which the guide surface 160 is curved, the exterior face 168 of the guide post 162 can be formed or defined as continuous surface extension of the curved shaped of the guide surface 160. Regardless, the guide post 162 is radially spaced from the tubular side wall 140 and projects into the chamber 108.

Returning to FIG. 1A and as mentioned above the inner tube 102 and the guide post 162 can have a variety of cross-sectional shapes or structures. A cross-sectional shape or structure of the inner tube 102 is in reference to the cross-sectional plane or vantage point identified at A-A in FIG. 1A; a cross-sectional shape or structure of the guide post 162 is in reference to the cross-sectional plane or vantage point identified at B-B in FIG. 1A. The cross-sectional planes A-A and B-B are perpendicular to the central axis C. FIGS. 2A-2G illustrate some of the cross-sectional shapes or structures of the present disclosure and useful for one or both of the inner tube 102 and the guide post 162. That is to say, the cross-sectional shape or structure of the inner tube 102 (i.e., in the plane A-A) can be any of the shapes or structures of FIGS. 2A-2G; similarly, the cross-sectional shape or structure of the guide post 162 (i.e., in the plane B-B) can be any of the shapes or structures of FIGS. 2A-2G. In some embodiments, the cross-sectional shape or structure of the inner tube 102 is identical to the cross-sectional shape or structure of the guide post 162. In other embodiments, the cross-sectional shape or structure of the inner tube 102 differs from the cross-sectional shape or structure of the guide post 162 (e.g., the cross-sectional shape or structure of the inner tube 102 can be akin to FIG. 2A, whereas the cross-sectional shape or structure of the guide post 162 can be akin to any of FIGS. 2B-2F, and vice-versa).

Figure 2A:
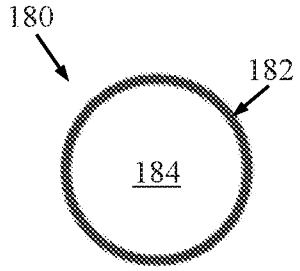
FIGS. 2A-2G are a simplified end views of shapes or structures useful with one or both of a primary tube component and an interior guide structure of the nozzle assembly of FIG. 1A from the vantage point A-A or B-B.

With the above explanations in mind, one embodiment of a cross-sectional shape or structure 180 useful as the cross-sectional shape or structure of one or both of the inner tube 102 and the guide post 162 is shown in FIG. 2A. The cross-sectional shape or structure 180 includes a continuous outer wall 182 defining a central passageway 184. A shape defined by the continuous outer wall 182 is substantially circular (i.e., within 5 percent of a truly circular shape), and the central passageway 184 is completely open or unobstructed in a direction across (or transverse to) the continuous outer wall 182. As a point of further clarification, where the cross-sectional shape or structure 180 is utilized for the inner tube 102 (FIG. 1A), the central passageway 184 corresponds with the flow passage 120 (FIG. 1A); where the cross-sectional shape or structure 180 is utilized for the guide post 162 (FIG. 1A), the central passageway 184 corresponds with the lumen 166 (FIG. 1A).

Figure 2B:
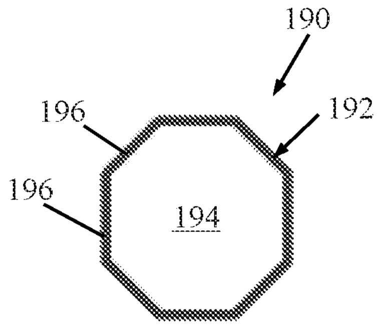

Another embodiment of a cross-sectional shape or structure 190 useful as the cross-sectional shape or structure of one or both of the inner tube 102 (FIG. 1A) and the guide post 162 (FIG. 1A) is shown in FIG. 2B. The cross-sectional shape or structure 190 includes a continuous outer wall 192 defining a central passageway 194. The continuous outer wall 192 can include or comprise a plurality of linear segments 196 that combine to define a polygonal shape, such as the octagonal shape illustrated. Any other polygonal shape formed by contiguous linear segments (e.g., triangle, square, hexagon, etc.; simple polygon, convex polygon, etc.; equiangular polygon, equilateral polygon, etc.) is also acceptable. Regardless, the central passageway 194 is completely open or unobstructed in a direction across (or transverse to) the continuous outer wall 192. As a point of further clarification, where the cross-sectional shape or structure 190 is utilized for the inner tube 102, the central passageway 194 corresponds with the flow passage 120 (FIG. 1A); where the cross-sectional shape or structure 190 is utilized for the guide post 162, the central passageway 194 corresponds with the lumen 166 (FIG. 1A).

Figure 2C:
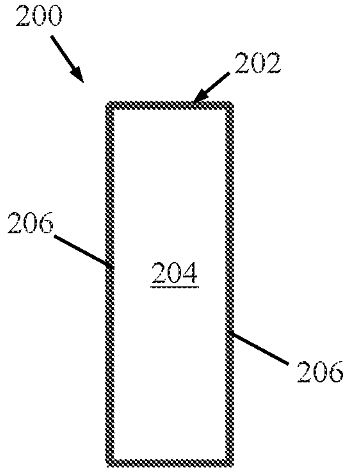

As described above, the polygonal shape defined by the continuous outer wall can have a wide variety of forms. For example, another embodiment of a cross-sectional shape or structure 200 useful as the cross-sectional shape or structure of one or both of the inner tube (FIG. 1A) and the guide post 162 (FIG. 1A) is shown in FIG. 2C. The cross-sectional shape or structure 200 includes a continuous outer wall 202 defining a central passageway 204. The continuous outer wall 202 can include or comprise a plurality of linear segments 206 that combine to define a non-equilateral polygonal shape, such as the rectangular shape illustrated. The central passageway 204 is completely open or unobstructed in a direction across (or transverse to) the continuous outer wall 202. As a point of further clarification, where the cross-sectional shape or structure 200 is utilized for the inner tube 102, the central passageway 204 corresponds with the flow passage 120 (FIG. 1A); where the cross-sectional shape or structure 200 is utilized for the guide post 162, the central passageway 204 corresponds with the lumen 166 (FIG. 1A).

Figure 2D:
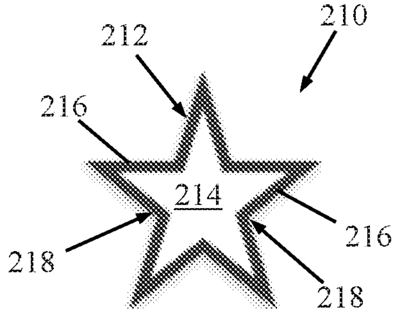

Another embodiment of a cross-sectional shape or structure 210 useful as the cross-sectional shape or structure of one or both of the inner tube 102 (FIG. 1A) and the guide post 162 (FIG. 1A) is shown in FIG. 2D. The cross-sectional shape or structure 210 includes a continuous outer wall 212 defining a central passageway 214. The continuous outer wall 212 can include or comprise a plurality of linear segments 216 that combine to define a non-convex polygonal shape, such as the star shape illustrated. The central passageway 214 is completely open or unobstructed in a direction across (or transverse to) the continuous outer wall 212. As a point of further clarification, where the cross-sectional shape or structure 210 is utilized for the inner tube 102, the central passageway 214 corresponds with the flow passage 120 (FIG. 1A); where the cross-sectional shape or structure 210 is utilized for the guide post 162, the central passageway 214 corresponds with the lumen 166 (FIG. 1A). The star shape associated with the shape or structure 210 effectively generates a plurality of lobes or lobe regions 218. When employed, for example, with the inner tube 102, the lobes 218 can serve to generate a jet flow shape or pattern that is more quickly or readily broken up, for example where the cross-sectional shape of the inner tube 102 provides five of the lobes 218 (although any other number of lobes, greater or lesser than five, is also acceptable).

Figure 2E:
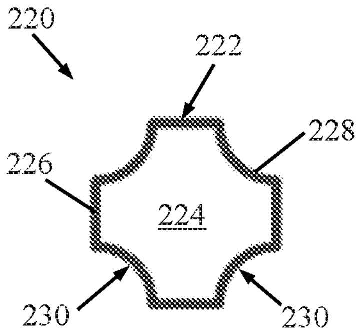

The lobes 218 can be generated by the cross-sectional shape or structure in a number of different formats. For example, another embodiment of a cross-sectional shape or structure 220 useful as the cross-sectional shape or structure of one or both of the inner tube 102 (FIG. 1A) and the guide post 162 (FIG. 1A) is shown in FIG. 2E. The cross-sectional shape or structure 220 includes a continuous outer wall 222 defining a central passageway 224. The continuous outer wall 222 can include or comprise a plurality of linear segments 226 and a plurality of curved segments 228 that combine to define a closed, curvilinear shape as illustrated. The central passageway 224 is completely open or unobstructed in a direction across (or transverse to) the continuous outer wall 222. As a point of further clarification, where the cross-sectional shape or structure 220 is utilized for the inner tube 102, the central passageway 224 corresponds with the flow passage 120 (FIG. 1A); where the cross-sectional shape or structure 220 is utilized for the guide post 162, the central passageway 224 corresponds with the lumen 166 (FIG. 1A). The closed, curvilinear shape associated with the shape or structure 220 effectively generates a plurality of lobes or lobe regions 230. While the cross-sectional shape or structure 220 is depicted as having four of the lobes 230, any other number, either greater or lesser, is also acceptable.

Figure 2F:
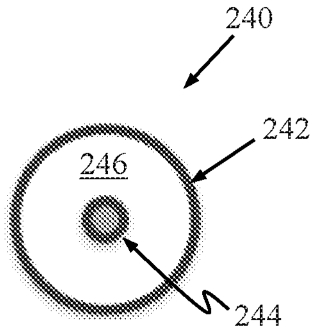

Another embodiment of a cross-sectional shape or structure 240 useful as the cross-sectional shape or structure of one or both of the inner tube 102 (FIG. 1A) and the guide post 162 (FIG. 1A) is shown in FIG. 2F. The cross-sectional shape or structure 240 includes a continuous outer wall 242 and a diversion body 244. The continuous outer wall 242 defines a central passageway 246, and can assume any of the forms or formats described above. For example, the outer wall 242 can form the substantially circular shape as shown; alternatively, the continuous outer wall 242 can form a polygonal shape, curvilinear shape, etc. As a point of further clarification, where the cross-sectional shape or structure 240 is utilized for the inner tube 102, the central passageway 246 corresponds with the flow passage 120 (FIG. 1A); where the cross-sectional shape or structure 240 is utilized for the guide post 162, the central passageway 246 corresponds with the lumen 166 (FIG. 1A).

The diversion body 244 is disposed within the central passageway 246, and is configured to generate a desired shape or pattern into fluid flowing through the central passageway 246. In some embodiments, the diversion body 244 has a cylindrical shape (e.g., a solid cylinder, a tube, etc.), and is optionally located at a centerline of the central passageway 246. The diversion body 244 can be associated with the outer wall 242 in various fashions. For example, the diversion body 244 can be an elongated wire or similar structure that extends longitudinally beyond the outer wall 242; a region of the diversion body 244 outside the outer wall 242 is retained by a coupling device (not shown) that serves to maintain the diversion body 244 relative to the outer wall 242 in the position illustrated. Alternatively, the diversion body 244 can be more directly connected or mounted to the outer wall 242. Regardless, the diversion body 244 serves as a partial obstruction within the central passageway 246, affecting a shape or pattern of fluid flow through the central passageway 246.

Figure 2G:
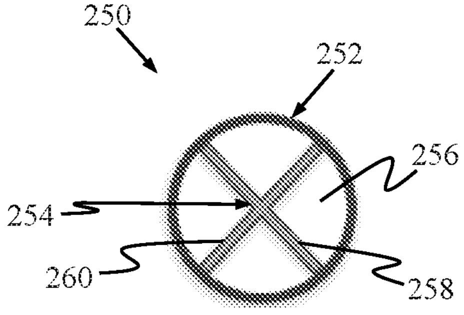

The diversion body 244 can assume a number of different forms that may or may not be implicated by FIG. 2F. For example, another embodiment of a cross-sectional shape or structure 250 useful as the cross-sectional shape or structure of one or both of the inner tube (FIG. 1A) and the guide post 162 (FIG. 1A) is shown in FIG. 2G. The cross-sectional shape or structure 250 includes a continuous outer wall 252 and a diversion body 254. The continuous outer wall 252 defines a central passageway 256, and can assume any of the forms or formats described above. For example, the outer wall 252 can form the substantially circular shape as shown; alternatively, the continuous outer wall 252 can form a polygonal shape, curvilinear shape, etc. As a point of further clarification, where the cross-sectional shape or structure 250 is utilized for the inner tube 102, the central passageway 256 corresponds with the flow passage 120 (FIG. 1A); where the cross-sectional shape or structure 250 is utilized for the guide post 162, the central passageway 256 corresponds with the lumen 166 (FIG. 1A).

The diversion body 254 is disposed within the central passageway 256, and is configured to generate a desired shape or pattern into, or disrupt, fluid flowing through the central passageway 256. In some embodiments, the diversion body 254 includes one or more cross-members, such as cross-members 258, 260. The cross-members 258, 260 extend across the central passageway 256, and can be attached to (optionally integrally formed with) the continuous outer wall 252. In some embodiments, the cross-members 258, 260 are symmetrically arranged relative to a perimeter shape of the continuous outer wall 256, and intersect a centerline of the central passageway 252. Alternatively, one or more of the cross-members 258, 260 can have a non-symmetrical arrangement relative to a perimeter shape of the continuous outer wall 252. Regardless, the diversion body 254 serves as a partial obstruction within the central passageway 256, affecting a shape or pattern of fluid flow through the central passageway 256.

While the cross-sectional shapes or structures implicated by FIGS. 2A-2G are symmetrical in one or more aspects, in other embodiments the cross-sectional shape or structure of one or both of the inner tube (FIG. 1A) and the guide post 162 (FIG. 1A) can be non-symmetrical.

Figure 3:
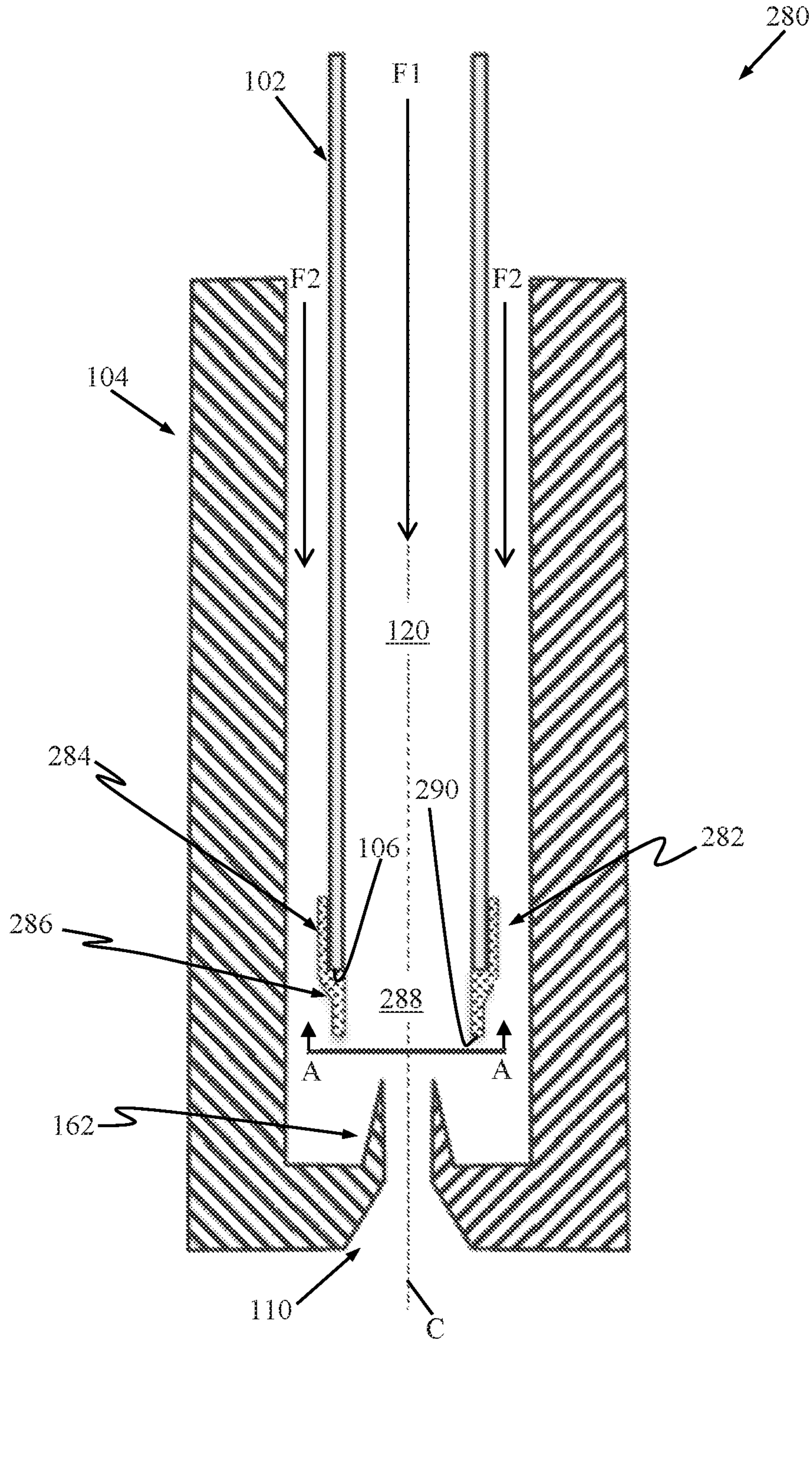
FIG. 3 is a simplified cross-sectional view of portions of another nozzle assembly in accordance with principles of the present disclosure.

Portions of another embodiment of a nozzle assembly 280 in accordance with principles of the present disclosure are shown in FIG. 3. The nozzle assembly 280 can be akin to the nozzle assembly 100 (FIG. 1A), and includes the inner or primary tube 102 and the outer housing or outer tube 104. In addition, the nozzle assembly 280 includes an end cap 282 mounted to the inner tube 102 for reasons made clear below. In general terms, the inner tube 102 as provided with the nozzle assembly 280 can have a substantially circular cross-sectional shape (e.g., the cross-sectional shape or structure 180 of FIG. 2A). Similarly, the guide post 162 provided with the outer housing 104 can have a substantially circular cross-sectional shape (e.g., the cross-sectional shape or structure 180 of FIG. 2A). The inner tube 102 is arranged relative to the outer housing 104, including relative to the guide post 162, such that the nozzle assembly 280 is configured to generate counterflow mixing pattern between two fluid flows in a manner somewhat akin to the descriptions above with respect to FIG. 1B. The end cap 282 serves to shape or pattern fluid flow to the exit orifice 110.

More particularly, the end cap 282 includes or defines a coupling region 284, a flow interface region 286, and a channel 288. The coupling region 284 is configured for attachment to the inner tube 102 (e.g., press fit, adhesive, weld, mechanical fastener, etc.) in a manner locating the flow interface region 286 downstream of the outlet end 106. Upon final assembly, the flow interface region 286 extends from and beyond the outlet end 106, terminating at an outflow end 290 that is open to the channel 288. In some embodiments, a diameter of the channel 288 corresponds with a diameter of the flow passage 120 of the inner tube 102. The first fluid flow F1 progresses along the flow passage 120, then through the flow interface region 286 (i.e., through the channel 288), and is dispensed from the outflow end 290 in a direction of the exit orifice 110. Mixing of the first fluid flow F1 and the second fluid flow F2 can occur within the flow interface region 286 or outside of the flow interface region 286 (e.g., the inner tube 102 and the end cap 282 can be arranged relative to the guide post 162 such that the guide post 162 is entirely outside or downstream of the outflow end 290. Regardless, the flow interface region 286 can have a cross-sectional shape or structure selected to impart a desired fluid flow pattern or behavior.

A cross-sectional shape or structure of the flow interface region 286 is in reference to the cross-sectional plane or vantage point identified at A-A in FIG. 3. The cross-sectional plane A-A is perpendicular to the central axis C. FIGS. 4A-4F illustrate some of the cross-sectional shapes or structures of the present disclosure and useful for the flow interface region 286. That is to say, the cross-sectional shape or structure of the flow interface region 286 (i.e., in the plane A-A) can be any of the shapes or structures of FIGS. 4A-4F.

Figure 4A:
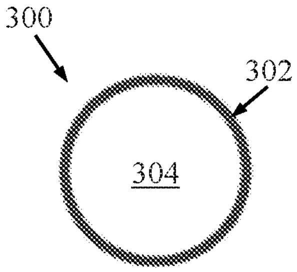
FIGS. 4A-4F are simplified end views of shapes or structures useful with an end cap component of the nozzle assembly of FIG. 3 from the vantage point A-A.

With the above explanations in mind, one embodiment of a cross-sectional shape or structure 300 useful as the cross-sectional shape or structure of the flow interface region 286 is shown in FIG. 4A. The cross-sectional shape or structure 300 includes a continuous outer wall 302 defining a central passageway 304. A shape defined by the continuous outer wall 302 is substantially circular (i.e., within 5 percent of a truly circular shape), and the central passageway 304 is completely open or unobstructed in a direction across (or transverse to) the continuous outer wall 302. As a point of further clarification, where the cross-sectional shape or structure 300 is utilized for the flow interface region 286 (FIG. 3), the central passageway 304 corresponds with the channel 288.

Figure 4B:
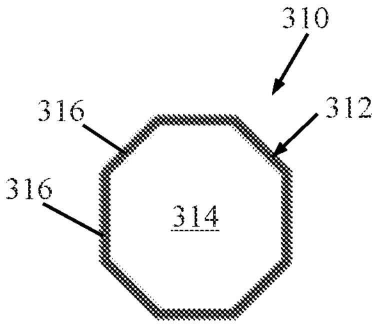

Another embodiment of a cross-sectional shape or structure 310 useful as the cross-sectional shape or structure of the flow interface region 286 (FIG. 3) is shown in FIG. 4B. The cross-sectional shape or structure 310 includes a continuous outer wall 312 defining a central passageway 314. The continuous outer wall 312 can include or comprise a plurality of linear segments 316 that combine to define a polygonal shape, such as the octagonal shape illustrated. Any other polygonal shape formed by contiguous linear segments (e.g., triangle, square, hexagon, etc.; simple polygon, convex polygon, etc.; equiangular polygon, equilateral polygon, etc.) is also acceptable. Regardless, the central passageway 314 is completely open or unobstructed in a direction across (or transverse to) the continuous outer wall 312. As a point of further clarification, where the cross-sectional shape or structure 310 is utilized for the flow interface region 286, the central passageway 314 corresponds with the channel 288 (FIG. 3).

Figure 4C:
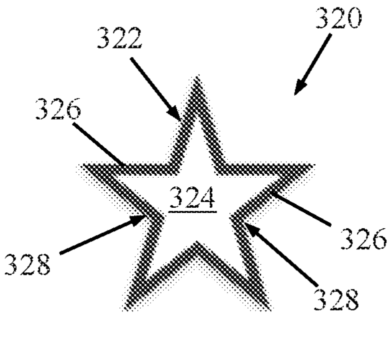

Another embodiment of a cross-sectional shape or structure 320 useful as the cross-sectional shape or structure of the flow interface region 286 (FIG. 3) is shown in FIG. 4C. The cross-sectional shape or structure 320 includes a continuous outer wall 322 defining a central passageway 324. The continuous outer wall 322 can include or comprise a plurality of linear segments 326 that combine to define a non-convex polygonal shape, such as the star shape illustrated. The central passageway 324 is completely open or unobstructed in a direction across (or transverse to) the continuous outer wall 322. As a point of further clarification, where the cross-sectional shape or structure 320 is utilized for the flow interface region 286, the central passageway 324 corresponds with the channel 288 (FIG. 3). The star shape associated with the shape or structure 320 effectively generates a plurality of lobes or lobe regions 328. The lobes 328 can serve to generate a jet flow shape or pattern that is more quickly or readily broken up, for example where the cross-sectional shape of the flow interface region 286 provides five of the lobes 328 (although any other number of lobes, greater or lesser than five, is also acceptable).

Figure 4D:
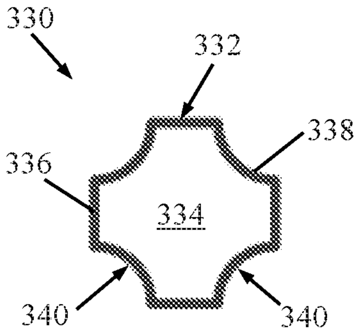

The lobes 328 can be generated by the cross-sectional shape or structure in a number of different formats. For example, another embodiment of a cross-sectional shape or structure 330 useful as the cross-sectional shape or structure of the flow interface region 286 (FIG. 3) is shown in FIG. 4D. The cross-sectional shape or structure 330 includes a continuous outer wall 332 defining a central passageway 334. The continuous outer wall 332 can include or comprise a plurality of linear segments 336 and a plurality of curved segments 338 that combine to define a closed, curvilinear shape as illustrated. The central passageway 334 is completely open or unobstructed in a direction across (or transverse to) the continuous outer wall 332. As a point of further clarification, where the cross-sectional shape or structure 330 is utilized for the flow interface region 286, the central passageway 334 corresponds with the channel 288 (FIG. 3). The closed, curvilinear shape associated with the shape or structure 330 effectively generates a plurality of lobes or lobe regions 340. While the cross-sectional shape or structure 330 is depicted as having four of the lobes 340, any other number, either greater or lesser, is also acceptable.

Figure 4E:
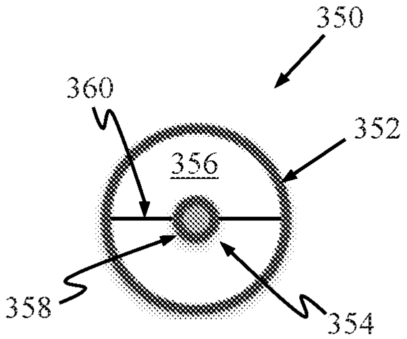

Another embodiment of a cross-sectional shape or structure 350 useful as the cross-sectional shape or structure of the flow interface region 286 (FIG. 3) is shown in FIG. 4E. The cross-sectional shape or structure 350 includes a continuous outer wall 352 and a diversion body 354. The continuous outer wall 352 defines a central passageway 356, and can assume any of the forms or formats described above. For example, the outer wall 352 can form the substantially circular shape as shown; alternatively, the continuous outer wall 352 can form a polygonal shape, curvilinear shape, etc. As a point of further clarification, where the cross-sectional shape or structure 350 is utilized for the flow interface region 286, the central passageway 356 corresponds with the channel 288 (FIG. 3).

The diversion body 354 is disposed within the central passageway 356, and is configured to generate a desired shape or pattern into, or disrupt, fluid flowing through the central passageway 356. In some embodiments, the diversion body 354 includes a primary diversion member 358 that is retained relative to the outer wall 352 by struts 360. The primary diversion member 358 has a cylindrical shape (e.g., a solid cylinder, a tube, etc.), and is optionally located at a centerline of the central passageway 356. The struts 360 may be relatively small (and thus may have minimal effect on fluid flow pattern or disruption). Regardless, the diversion body 354, and in particular the primary diversion member 358, serves as a partial obstruction within the central passageway 356, affecting a shape or pattern or disruption of fluid flow through the central passageway 356.

Figure 4F:
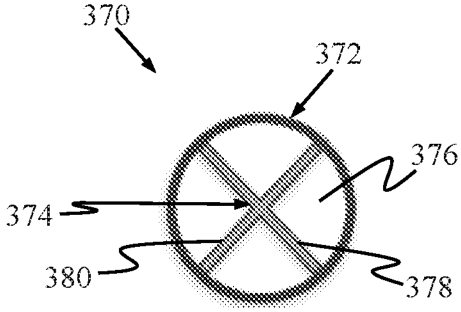

The diversion body 354 can assume a number of different forms that may or may not be implicated by FIG. 4E. For example, another embodiment of a cross-sectional shape or structure 370 useful as the cross-sectional shape or structure of the flow interface region 286 (FIG. 3) is shown in FIG. 4F. The cross-sectional shape or structure 370 includes a continuous outer wall 372 and a diversion body 374. The continuous outer wall 372 defines a central passageway 376, and can assume any of the forms or formats described above. For example, the outer wall 372 can form the substantially circular shape as shown; alternatively, the continuous outer wall 372 can form a polygonal shape, curvilinear shape, etc. As a point of further clarification, where the cross-sectional shape or structure 370 is utilized for the flow interface region 286, the central passageway 376 corresponds with the channel 288 (FIG. 3).

The diversion body 374 is disposed within the central passageway 376, and is configured to generate a desired shape or pattern into, or disrupt, fluid flowing through the central passageway 376. In some embodiments, the diversion body 374 includes one or more cross-members, such as cross-members 378, 380. The cross-members 378, 380 extend across the central passageway 376, and can be attached to (optionally integrally formed with) the continuous outer wall 372. In some embodiments, the cross-members 378, 380 are symmetrically arranged relative to a perimeter shape of the continuous outer wall 376, and intersect a centerline of the central passageway 372. Alternatively, one or more of the cross-members 378, 380 can have a non-symmetrical arrangement relative to a perimeter shape of the continuous outer wall 372. Regardless, the diversion body 374 serves as a partial obstruction within the central passageway 376, affecting a shape or pattern of fluid flow through the central passageway 376.

Figure 5:
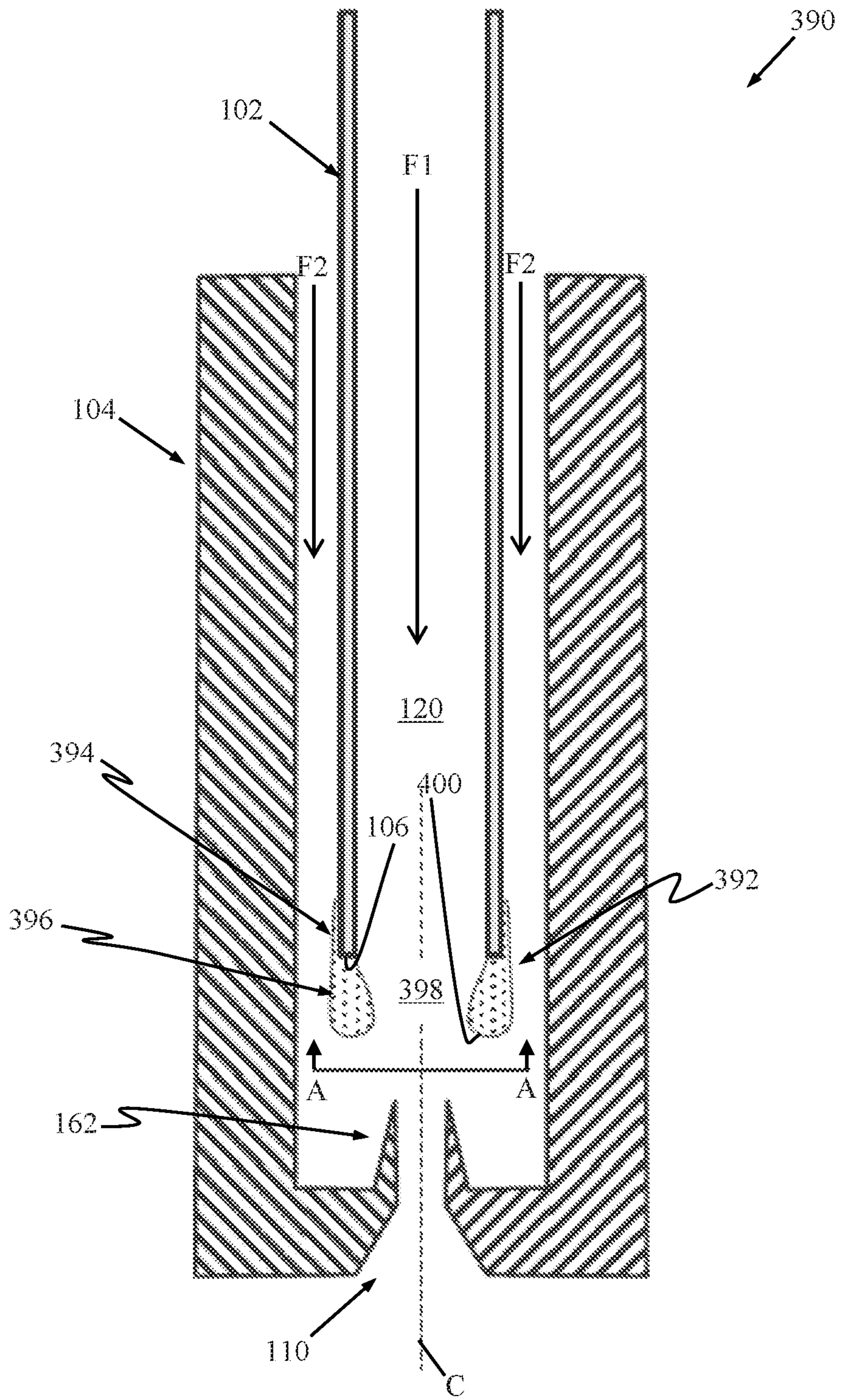
FIG. 5 is a simplified cross-sectional view of portions of another nozzle assembly in accordance with principles of the present disclosure.

Portions of another embodiment of a nozzle assembly 390 in accordance with principles of the present disclosure are shown in FIG. 5. The nozzle assembly 390 can be akin to the nozzle assembly 280 (FIG. 3), and includes the inner or primary tube 102 and the outer housing or outer tube 104. In addition, the nozzle assembly 390 includes an end cap 392 mounted to the inner tube 102 for reasons made clear below. In general terms, the inner tube 102 as provided with the nozzle assembly 390 can have a substantially circular cross-sectional shape (e.g., the cross-sectional shape or structure 180 of FIG. 2A). Similarly, the guide post 162 provided with the outer housing 104 can have a substantially circular cross-sectional shape (e.g., the cross-sectional shape or structure 180 of FIG. 2A). The inner tube 102 is arranged relative to the outer housing 104, including relative to the guide post 162, such that the nozzle assembly 390 is configured to generate counterflow mixing pattern between two fluid flows in a manner somewhat akin to the descriptions above with respect to FIG. 1B. The end cap 392 serves to shape or pattern fluid flow to the exit orifice 110.

More particularly, the end cap 392 includes or defines a coupling region 394, a flow interface region 396, and a channel 398. The coupling region 394 is configured for attachment to the inner tube 102 (e.g., press fit, adhesive, weld, mechanical fastener, etc.) in a manner locating the flow interface region 396 downstream of the outlet end 106. Upon final assembly, the flow interface region 396 extends from and beyond the outlet end 106, terminating at an outflow end 400 that is open to the channel 398. In some embodiments, a diameter of the channel 288 tapers or converges in a direction of the outflow end 400, with a diameter of the outflow end 400 being less than a diameter of the flow passage 120 of the inner tube 102. The first fluid flow F1 progresses along the flow passage 120, then through the flow interface region 396 (i.e., through the channel 398) where the first fluid flow F1 is caused to converge (akin to a nozzle, a velocity of the first fluid flow F1 increases through the flow interface region 396. Further, the flow interface region 396 changes a shape of the first fluid flow F1. The first fluid flow F1 is dispensed from the outflow end 400 in a direction of the exit orifice 110. Mixing of the first fluid flow F1 and the second fluid flow F2 can occur within the flow interface region 396 or outside of the flow interface region 396 (e.g., the inner tube 102 and the end cap 392 can be arranged relative to the guide post 162 such that the guide post 162 is entirely outside or downstream of the outflow end 400. Regardless, the flow interface region 396 can have a cross-sectional shape or structure selected to impart a desired fluid flow pattern or behavior.

Figure 6A:
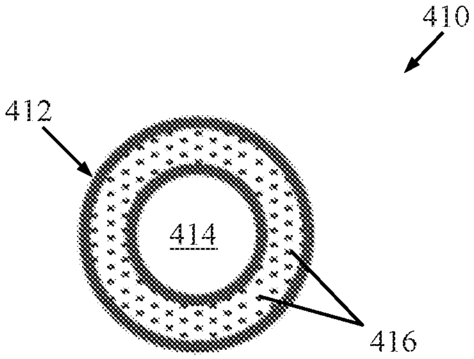
FIGS. 6A-6B are simplified end views of shapes or structures useful with an end cap component of the nozzle assembly of FIG. 5 from the vantage point A-A.
Figure 6B:
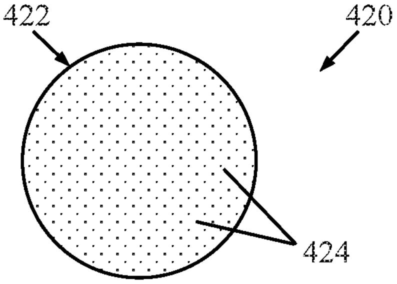

A cross-sectional shape or structure of the flow interface region 396 is in reference to the cross-sectional plane or vantage point identified at A-A in FIG. 5. The cross-sectional plane A-A is perpendicular to the central axis C. FIGS. 6A and 6B illustrate some of the cross-sectional shapes or structures of the present disclosure and useful for the flow interface region 396. That is to say, the cross-sectional shape or structure of the flow interface region 396 (i.e., in the plane A-A) can be any of the shapes or structures implicated by FIGS. 6A and 6B.

With the above explanations in mind, one embodiment of a cross-sectional shape or structure 410 useful as the cross-sectional shape or structure of the flow interface region 396 is shown in FIG. 6A. The cross-sectional shape or structure 410 includes a continuous outer wall 412 defining a central passageway 414. A shape defined by the continuous outer wall 412 can be akin to a ring. Where the cross-sectional shape or structure 410 is utilized for the flow interface region 396 (FIG. 5), the central passageway 414 corresponds with the channel 398. Though not evident from the view of FIG. 6A, the central passageway 414 can taper in diameter in a downstream direction (e.g., as generally illustrated in FIG. 5). A plurality of apertures or pores 416 are optionally formed through the outer wall 412 in some embodiments. The apertures 416 can be naturally occurring in a material employed with the end cap 392 (FIG. 5), or can be mechanically imparted into at least the flow interface region 396. A size or diameter of the apertures 416 can be significantly less than a size or diameter of the central passageway 414. Regardless, the apertures 416, where provided, permit fluid flow through a thickness of the outer wall 412 and serve to further shape or disrupt fluid flow.

Another embodiment of a cross-sectional shape or structure 420 useful as the cross-sectional shape or structure of the flow interface region 396 (FIG. 5) is shown in FIG. 6B. The cross-sectional shape or structure 420 includes an end wall 422 defining (or machined to define) a plurality of apertures or pores 424. As implicated by FIG. 6B, where the cross-sectional shape or structure 420 is utilized for or as part of the flow interface region 396, the end wall 422 will extend across the outflow end 400 (FIG. 5). With this construction, the apertures 424 serve to permit fluid flow into and out of the end cap 392 (FIG. 5), and act to disrupt or shape the so-delivered fluid flow.

Figure 7A:
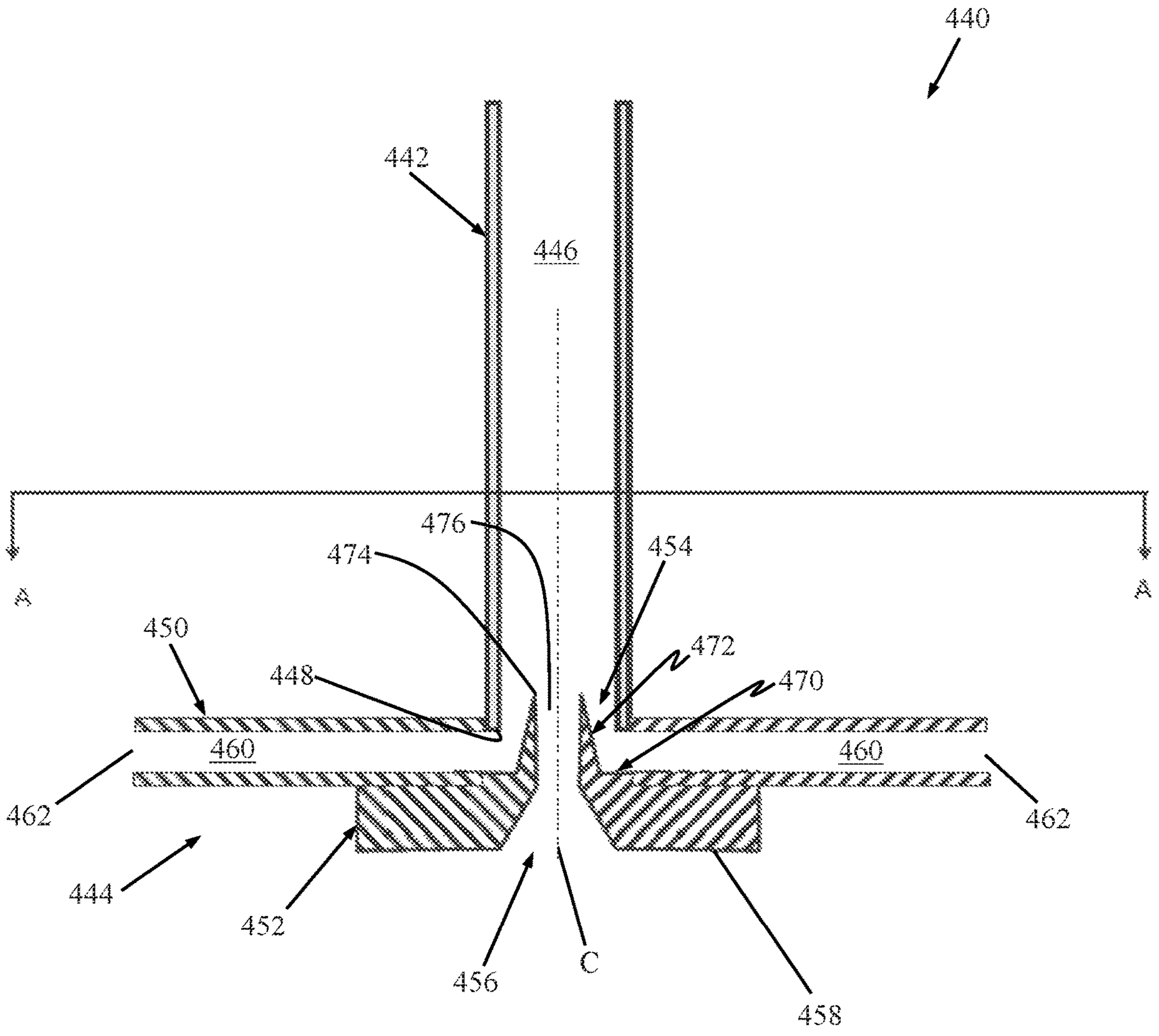
FIG. 7A is a simplified cross-sectional view of portions of another nozzle assembly in accordance with principles of the present disclosure.

Portions of another embodiment of a nozzle assembly 440 in accordance with principles of the present disclosure are shown in FIG. 7A. The nozzle assembly 440 includes an inner or primary tube 442 and an outer housing 444. The primary tube 442 can have any of the forms described above, and defines a flow passage 446 extending to, and open at, an outlet end 448. The outer housing 444 includes a manifold plate 450, an end wall 452, and an interior guide structure 454 (referenced generally). The end wall 452 defines an exit orifice 456 open to an exterior face 458 thereof. The primary tube 442 is mounted relative to the outer housing 444 such that the outlet end 448 is axially aligned with the exit orifice 456. As a point of reference, various features of the nozzle assemblies of the present disclosure can be described with reference to a central (or longitudinal) axis C defined by the primary tube 442 (e.g., as used herein, directional terms such as “axial” and “radial” are relative to the central axis C) alone or as defined by an optional coaxial arrangement of the primary tube 442 and the exit orifice 456.

Figure 7B:
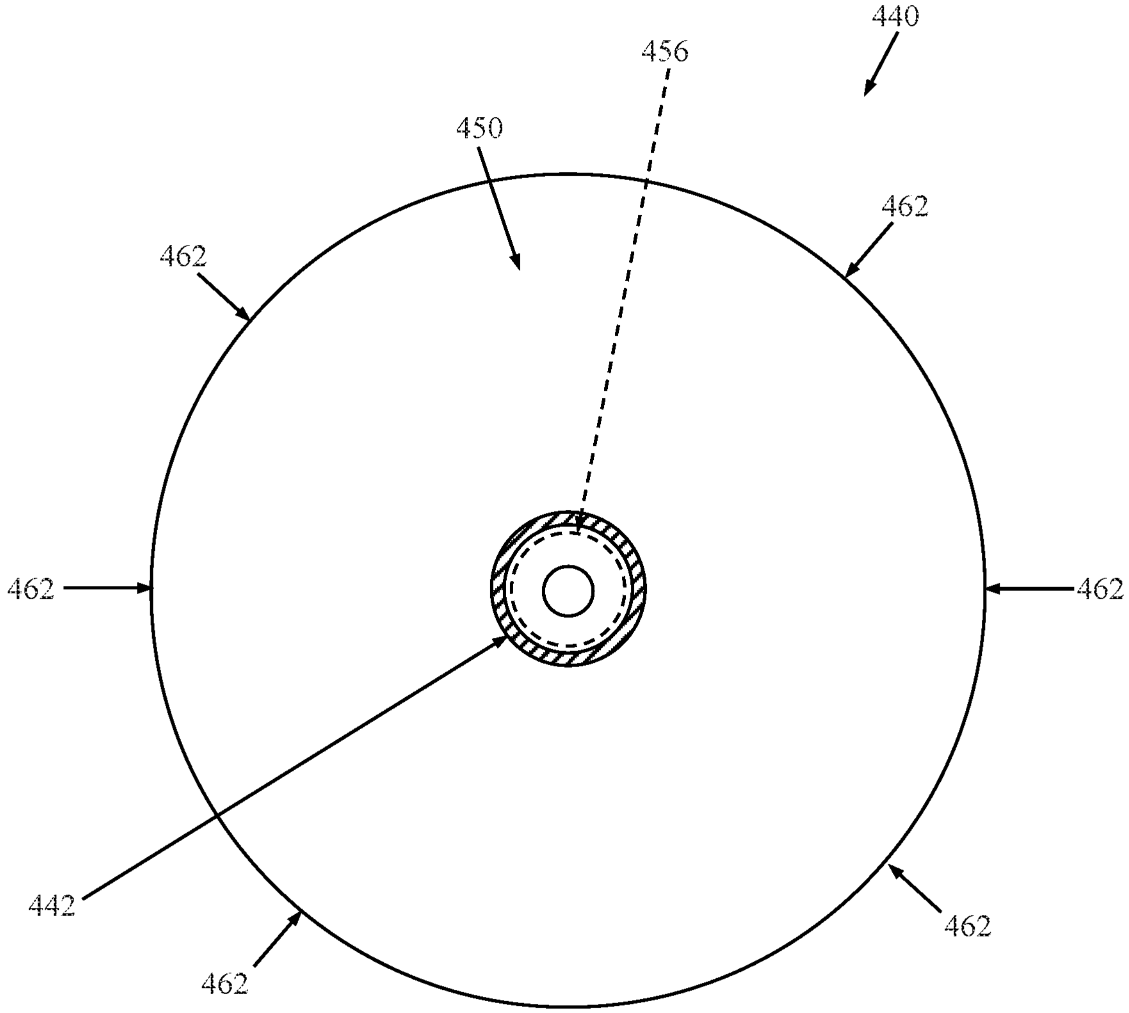
FIG. 7B is a simplified end view of the nozzle assembly of FIG. 7A from the vantage point A-A.

The manifold plate 450 can assume a variety of forms, and in general terms forms or defines a plurality of fluid passageways 460. Upon final assembly, each of the fluid passageways 460 are fluidly open to the flow passage 446 of the primary tube 442 via the interior guide structure 454 as described in greater detail below. In some embodiments, one or more or all of the fluid passageways 460 are substantially radially arranged (i.e., within 10 degrees of a truly radial arrangement) relative to central axis C. Stated otherwise, in some embodiments, a centerline of one or more or all of the fluid passageways 460 are substantially perpendicular (i.e., within 10 degrees of a truly perpendicular arrangement) to the central axis C. Each of the fluid passageways 460 are open to an exterior of the manifold plate 450 at a corresponding port 462 as further identified in FIG. 7B. While FIG. 7B identifies six of the ports 462 (and thus six of the fluid passageways 460), any other number, greater or lesser than six, is equally acceptable. In some embodiments, the manifold plate 450 is configured for direct assembly to the primary tube 442 at the outlet end 448 as shown in FIG. 7A. In other embodiments, the manifold plate 450 can be spaced from the outlet end 448.

The interior guide structure 454 can have any of the forms described in the present disclosure, and generally includes a guide surface 470 and a guide post 472. The guide surface 470 is formed opposite the exterior face 458, and projects or extends radially outwardly from the guide post 472. In some embodiments, the guide surface 470 can be highly flat or planar (e.g., within 10% of a truly flat surface) and defines a plane substantially perpendicular (e.g., within 10% of a truly perpendicular relationship) to the central axis C. The guide surface 470 can have other constructions that may or may not be highly flat or planar, for example a curved configuration. The guide post 472 projects from the guide surface 470 in a direction opposite the exterior face 458 of the end wall 452, terminating at a post end 474. The guide post 472 is axially aligned with the exit orifice 456, and forms a lumen 476 that is open to the exit orifice 456 and the post end 474. A cross-sectional shape or structure of the guide post 472 can assume any of the forms described in the present disclosure. In general terms, the guide post 472 serves to direct fluid flow from the guide face 470 in a desired direction, with the guide post 472 optionally having a tapering outer diameter in extension from the guide face 470 to the post end 474.

The interior guide structure 454 can be integrally formed with the end wall 452; in other embodiments, one or more components of the interior guide structure 454 can be separately formed and subsequently attached to the end wall 452. Regardless, upon final assembly, the manifold plate 450 is arranged relative to the interior guide structure 454 such that fluid flow from each of the fluid passageways 460 progresses in a direction of the guide post 472. Further, the guide post 472 can extend into the primary tube 442. For example, in some embodiments, the post end 474 is located upstream of the outlet end 448 as illustrated. In other embodiments, the post end 474 can be outside of the primary tube 442 (e.g., the post end 474 is spaced from the outlet end 448 in the downstream direction).

Figure 7C:
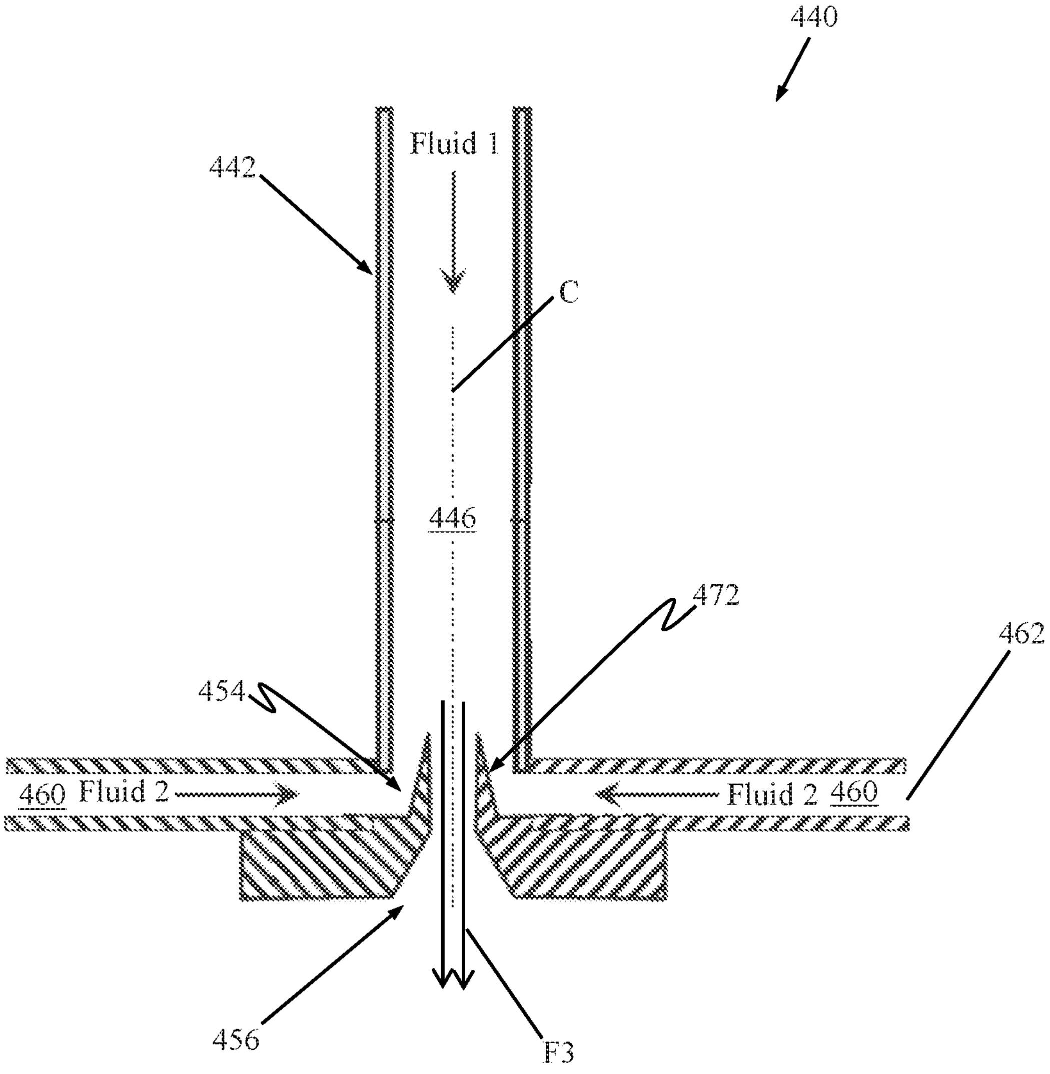
FIG. 7C illustrates use of the nozzle assembly of FIG. 7A in generating a mixed fluid flow.

During use, and as generally reflected by FIG. 7C, a first fluid flow “Fluid 1” (liquid or gas) is conveyed through the flow passage 446 of the primary tube 442 in a direction of the outlet end 448. A second fluid flow “Fluid 2” is conveyed through each of the fluid passageways 460 via the corresponding port 462 and in a direction of the central axis C. Thus, in some embodiments, the first fluid flow Fluid 1 is primarily longitudinal relative to the central axis C, whereas the second fluid flow Fluid 2 is primarily radial relative to the central axis C. The second fluid flow Fluid 2 progressing from each of the fluid passageways 460 is at least partially directed toward the outlet end 448 (identified in FIG. 7A) of the primary tube 442 via the interior guide structure 454, generating a mixed fluid flow F3 adjacent, within, or into the primary tube 442; the mixed fluid flow F3 is then directed or dispensed through the exit orifice 456. The guide post 472 is configured and arranged relative to the outlet end 448 such that at least a portion of the second fluid flow Fluid 2 is directed toward (or into) the outlet end 448 in a direction that is initially opposite, optionally fully opposite, the primary direction of the first fluid flow Fluid 1.

Figure 8A:
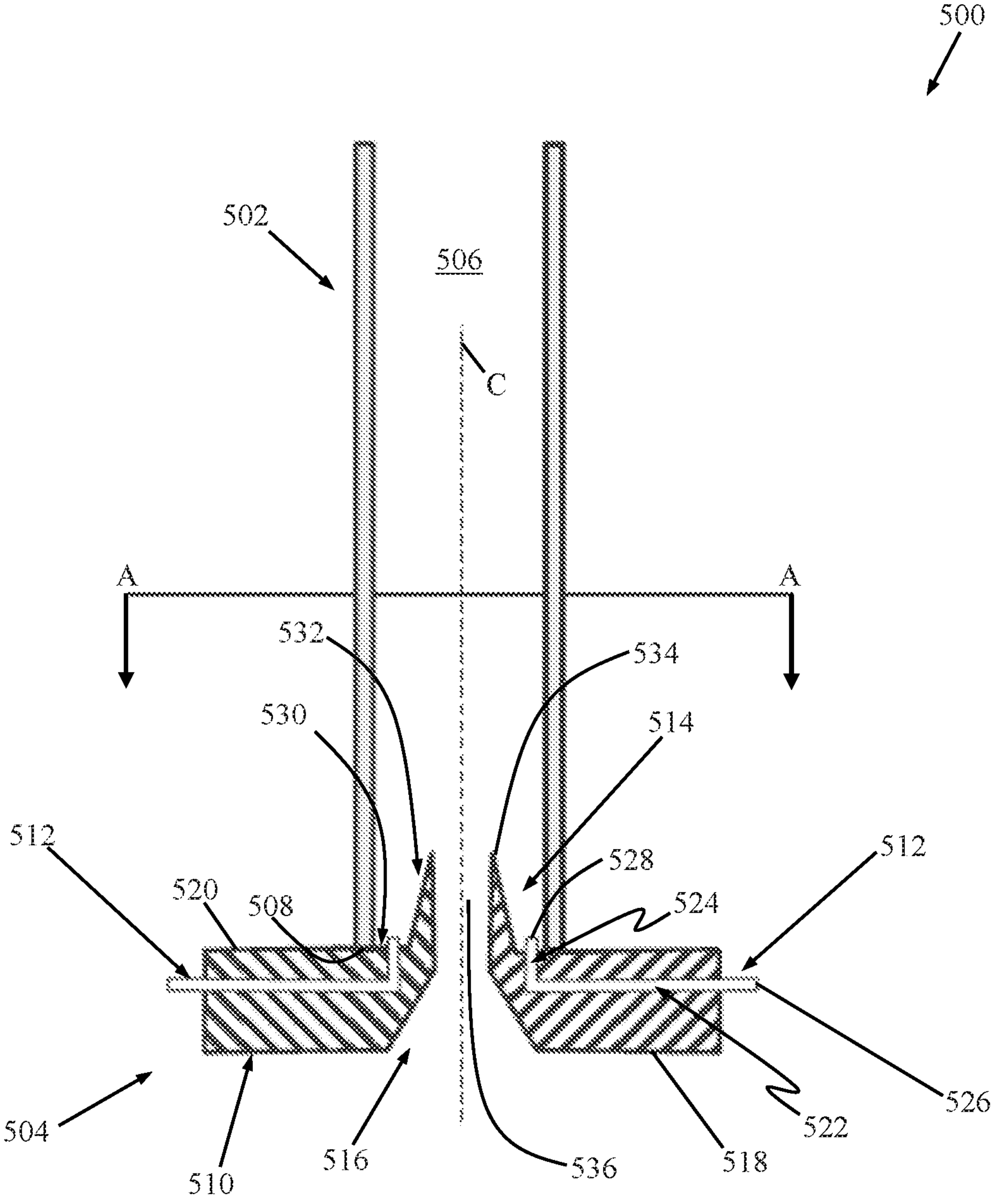
FIG. 8A is a simplified cross-sectional view of portions of another nozzle assembly in accordance with principles of the present disclosure.

Portions of another embodiment of a nozzle assembly 500 in accordance with principles of the present disclosure are shown in FIG. 8A. The nozzle assembly 500 includes an inner or primary tube 502 and an outer housing 504. The primary tube 502 can have any of the forms described above, and defines a flow passage 506 extending to an outlet end 508. The outer housing 504 includes an end wall 510, a plurality of injection tubes 512, and an interior guide structure 514 (referenced generally). The end wall 510 defines an exit orifice 516 open to an exterior face 518 thereof. The primary tube 502 is mounted relative to the outer housing 504 such that a central axis C of the primary tube 502 is axially aligned with the exit orifice 516. As a point of reference, various features of the nozzle assemblies of the present disclosure can be described with reference to the central (or longitudinal) axis C defined by the primary tube 502 (e.g., as used herein, directional terms such as “axial”

and "radial" are relative to the central axis C) alone or as defined by an optional coaxial arrangement of the primary tube 502 and the exit orifice 516.

The end wall 510 can assume various forms, and in some embodiments is configured for attachment to, or connection with, the primary tube 502. For example, in some embodiments, the end wall 510 defines an interior face 520 opposite the exterior face 518 configured to receive the outlet end 508 of the primary tube 502. Other mounting configuration are equally acceptable. Upon final assembly, the flow passage 506 of the primary tube 502 is closed to the interior face 520.

The injection tubes 512 are optionally identical in some embodiments, and can be mounted to the end wall 510 in various fashions (e.g., the end wall 510 can be molded about the injection tubes 512; bores can be formed in the end wall 510 and into which respective ones of the injection tubes 512 are inserted, etc.). In other embodiments, the injections tubes 512 are integrally formed or defined by the end wall 510. Regardless, each of the injection tubes 512 includes or defines a leading segment 522 and a trailing segment 524. The leading segment 522 extends from an inlet port 526 and into a thickness of the end wall 510. In some embodiments, the leading segment 522 of one or more or all of the injection tubes 512 is substantially radially arranged (i.e., within 10 degrees of a truly radial arrangement) relative to central axis C. Stated otherwise, in some embodiments, a centerline of one or more or all of the leading segments 522 is substantially perpendicular (i.e., within 10 degrees of a truly perpendicular arrangement) to the central axis C. The trailing segment 524 extends from the corresponding leading segment 522 to a dispensing end 528 that is otherwise fluidly open to the flow passage 506 of the primary tube 502 via the interior guide structure 514 as described in greater detail below. In some embodiments, the trailing segment 524 of one or more or all of the injection tubes is substantially longitudinally arranged (i.e., within 10 degrees of a truly longitudinal arrangement) relative to central axis C. Stated otherwise, in some embodiments, a centerline of one or more or all of the trailing segments 524 is substantially parallel (i.e., within 10 degrees of a truly parallel arrangement) with the central axis C.

Figure 8B:
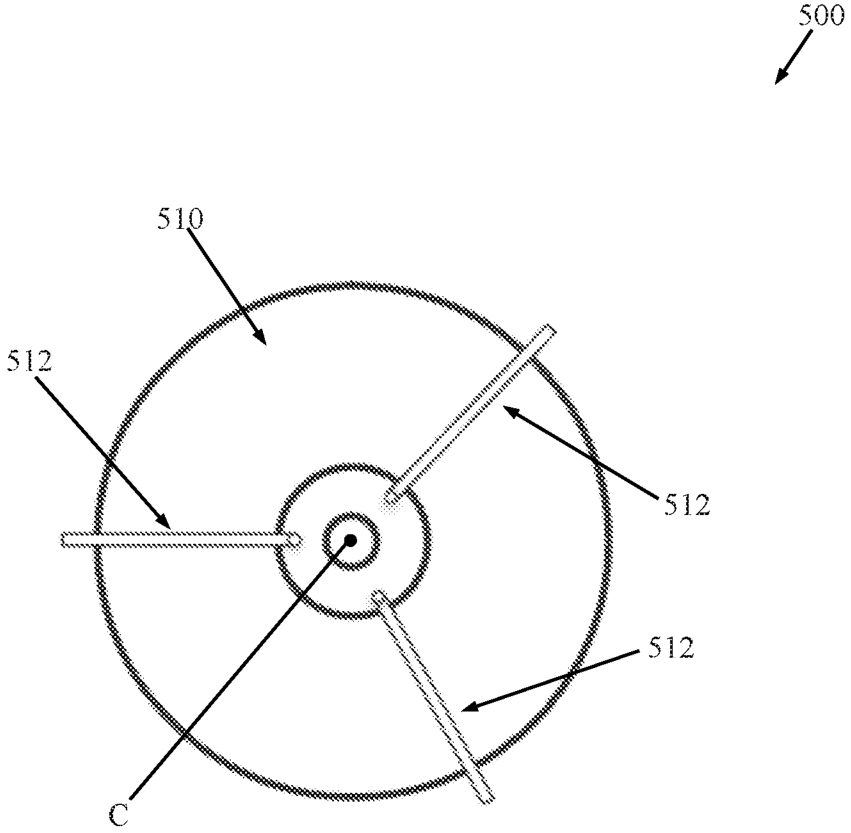
FIG. 8B is a simplified end view of the nozzle assembly of FIG. 8A from the vantage point A-A.

As reflected by FIG. 8B, in some embodiments the injection tubes 512 can be equidistantly spaced from one another relative to the central axis C. Alternatively, a non-symmetrical arrangement can be employed. While FIG. 8B identifies three of the injection tubes 512, any other number, greater or lesser than three, is equally acceptable.

Returning to FIG. 8A, the interior guide structure 514 can have any of the forms described in the present disclosure, and generally includes a guide surface 530 and a guide post 532. The guide surface 530 is formed opposite the exterior face 518, and projects or extends radially outwardly from the guide post 532. In some embodiments, the guide surface 530 can be highly flat or planar (e.g., within 10% of a truly flat surface) and defines a plane substantially perpendicular (e.g., within 10% of a truly perpendicular relationship) to the central axis C. The guide surface 530 can have other constructions that may or may not be highly flat or planar, for example a curved configuration. The guide post 532 projects from the guide surface 530 in a direction opposite the exterior face 518 of the end wall 510, terminating at a post end 534. The guide post 532 is axially aligned with the exit orifice 516, and forms a lumen 536 that is open to the exit orifice 516 and the post end 534. A cross-sectional shape or structure of the guide post 532 can assume any of the forms described in the present disclosure. In general terms, the guide post 532 serves to direct fluid flow from the guide face 530 in a desired direction, with the guide post 532 optionally having a tapering outer diameter in extension from the guide face 530 to the post end 534

The interior guide structure 514 can be integrally formed with the end wall 510; in other embodiments, one or more components of the interior guide structure 514 can be separately formed and subsequently attached to the end wall 510. Regardless, upon final assembly, the injection tubes 512 are arranged relative to the interior guide structure 514 such that the corresponding trailing segment 524 projects through the guide surface 530 such that fluid flow from the dispensing end 528 of each of the injection tubes 512 generally progresses in a direction of the post end 534. Further, the guide post 532 can extend into the primary tube 502. For example, in some embodiments, the post end 534 is located upstream of the outlet end 508 as illustrated.

Figure 8C:
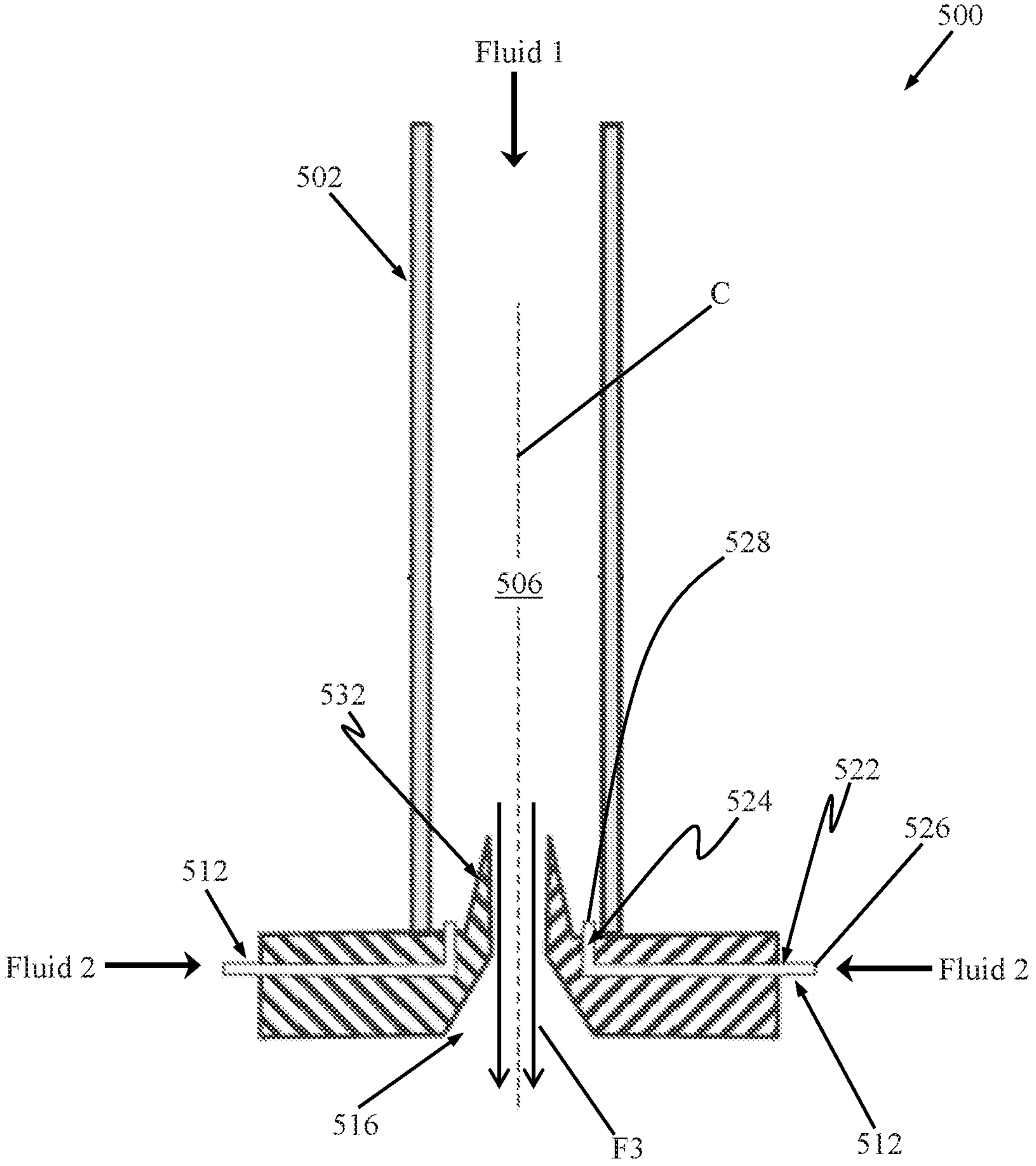
FIG. 8C illustrates use of the nozzle assembly of FIG. 8A in generating a mixed fluid flow.

During use, and as generally reflected by FIG. 8C, a first fluid flow "Fluid 1" (liquid or gas) is conveyed through the flow passage 506 of the primary tube 502 in a direction of the outlet end 508 (labeled in FIG. 8A). A second fluid flow "Fluid 2" is conveyed through each of the injection tubes 512 via the corresponding port 526. As a point of reference, a different fluid can be supplied to two or more of the injection tubes 512. The first fluid flow Fluid 1 is primarily longitudinal relative to the central axis C. The second fluid flow Fluid 2 is initially primarily radial relative to the central axis C along the corresponding leading segment 522, and then is primarily longitudinal along the corresponding trailing segment 524. Thus, a direction of the second fluid flow Fluid 2 as distributed from the corresponding dispensing end 528 is primarily opposite a direction of the first fluid flow Fluid 1. Turbulence can be generated between the opposing flow directions of the first and second fluid flows Fluid 1, Fluid 2 that can enhance mixing. Presence of the guide post 532 at the point of interface between the first and second fluid flows Fluid 1, Fluid 2 further enhances mixing. A mixed fluid flow F3 is generated and is then directed or dispensed through the exit orifice 516.

Figure 9A:
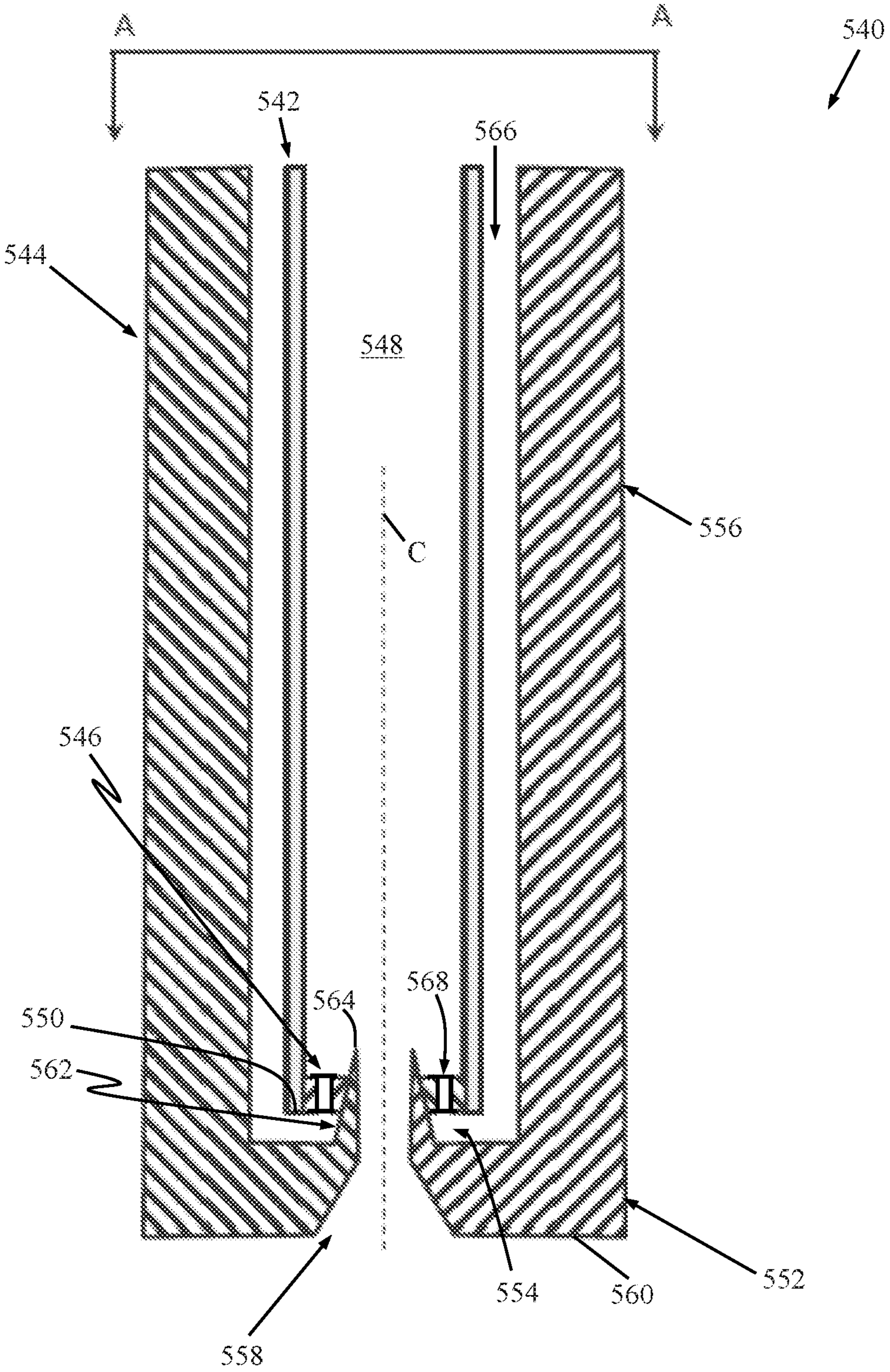
FIG. 9A is a simplified cross-sectional view of portions of another nozzle assembly in accordance with principles of the present disclosure.

Portions of another embodiment of a nozzle assembly 540 in accordance with principles of the present disclosure are shown in FIG. 9A. The nozzle assembly 540 is effectively akin to the nozzle assembly 500 (FIG. 8A), and includes an inner or primary tube 542, an outer housing or outer tube 544, and an injection cap 546. The primary tube 542 can have any of the forms described above, and defines a flow passage 548 extending to an outlet end 550. The outer housing 544 includes an end wall 552, an interior guide structure 554 (referenced generally), and an optional tubular side wall 556. The end wall 552 defines an exit orifice 558 open to an exterior face 560 thereof. The interior guide structure 554 can have any of the forms described in the present disclosure, and includes a guide post 562 projecting from the end wall 552 and terminating at a post end 564. The primary tube 542 is mounted relative to the outer housing 544 such that a central axis C of the primary tube 542 is axially aligned with the exit orifice 558. A fluid passageway 566 is established between the primary tube 542 and the outer housing 544. The injection cap 546 is disposed between the primary tube 542 and the guide post 562. As described in greater detail below, the injection cap 546 is configured to generate or enhance jet flow properties of fluid flow from the fluid passageway 566 into the flow passage 546, which in turn generates or enhances a counterflow mixing pattern between two fluid flows in a manner akin to the descriptions above.

Figure 9B:
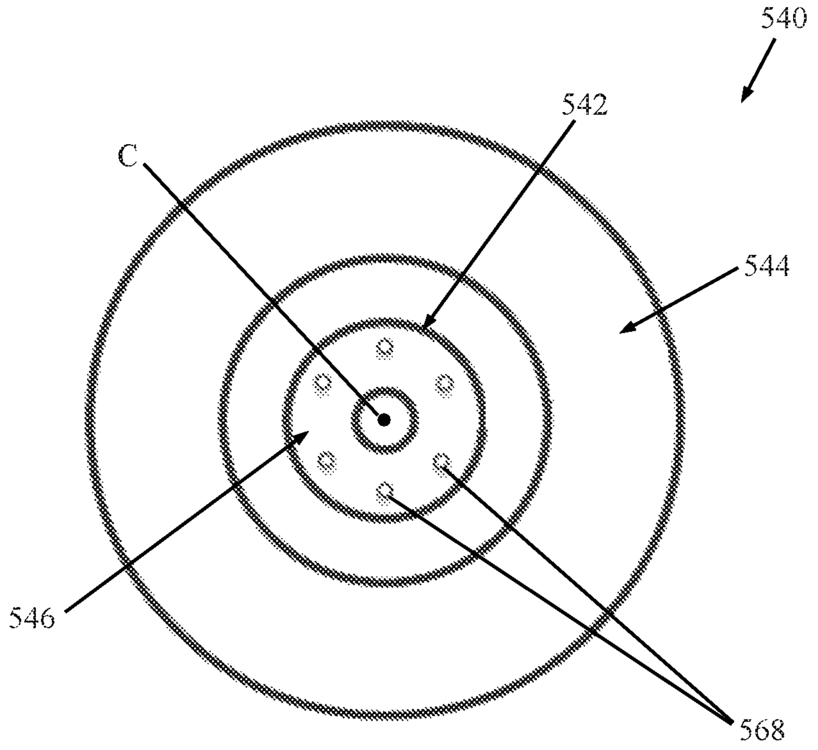
FIG. 9B is a simplified end view of the nozzle assembly of FIG. 9A from the vantage point A-A.

In particular, the injection cap 546 can be a ring-like body, and forms or defines a plurality of nozzles or nozzle openings 568. The injection cap 546 is sized and shaped for sealed assembly between the primary tube 542 and the guide post 562 (e.g., press fit, adhesive, weld, mechanical fastener, etc.). For example, the injection cap 546 can be sized and shaped for mounting at or between the outlet end 550 of the primary tube 542 and the post end 564 of the guide post 562. Regardless, the nozzles 568 are open through a thickness of the injection cap 546. As reflected by FIG. 9B, in some embodiments the nozzles 568 can be equidistantly spaced from one another relative to the central axis C. Alternatively, a non-symmetrical arrangement can be employed. While FIG. 9B illustrates six of the nozzles 568, any other number, greater or lesser than six, is equally acceptable.

Figure 9C:
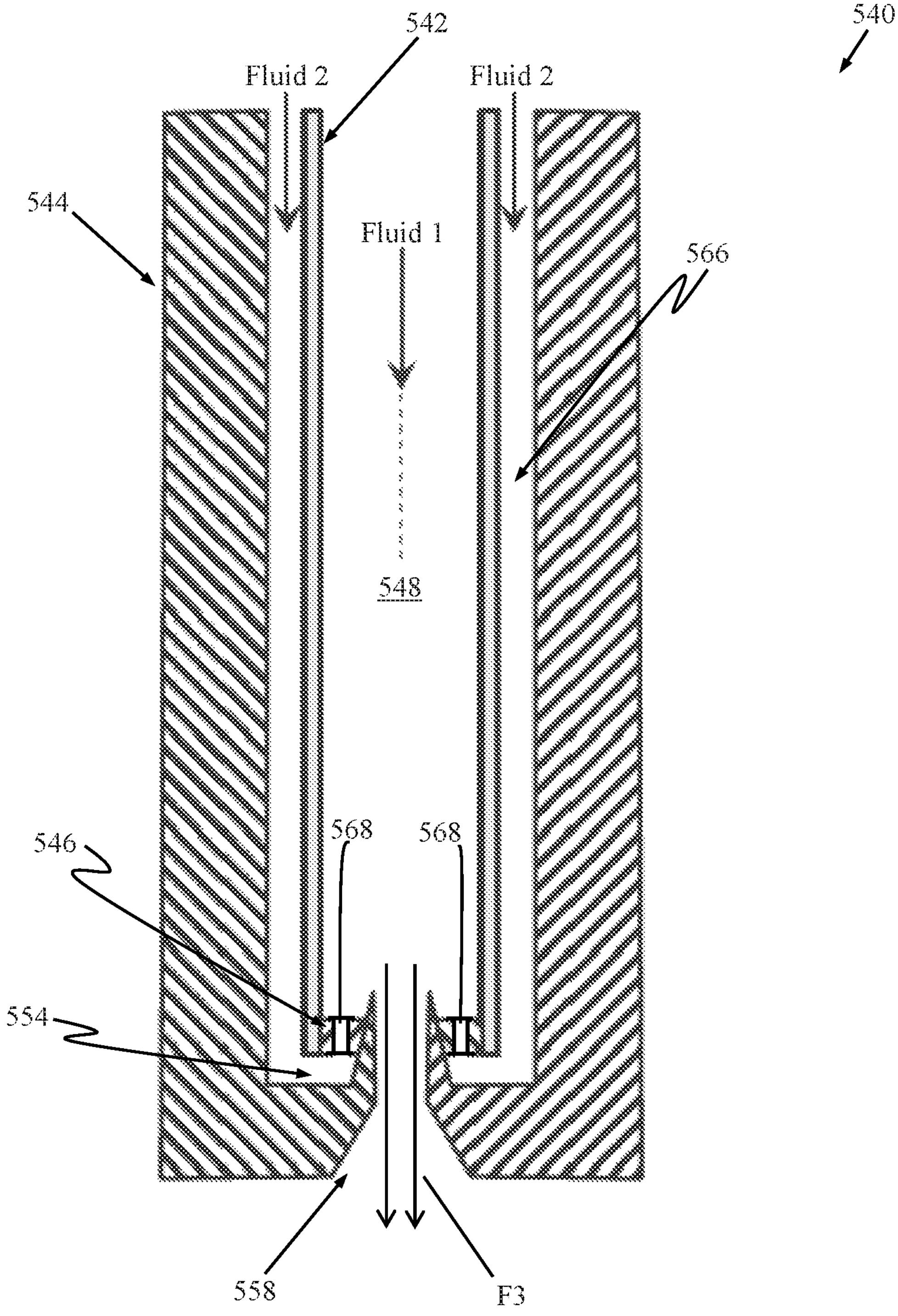
FIG. 9C illustrates use of the nozzle assembly of FIG. 9A in generating a mixed fluid flow.

During use, and as generally reflected by FIG. 9C, a first fluid flow "Fluid 1" (liquid or gas) is conveyed through the flow passage 548 of the primary tube 542 in a direction of the outlet end 550 (labeled in FIG. 9A). A second fluid flow "Fluid 2" is conveyed through the fluid passageway 566 between the primary tube 542 and the outer housing 544. The interior guide structure 554 directs the second fluid flow Fluid 2 toward the injection cap 546. The second fluid flow Fluid 2 progresses through the nozzles 568; because a size or diameter of the nozzles 568 individually and collectively is less than a size of the fluid passageway 566, the second fluid flow Fluid 2 exits the nozzles 568 and enters the flow passage 548 of the primary tube at a higher velocity akin to jet flow. Further, at a region of interface within the primary tube 542, a flow direction of the first fluid flow Fluid 1 is primarily opposite a flow direction of the second fluid flow Fluid 2. Turbulence can be generated between the opposing flow directions of the first and second fluid flows Fluid 1, Fluid 2 and the jet flow of the second fluid flow Fluid 2 that can enhance mixing. Presence of the guide post 562 at the point of interface between the first and second fluid flows Fluid 1, Fluid 2 further enhances mixing. A mixed fluid flow F3 is generated and is then directed or dispensed through the exit orifice 558.

Figure 10A:
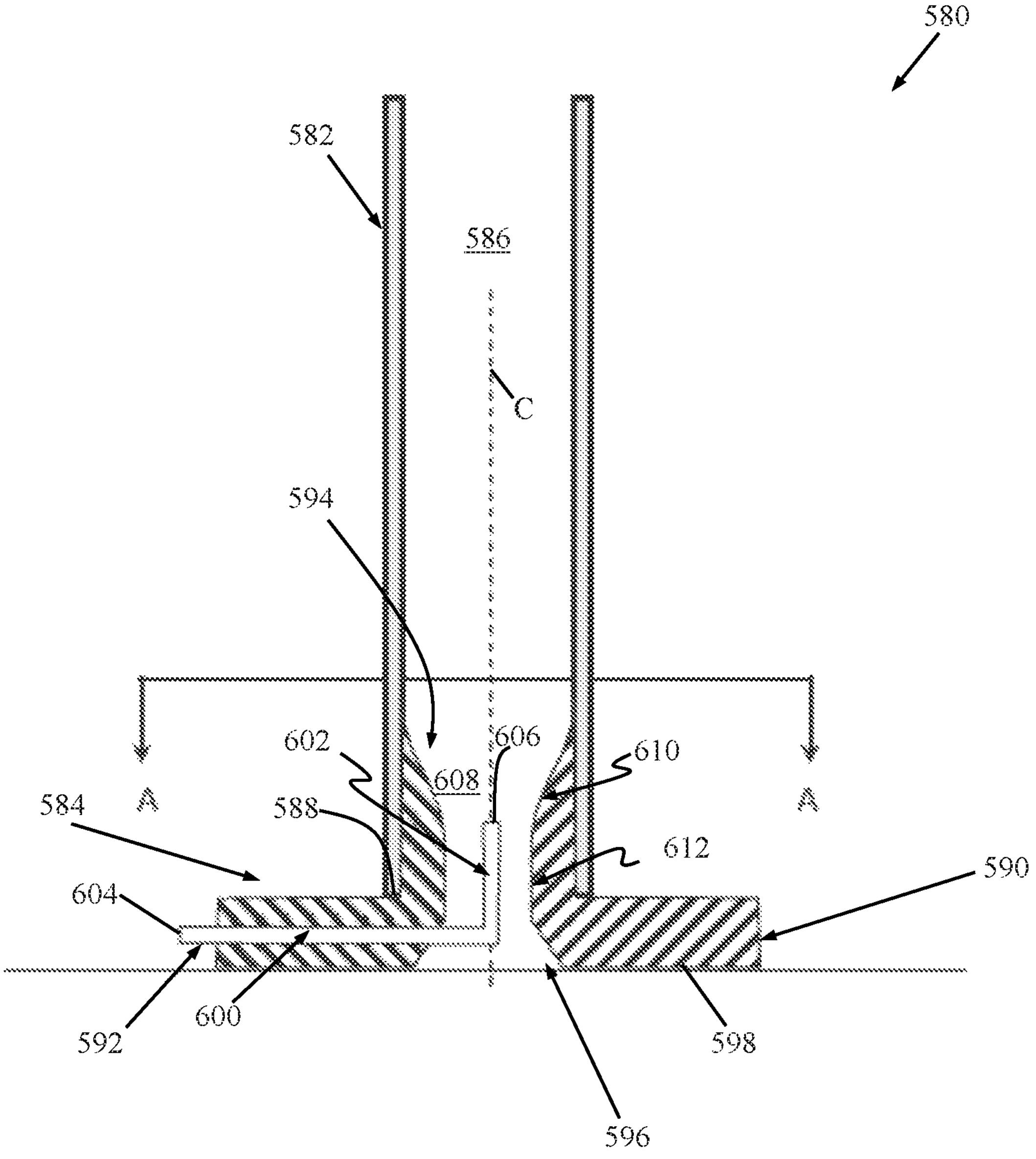
FIG. 10A is a simplified cross-sectional view of portions of another nozzle assembly in accordance with principles of the present disclosure.

Portions of another embodiment of a nozzle assembly 580 in accordance with principles of the present disclosure are shown in FIG. 10A. The nozzle assembly 580 includes an inner or primary tube 582 and an outer housing 584. The primary tube 582 can have any of the forms described in the present disclosure, and defines a flow passage 586 extending to an outlet end 588. The outer housing 584 includes an end wall 590, an injection tube 592, and an interior guide structure 594 (referenced generally). The end wall 590 defines an exit orifice 596 open to an exterior face 598 thereof. The primary tube 582 is mounted relative to the outer housing 584 such that a central axis C of the primary tube 582 is axially aligned with the exit orifice 596. As a point of reference, various features of the nozzle assemblies of the present disclosure can be described with reference to the central (or longitudinal) axis C defined by the primary tube 582 (e.g., as used herein, directional terms such as "axial" and "radial" are relative to the central axis C) alone or as defined by an optional coaxial arrangement of the primary tube 582 and the exit orifice 596.

Figure 10B:
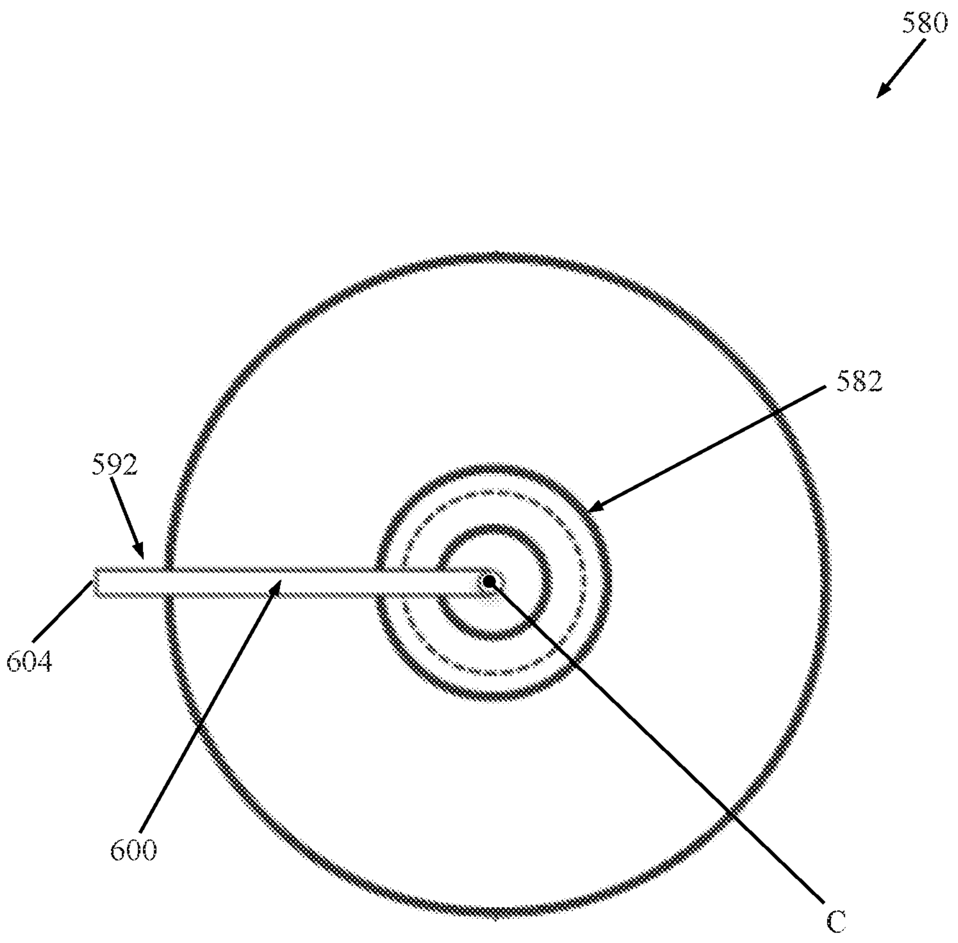
FIG. 10B is a simplified end view of the nozzle assembly of FIG. 10A from the vantage point A-A.

The injection tube 592 can be mounted to the end wall 590 in various fashions (e.g., the end wall 590 can be molded about the injection tube 592; a bore can be formed in the end wall 590 and into which the injection tubes 592 is inserted, etc.). In other embodiments, the injection tube 592 is integrally formed or defined by the end wall 590. Regardless, the injection tube 592 includes or defines a leading segment 600 and a trailing segment 602. The leading segment 600 extends from an inlet port 604 and into a thickness of the end wall 590. In some embodiments, the leading segment 600 is substantially radially arranged (i.e., within 10 degrees of a truly radial arrangement) relative to central axis C. Stated otherwise, in some embodiments, a centerline the leading segment 600 can be substantially perpendicular (i.e., within 10 degrees of a truly perpendicular arrangement) to the central axis C. The trailing segment 602 extends from the leading segment 600 to a dispensing end 606 that is otherwise fluidly open to the flow passage 586 of the primary tube 582. In some embodiments, the trailing segment 602 is substantially longitudinally arranged (i.e., within 10 degrees of a truly longitudinal arrangement) relative to central axis C. Stated otherwise, in some embodiments, a centerline of the trailing segment 602 can be substantially parallel (i.e., within 10 degrees of a truly parallel arrangement) with the central axis C. In related embodiments, the trailing segment 602 can be co-axial with the central axis C (e.g., the centerline of the trailing segment 602 is co-axial with the central axis C). An optional arrangement of the injection tube 592 relative to the primary tube 582 is further illustrated in FIG. 10B.

Returning to FIG. 10A, the interior guide structure 594 projects from the end wall 590 and into the flow passage 586 of the primary tube 582. The interior guide structure 594 defines a passageway 608 that is open to the flow passage 586 and the exit orifice 596. More particularly, the passageway 608 represents a reduction in a size or diameter of a fluid flow path relative to a size or diameter of the flow passage 586, for example along a converging region 610 and a throat region 612. A size or diameter of the passageway 608 tapers or reduces in a direction of the exit orifice 596 along the converging region 610. The size or diameter of the passageway 608 is relatively uniform along the throat region 612, and then expands to the exit orifice 596. In some embodiments, the injection tube 592 is located such that the dispensing end 606 is radially aligned with a transition of the passageway 608 from the converging region 610 to the throat region 612.

Figure 10C:
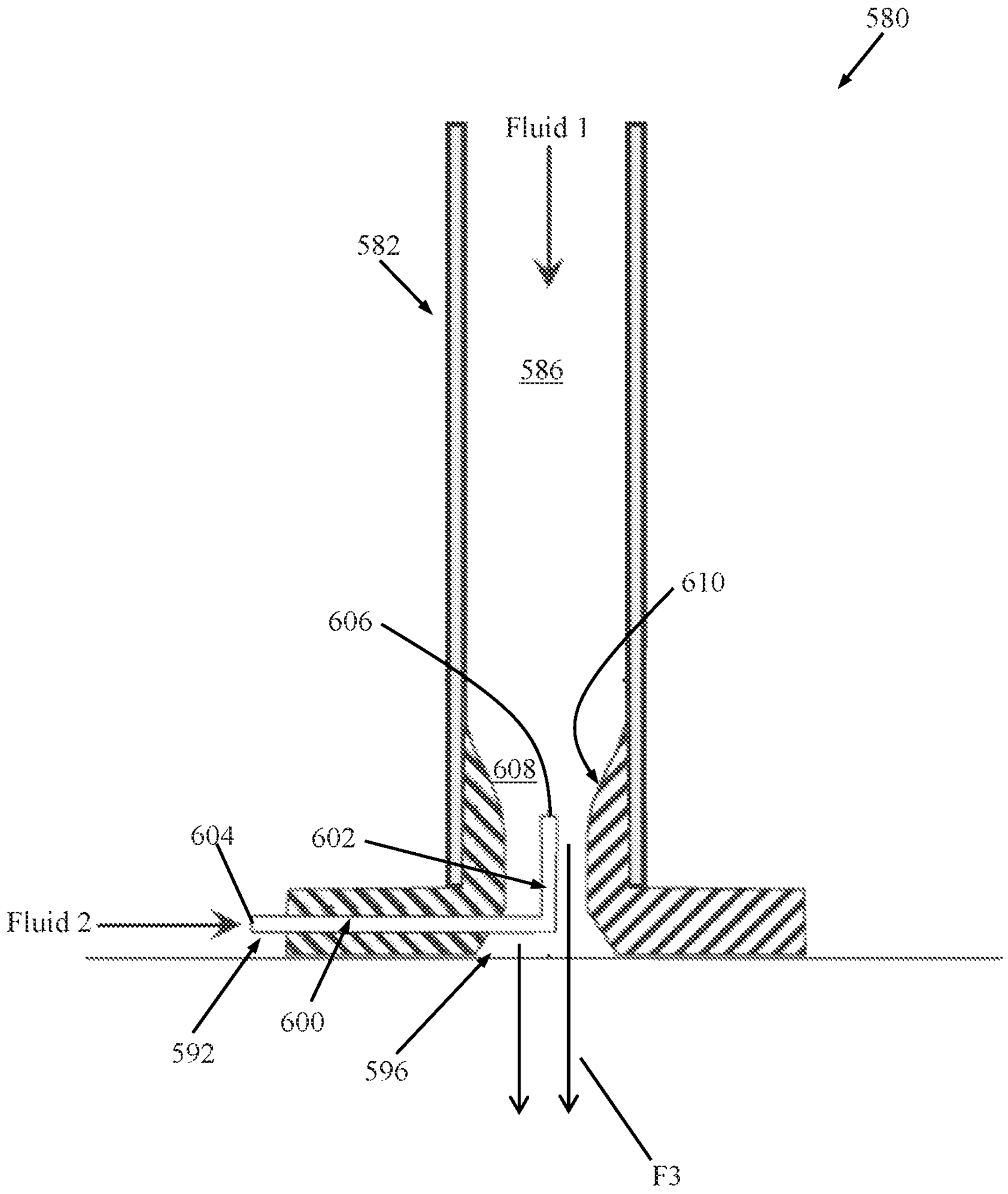
FIG. 10C illustrates use of the nozzle assembly of FIG. 10A in generating a mixed fluid flow.

During use, and as generally reflected by FIG. 10C, a first fluid flow "Fluid 1" (liquid or gas) is conveyed through the flow passage 586 of the primary tube 582 in a direction of the outlet end 588 (labeled in FIG. 10A). A second fluid flow "Fluid 2" is conveyed through the injection tube 592 via the inlet port 604 and into the passageway 608. The first fluid flow Fluid 1 is primarily longitudinal relative to the central axis C. The second fluid flow Fluid 2 is initially primarily radial relative to the central axis C along the leading segment 600, and then is primarily longitudinal along the trailing segment 602. Thus, a direction of the second fluid flow Fluid 2 as distributed from the corresponding dispensing end 606 is primarily opposite a direction of the first fluid flow Fluid 1. Turbulence can be generated between the opposing flow directions of the first and second fluid flows Fluid 1, Fluid 2 that can enhance mixing. A reducing or tapering size or diameter of the passageway 608 along the converging region 610 at the point of interface between the first and second fluid flows Fluid 1, Fluid 2 further enhances mixing. A mixed fluid flow F3 is generated and is then directed or dispensed through the exit orifice 596. In some embodiments, the dispensed or sprayed mixed fluid flow F3 can have a hollow, cone-like shape.

Figure 11:
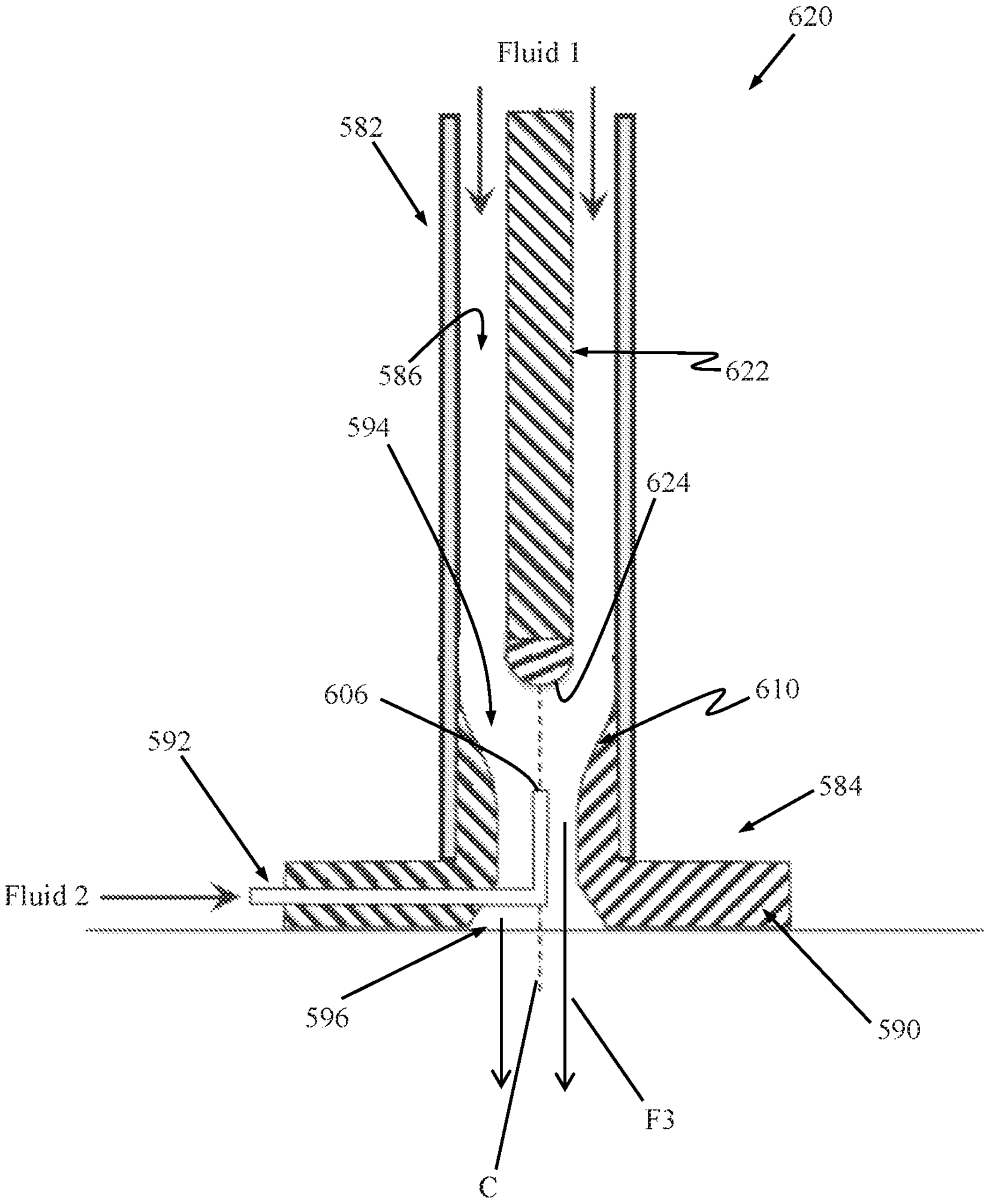
FIG. 11 is a simplified cross-sectional view of portions of another nozzle assembly in accordance with principles of the present disclosure.

Portions of another embodiment of a nozzle assembly 620 in accordance with principles of the present disclosure are shown in FIG. 11. The nozzle assembly 620 is highly akin to the nozzle assembly 580 (FIG. 10A) described above, and includes the inner or primary tube 582 and the outer housing 584 (including the end wall 590, the injection tube 592 and the interior guide structure 594 as described above). In addition, the nozzle assembly 620 includes a constriction body 622. The constriction body 622 is disposed within the flow passage 586 of the primary tube 582, and terminates in a tip end 624. In some embodiments, the constriction body 622 can be, or can be akin to, a solid cylinder rod, and is co-axially positioned relative to the primary tube 582 (e.g., a longitudinal axis of the constriction body 622 is co-axial with the central axis C). Upon final assembly, the constriction body 622 is positioned such that the tip end 624 is spaced from the dispensing end 606 of the injection tube 592, and can be located, for example, immediately adjacent or slightly "upstream" of the converging region 610. In some embodiments, the tip end 624 can have a generally hemispherical shape as illustrated, although any other shape is also envisioned.

With the above construction, the constriction body 622 may assist in reducing the likelihood of stagnant flow during use of the nozzle assembly 620. Commensurate with the descriptions above, the first fluid flow Fluid 1 is conveyed through the flow passage 586 of the primary tube 582 in a direction of the outlet end 588 (labeled in FIG. 10A). The diverter body 622 lessens the open or available area of the flow passage 586; as the first fluid flow Fluid 1 progresses to and beyond the tip end 624, the open or available area of the flow passage 586 increases (as the diverter body 622 is no longer present) and a static pressure of the first fluid flow Fluid 1 increases. The second fluid flow Fluid 2 is conveyed through the injection tube 592 and into the passageway 608 in a direction opposite or reverse of the direction of the first fluid flow Fluid 1 as described above. A mixed fluid flow F3 is generated and is then directed or dispensed through the exit orifice 596 as described above. The increased pressure of the first fluid flow Fluid 1 at the point of interface with the second fluid flow Fluid 2 can minimize the possible occurrence of a stagnant flow.

Figure 12A:
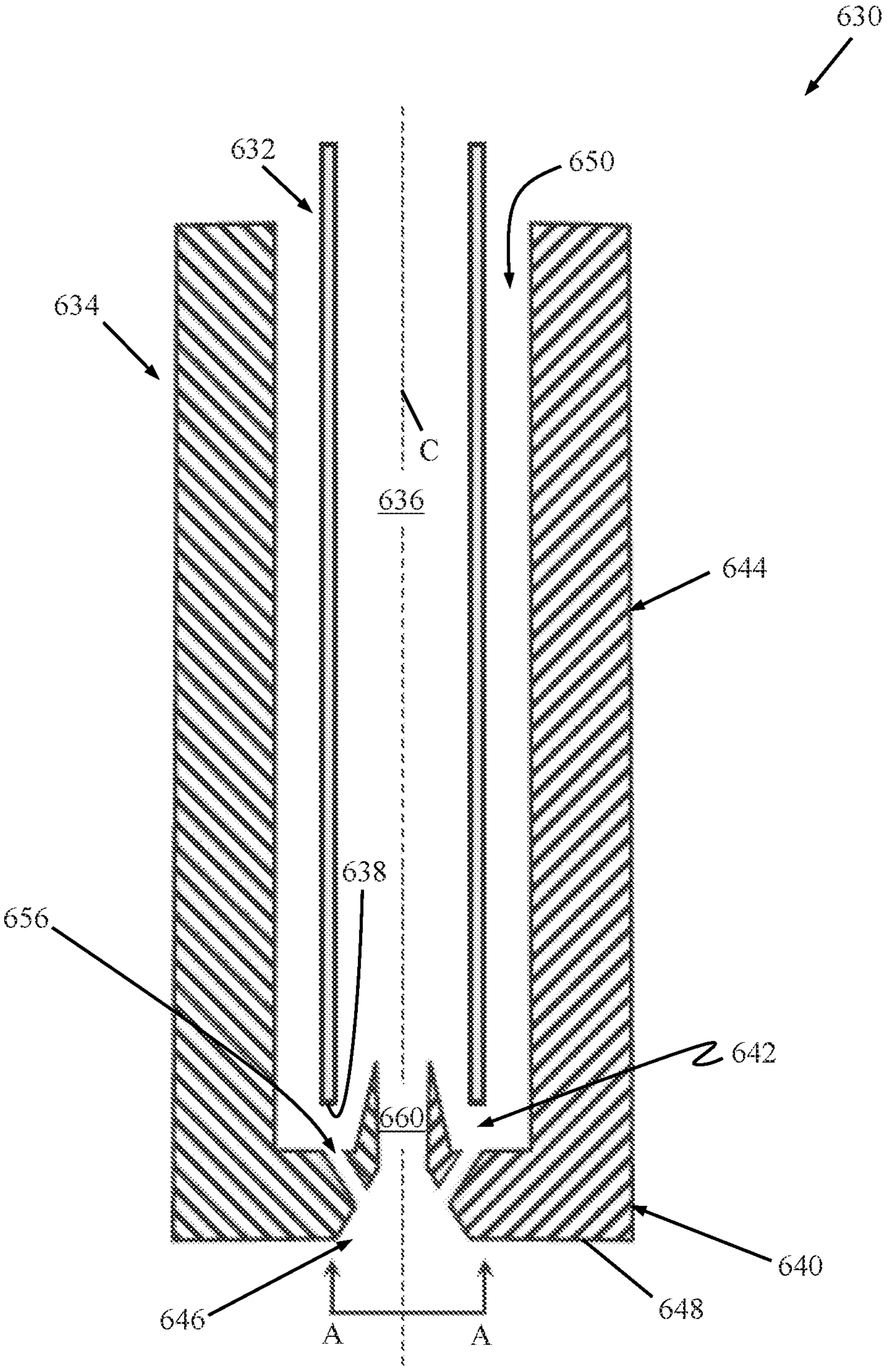
FIG. 12A is a simplified cross-sectional view of portions of another nozzle assembly in accordance with principles of the present disclosure.

Portions of another embodiment of a nozzle assembly 630 in accordance with principles of the present disclosure are shown in FIG. 12A. The nozzle assembly 630 includes an inner or primary tube 632 and an outer housing or outer tube 634. The primary tube 632 can have any of the forms described in the present disclosure, and defines a flow passage 636 extending to an outlet end 638. The outer housing 634 includes an end wall 640, an interior guide structure 642 (referenced generally), and an optional tubular side wall 644. The end wall 640 defines an exit orifice 646 open to an exterior face 648 thereof. The primary tube 632 is mounted relative to the outer housing 634 such that a central axis C of the primary tube 632 is axially aligned with the exit orifice 646. Further, a fluid passageway 650 is defined between the side wall 644 and the primary tube 632.

Figure 12B:
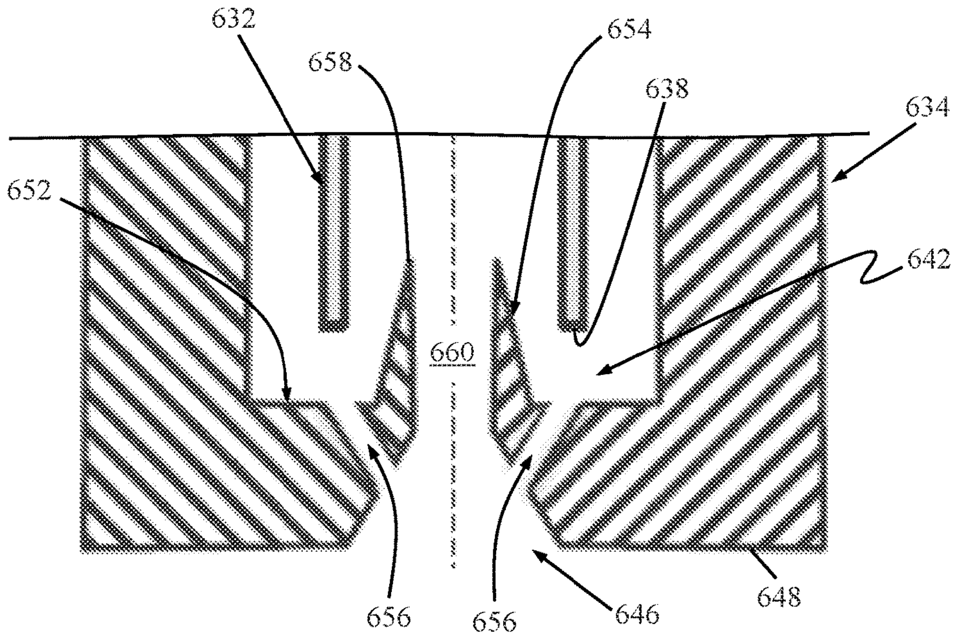
FIGS. 12B and 12C are enlarged views of a portion of the nozzle assembly of FIG. 12A.

With reference to FIG. 12B, the interior guide structure 642 includes or defines a guide surface 652, a guide post 654 and a plurality of diversion apertures 656. The guide surface 652 is formed opposite the exterior face 648, and projects or extends radially outwardly from the guide post 654. In some embodiments, the guide surface 652 can be highly flat or planar (e.g., within 10% of a truly flat surface) and defines a plane substantially perpendicular (e.g., within 10% of a truly perpendicular relationship) to the central axis C. The guide surface 652 can have other constructions that may or may not be highly flat or planar, for example a curved configuration. The guide post 654 can have any of the forms described in the present disclosure and projects from the guide surface 652 in a direction opposite the exterior face 648, terminating at a post end 658. The guide post 654 is axially aligned with the exit orifice 646, and forms a lumen 660 that is open to the exit orifice 646 and the post end 658. A cross-sectional shape or structure of the guide post 654 can assume any of the forms described in the present disclosure. In some embodiments, the guide post 654 extends into the primary tube 632. For example, in some embodiments, the post end 658 is located upstream of the outlet end 638 as illustrated. In other embodiments, the post end 658 can be outside of the primary tube 632 (e.g., the post end 658 is spaced from the outlet end 638 in the downstream direction).

Figure 12C:
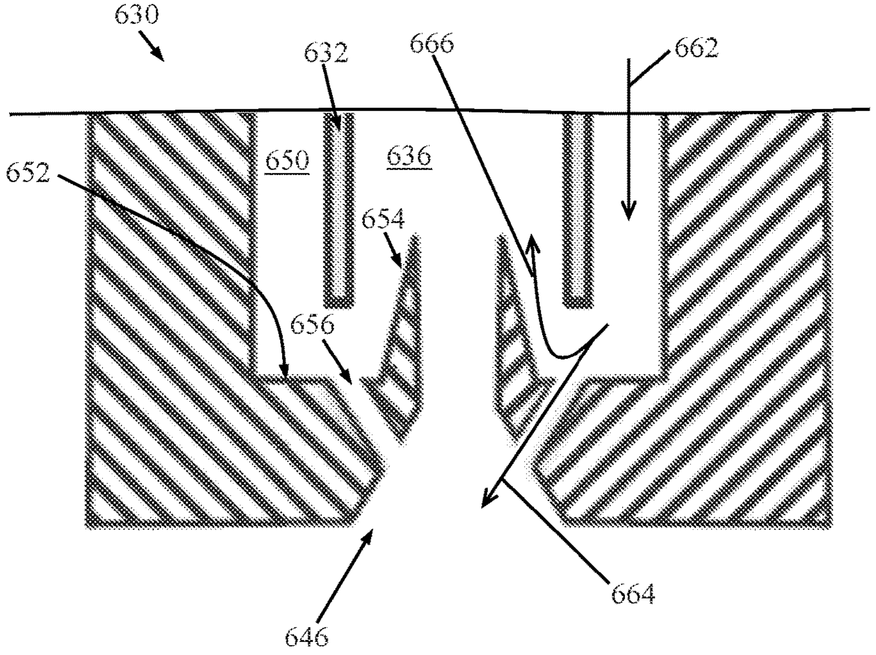

The diversion apertures 656 each extend through a thickness of the outer housing 634, and are open at the guide surface 652. Further, each of the diversion apertures 656 are fluidly open to the exit orifice 646. With this construction and as illustrated in FIG. 12C, fluid flowing along the fluid passageway 650 (represented by arrow 662) in a direction of the guide surface 652 will partially exhaust from the nozzle assembly 630 prior to attaining the flow passage 636 of the primary tube 632. In particular, a first portion (represented by arrow 664) flows through the diversion apertures 656 and flows to the exit orifice 646; a second portion (represented by arrow 666) is directed into the flow passage 636 via the guide surface 652 and the guide post 654 commensurate with other embodiments.

Figure 13A:
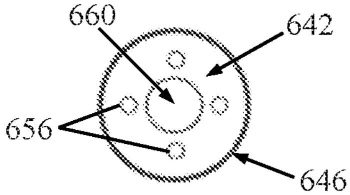
FIG. 13A is a simplified end view of a portion of the nozzle assembly of FIG. 12A from the vantage point A-A.
Figure 13B:
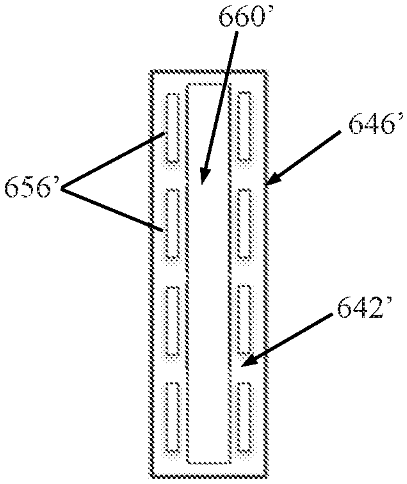
FIGS. 13B and 13C are simplified end view of alternative constructions useful with the nozzle assembly of FIG. 12A.
Figure 13C:
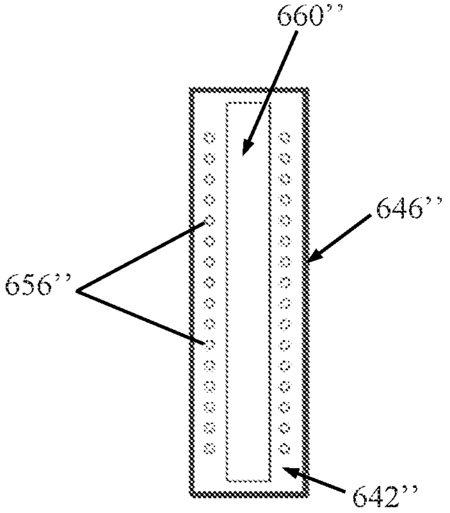

Returning to FIG. 12A, the exit orifice 646 can have a variety of shapes and sizes, and the interior guide structure 642 can assume a variety of shapes and sizes in forming the guide post lumen 660 and the diversion apertures 656. One example is provided in FIG. 13A that otherwise schematically illustrates features of the interior guide structure 642 and the exit orifice 646 taken from the vantage point indicated at A-A in FIG. 12A. As shown, the exit orifice 646 can have a circular shape, and the interior guide structure 642 forms the lumen 660 to also be circular in cross-section. The diversion apertures 656 can be equidistantly spaced from one another about the lumen 660. An alternative embodiment exit orifice 646' and interior guide structure 642' is shown in FIG. 13B. The exit orifice 646' and the lumen 660' can have corresponding, elongated shapes (e.g., akin to a rectangle). The diversion apertures 656' are located adjacent the long sides of the lumen 660' and can be elongated (as compared to the shape of the diversion apertures 656 in FIG. 13A). Yet another alternative embodiment exit orifice 646" and interior guide structure 642" is shown in FIG. 13C. The exit orifice 646" and the lumen 660" can have the corresponding, elongated shapes as described above, whereas the diversion apertures 656" can be circular.

Figure 14:
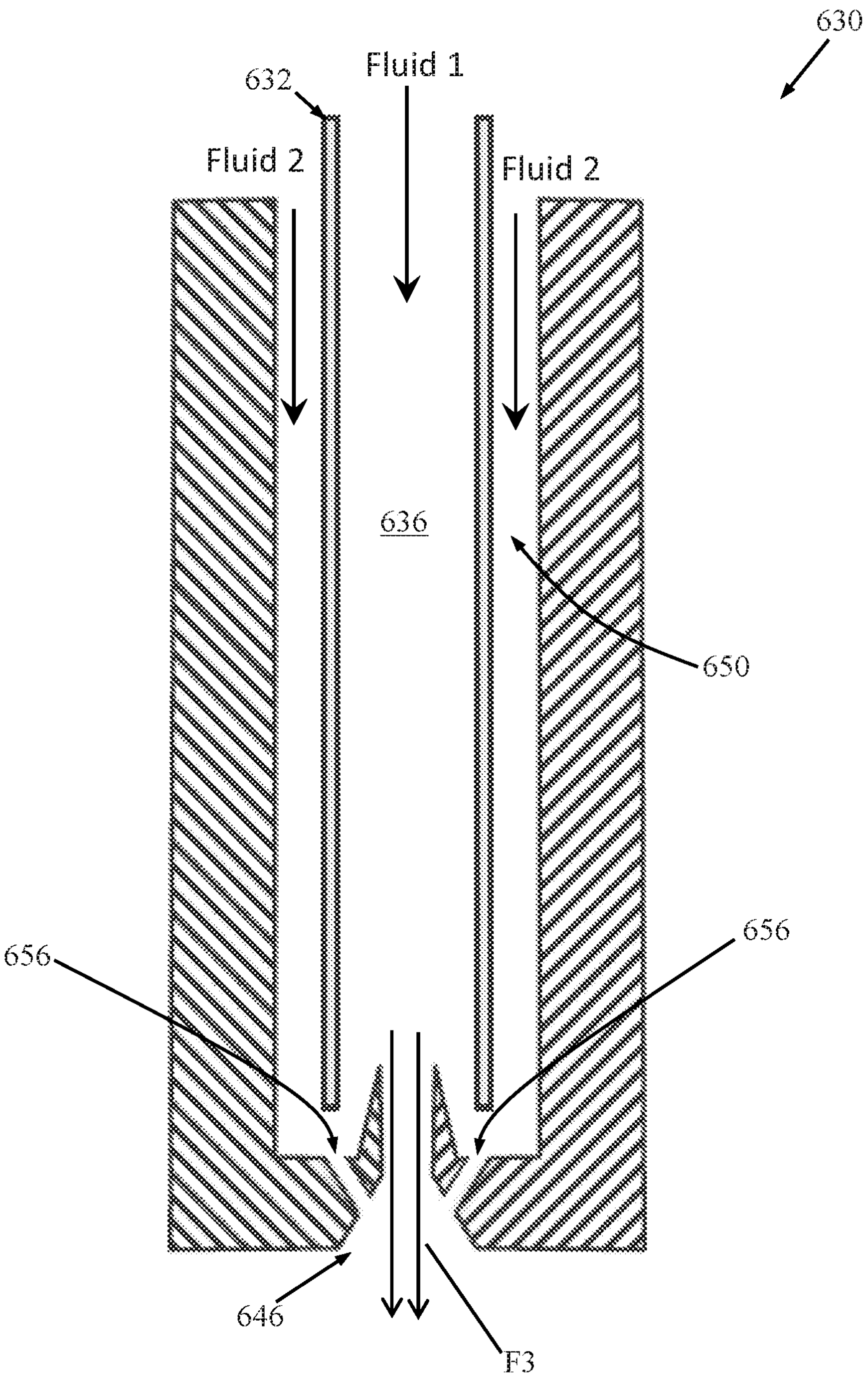
FIG. 14 illustrates use of the nozzle assembly of FIG. 12A in generating a mixed fluid flow.

During use, and as generally reflected by FIG. 14, a first fluid flow "Fluid 1" (liquid or gas) is conveyed through the flow passage 636 of the primary tube 632 in a direction of the outlet end 638 (identified in FIG. 12A). A second fluid flow "Fluid 2" is conveyed through the fluid passageway 650. A first portion of the second fluid flow Fluid 2 is diverted to the exit orifice 646 via the diversion apertures 656, and a second portion of the second fluid flow Fluid 2 is directed into the flow passage 636 of the primary tube 632 (in a direction generally the reverse of the direction of the first fluid flow Fluid 1) generating a mixed fluid flow F3 adjacent, within, or into the primary tube 632. The mixed fluid flow F3 is directed or dispensed through the exit orifice 646, and may partially combine with or entrain the diverted portion of the second fluid flow Fluid 2.

Figure 15A:
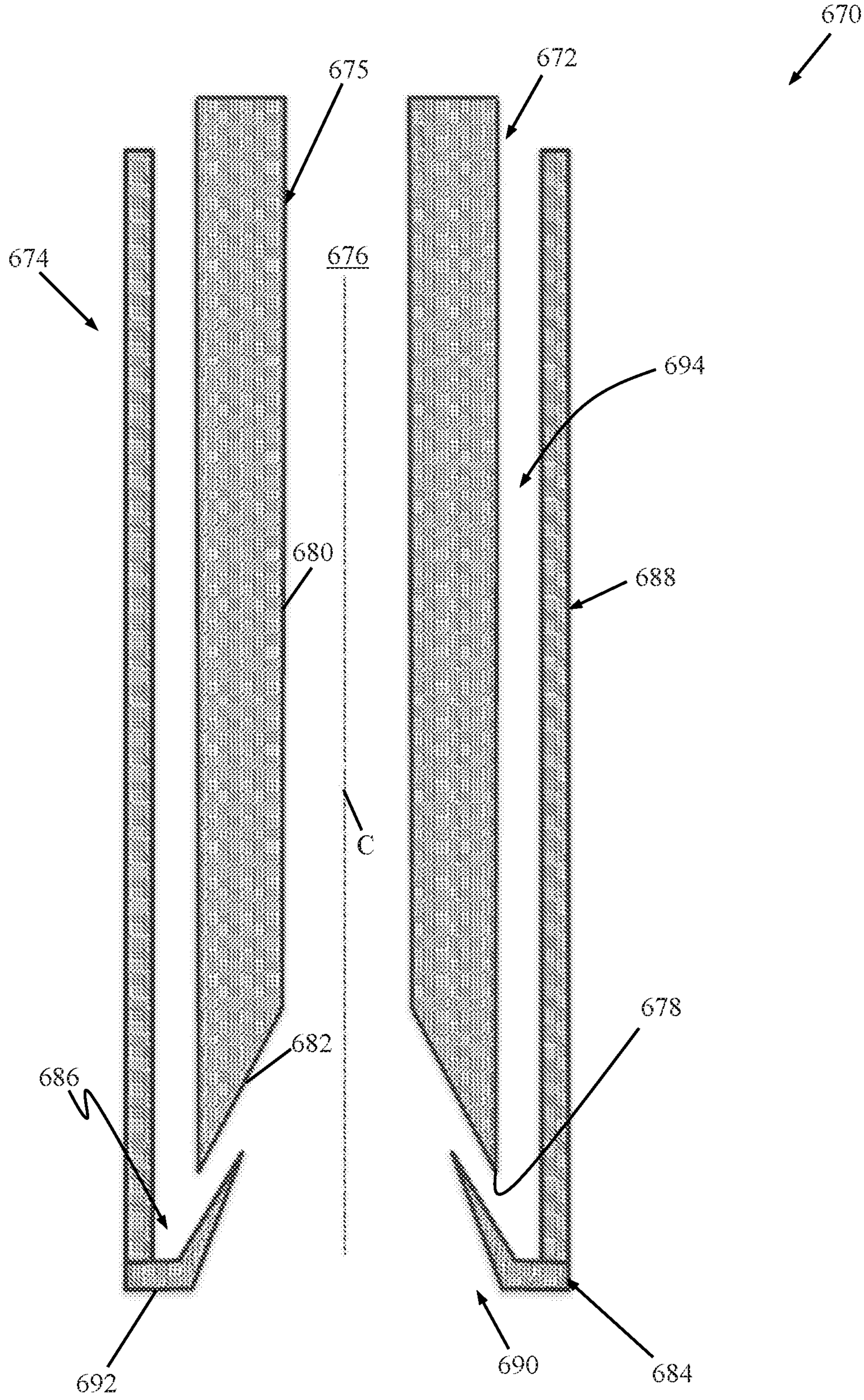
FIG. 15A is a simplified cross-sectional view of portions of another nozzle assembly in accordance with principles of the present disclosure.

Portions of another embodiment of a nozzle assembly 670 in accordance with principles of the present disclosure are shown in FIG. 15A. The nozzle assembly 670 includes an inner or primary tube 672 and an outer housing or outer tube 674. While in some respects, the nozzle assembly 670 is akin to other embodiments of the present disclosure, with the nozzle assembly 670, mixing between two fluid flows occurs generally outside of the primary tube 672.

The primary tube 672 can generally have any of the forms described in the present disclosure, and includes an interior face 675 defining a flow passage 676 extending to an outlet end 678. In this regard, a shape or size of the flow passage 676 can vary along a length thereof. In particular, the primary tube 672 can be viewed as defining an intermediate region 680 and an outlet region 682. A size or diameter of the flow passage 676 along the intermediate region 680 can be substantially uniform. A size or diameter of the flow passage 676 expands or diverges along the outlet region 682 to the outlet end 678. That is to say, a size or diameter of the flow passage 676 at the outlet end 678 is greater than the size or diameter along the intermediate region 680.

The outer housing 674 includes an end wall 684, an interior guide structure 686 (referenced generally), and an optional tubular side wall 688. The end wall 684 defines an exit orifice 690 open to an exterior face 692 thereof. The primary tube 672 is mounted relative to the outer housing 674 such that a central axis C of the primary tube 672 is axially aligned with the exit orifice 690. Further, a fluid passageway 694 is defined between the side wall 688 and the primary tube 672.

Figure 15B:
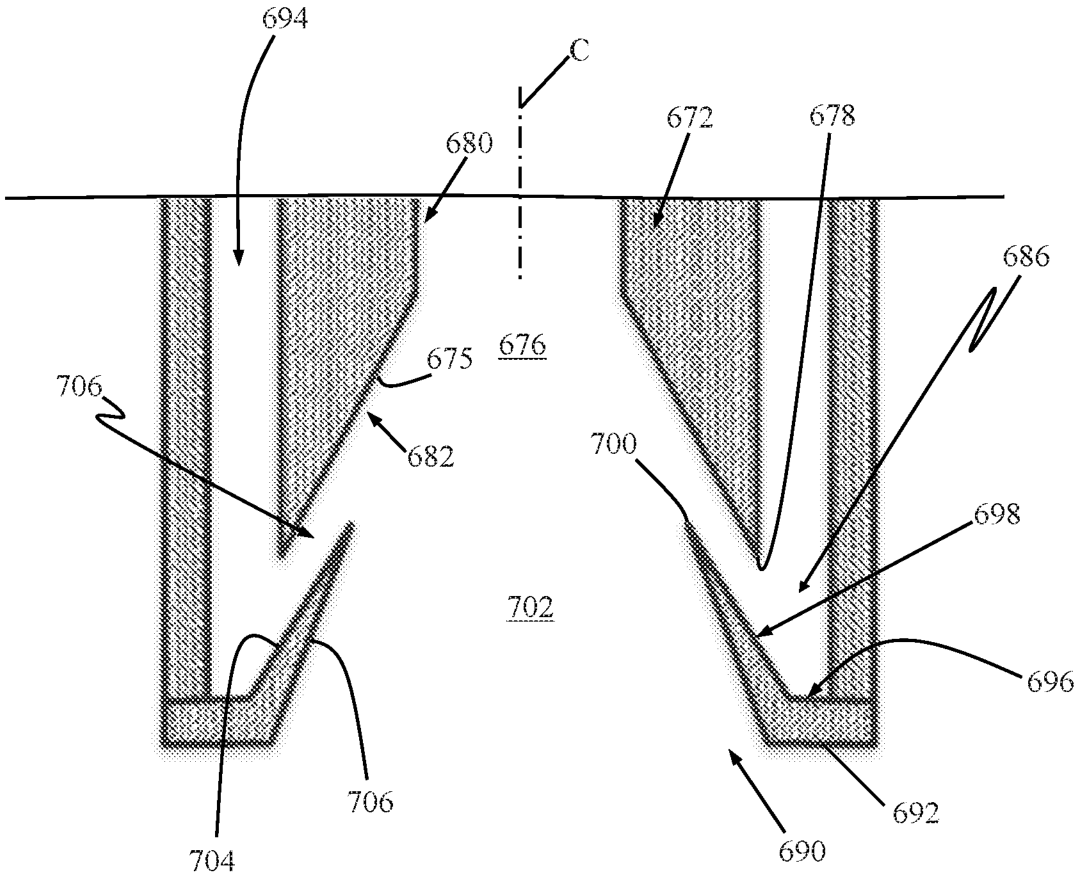
FIG. 15B is an enlarged view of a portion of the nozzle assembly of FIG. 15A.

With reference to FIG. 15B, the interior guide structure 686 includes or defines a guide surface 696 and a guide post 698. The guide surface 696 is formed opposite the exterior face 692, and projects or extends radially outwardly from the guide post 698. In some embodiments, the guide surface 696 can be highly flat or planar (e.g., within 10% of a truly flat surface) and defines a plane substantially perpendicular (e.g., within 10% of a truly perpendicular relationship) to the central axis C. The guide surface 696 can have other constructions that may or may not be highly flat or planar, for example a curved configuration.

The guide post 698 can generally have any of the forms described in the present disclosure and projects from the guide surface 696 in a direction opposite the exterior face 692, terminating at a post end 700. The guide post 698 is axially aligned with the exit orifice 690, and forms a lumen 702 that is open to the exit orifice 690 and the post end 700. A cross-sectional shape or structure of the guide post 698 can generally assume any of the forms described in the present disclosure. In some embodiments, the guide post 698 can be viewed as having or defining an inlet face 704 and an outlet face 706. The inlet face 704 extends from the guide surface 696 to the post end 700, and serves to direct fluid flow from the fluid passageway 694 toward the primary tube 672. The outlet face 704 extends from the post end 700 to the exit orifice 690, and defines the lumen 702. With these definitions in mind, in some embodiments an exterior size or diameter of the guide post 698 (i.e., defined by the inlet face 704) tapers or converges from the guide surface 696 to the post end 700. In some embodiments, a taper angle of the inlet face 704 (e.g., an angle of the inlet face 704 relative to the central axis C) can correspond with a taper angle of the flow passage 676 (as defined by the interior face 675 of the primary tube 672) along the outlet region 682. Conversely, a size or diameter of the lumen 702 (i.e., defined by the outlet face 704) expands or diverges from the post end 700 to the exit orifice 690. In some embodiments, a size or diameter of the lumen 702 at the post end 700 is greater than a size or diameter of the flow passage 676 along the intermediate region 680.

In some embodiments, the post end 700 is located upstream of the outlet end 678 as illustrated. Geometries of the primary tube 672 and the guide post 698 are such that a radial gap 706 is defined between the interior face 675 of the primary tube 672 and the outlet face 704 of the guide post 698.

Figure 15C:
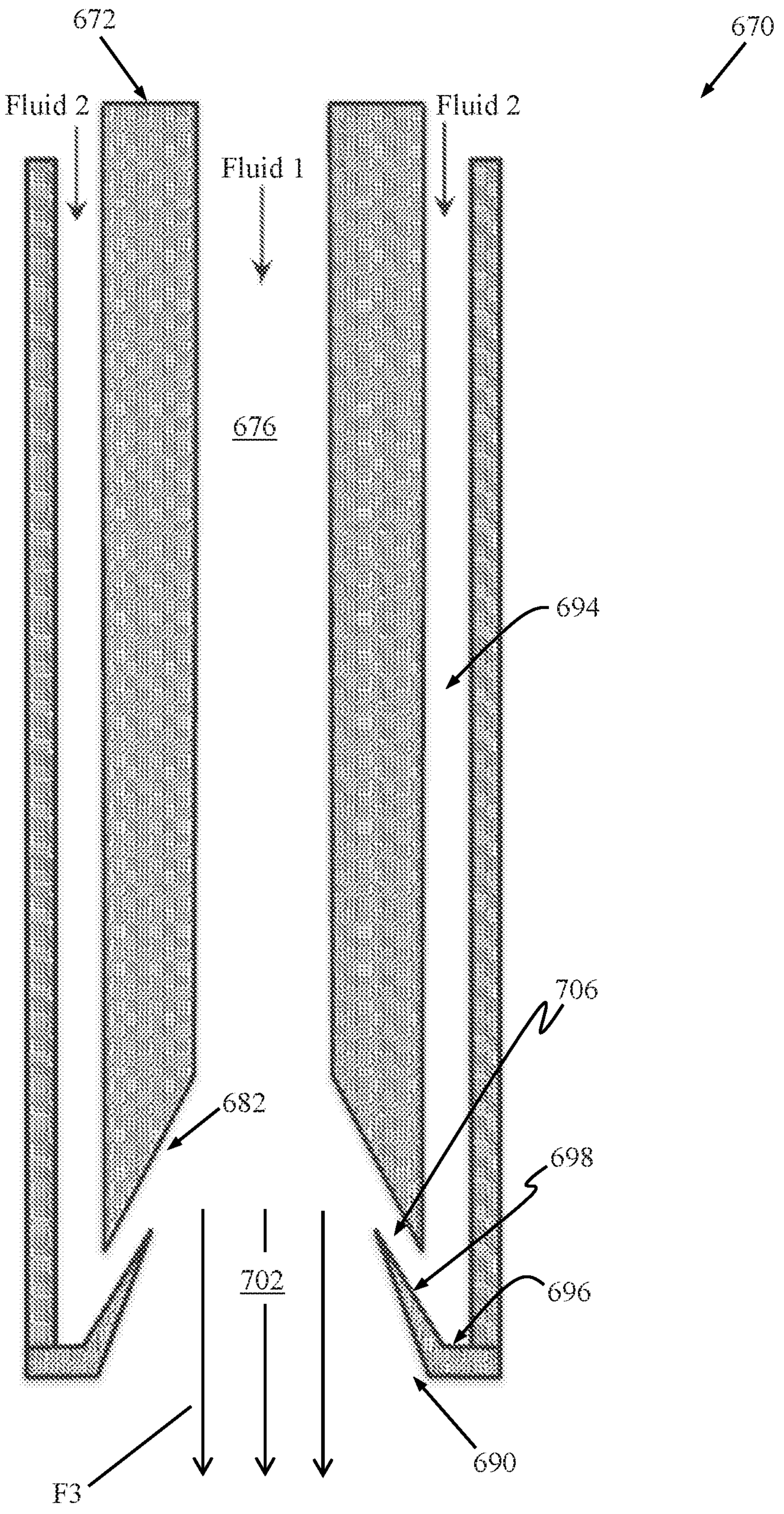
FIG. 15C illustrates use of the nozzle assembly of FIG. 15A in generating a mixed fluid flow.

During use, and as generally reflected by FIG. 15C, a first fluid flow "Fluid 1" (liquid or gas) is conveyed through the flow passage 676 of the primary tube 672 in a direction of the outlet end 678 (labeled in FIG. 15B). A shape of the first fluid flow Fluid 1 expands at the outlet region 682 and decreases in velocity. A second fluid flow "Fluid 2" is conveyed through the fluid passageway 694, and experiences a change in flow direction along the guide surface 696 and the guide post 698. The second fluid flow Fluid 2 is thus directed to the radial gap 706 and then interfaces with the first fluid flow Fluid 1 (otherwise flowing in a generally opposite direction) within the flow passage 676 at the outlet region 682. The first and second fluid flows Fluid 1, Fluid 2 experience mixing along the expanding space of the flow passage 676 and the expanding space of the lumen 702, generating a mixed fluid flow F3 adjacent, within, or into the primary tube 672. The mixed fluid flow F3 is directed or dispensed through the exit orifice 690.

Figure 16:
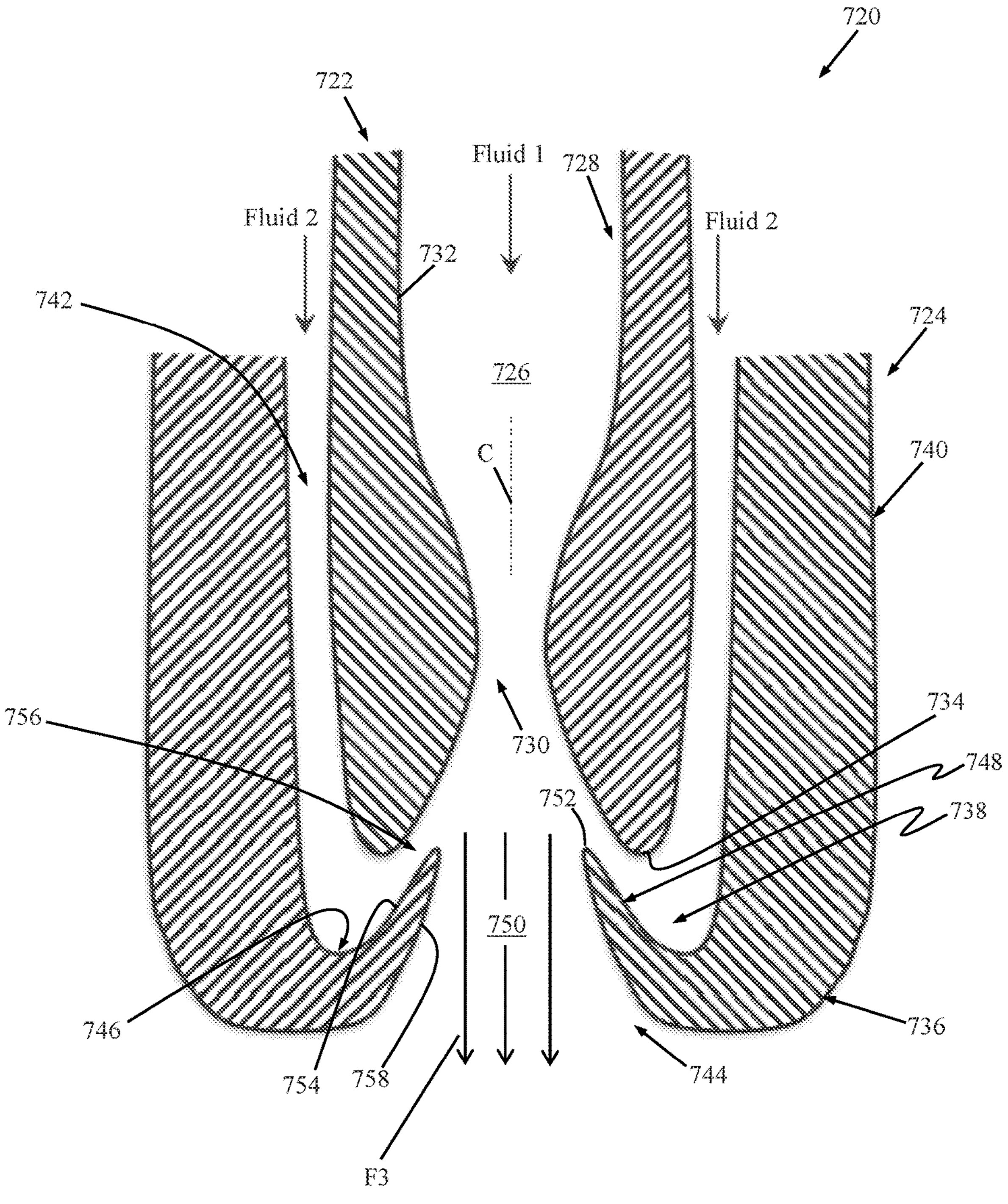
FIG. 16 is a simplified cross-sectional view of portions of another nozzle assembly in accordance with principles of the present disclosure.

Portions of another embodiment of a nozzle assembly 720 in accordance with principles of the present disclosure are shown in FIG. 16. The nozzle assembly 720 can be highly akin to the nozzle assembly 670 (FIG. 15A) described above, and includes an inner or primary tube 722 and an outer housing or outer tube 724. The primary tube 722 defines a flow passage 726 having a relatively uniform size or diameter along an intermediate region 728, and a varying size or diameter along an outlet region 730. For example, an interior face 732 of the primary tube 722 along the outlet region 730 can have a smooth profile, airfoil or teardrop shape, reducing or converging in diameter from the intermediate region 728, and then expanding or diverging in diameter to an outlet end 734.

The outer housing 724 includes an end wall 736, an interior guide structure 738, and an optional side wall 740. A fluid passageway 742 is defined between the side wall 740 and the primary tube 722. The end wall 736 defines an exit orifice 744 that is axially aligned with a central axis C of the primary tube 722. The interior guide structure 738 includes a guide surface 746 and a guide post 748. The guide post 748 defines a lumen 750, and terminates at a post end 752 located upstream of the outlet end 734 of the primary tube 732. An inlet face 754 of the guide post 748 is sized and shaped to generally correspond with a shape of the interior face 732 of the primary tube at the outlet region 730, establishing a radial gap 756. An outlet face 758 of the guide post 748 defines the lumen 750 to have an increasing size or diameter in the downstream direction to the exit orifice 744. The inlet and outlet faces 754, 758 of the guide post 748 can have the smooth profiles illustrated.

During use, the nozzle assembly 720 can serve as a more efficient version of the nozzle assembly 670 (FIG. 15A). A first fluid flow "Fluid 1" (liquid or gas) is conveyed through the flow passage 726 of the primary tube 722 in a direction of the outlet end 734. A shape of the first fluid flow Fluid 1 contracts and then expands at the outlet region 730 and decreases in velocity. A second fluid flow "Fluid 2" is conveyed through the fluid passageway 742, and experiences a change in flow direction along the guide surface 746 and the guide post 748. The second fluid flow Fluid 2 is thus directed to the radial gap 756 and then interfaces with the first fluid flow Fluid 1 (otherwise flowing in a generally opposite direction) within the flow passage 726 at the outlet region 730. The first and second fluid flows Fluid 1, Fluid 2 experience mixing along the expanding space of the flow passage 726 and the expanding space of the lumen 750, generating a mixed fluid flow F3 adjacent, within, or into the primary tube 722. The mixed fluid flow F3 is directed or dispensed through the exit orifice 744.

Figure 17A:
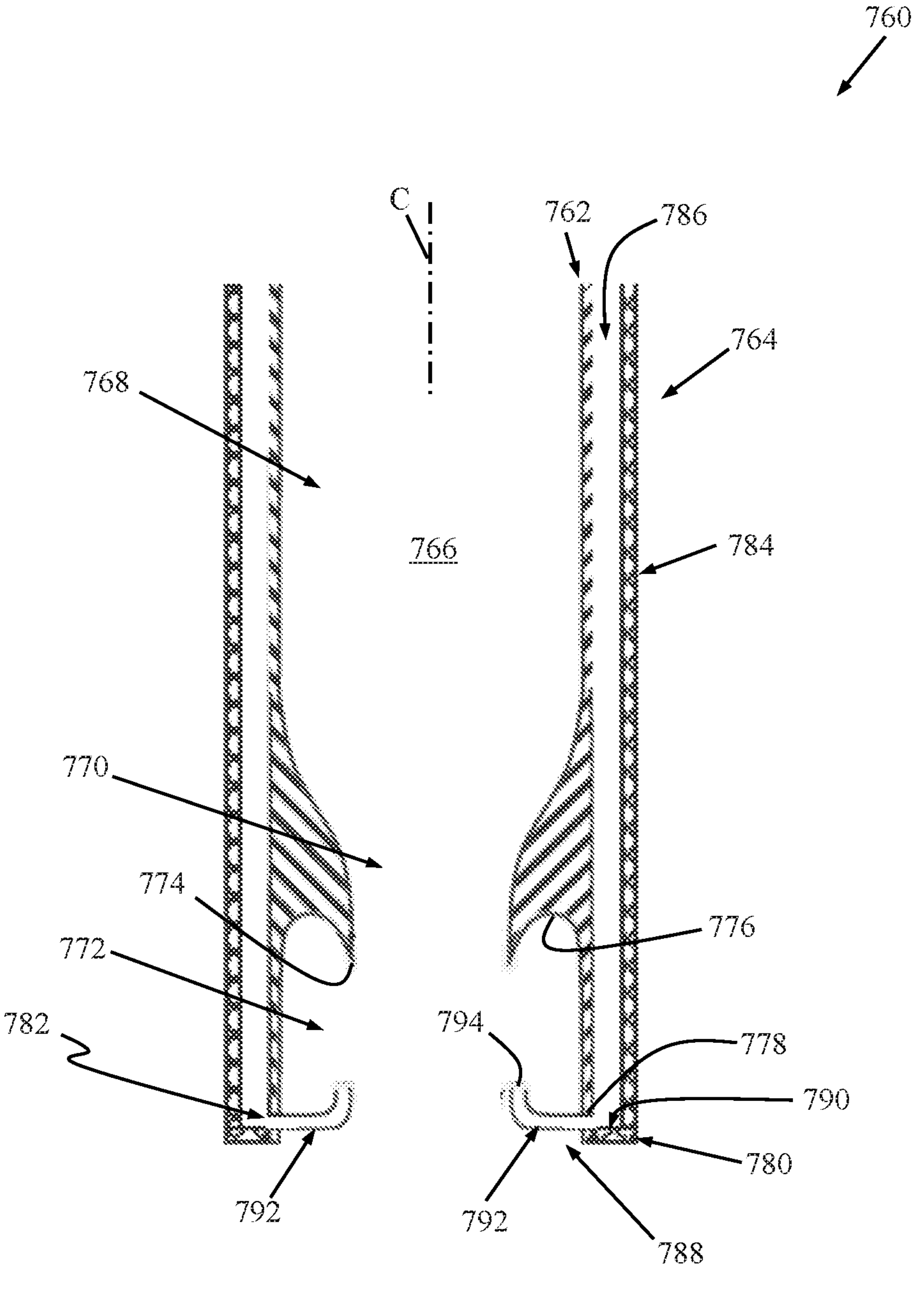
FIG. 17A is a simplified cross-sectional view of portions of another nozzle assembly in accordance with principles of the present disclosure.

Portions of another embodiment of a nozzle assembly 760 in accordance with principles of the present disclosure are shown in FIG. 17A. The nozzle assembly 760 includes an inner or primary tube 762 and an outer housing or outer tube 764. In general terms, the nozzle assembly 760 is configured to facilitate mixing between two fluids at a location external a nozzle region of the primary tube 762.

The primary tube 762 defines a flow passage 766 along an intermediate region 768, a nozzle region 770 and a mixing region 772. A size or diameter of the flow passage 766 can be substantially uniform along the intermediate region 768. A size or diameter of the flow passage 766 decreases or converges along the nozzle region 770 in the downstream direction from the intermediate region 768, with the nozzle region 770 terminating at a nozzle end 774. A size or diameter of the flow passage 766 expands (relative to the size or diameter at the nozzle end 774) at the mixing region 772. In some embodiments, a curved counterflow surface 776 can be formed along the mixing region 772 immediately adjacent the nozzle end 774 (i.e., where the size or diameter of the flow passage 766 expands) for encouraging desired fluid flow with minimal stagnation as described below. Regardless, the mixing region 772 extends to an outlet end 778. While the mixing region 772 has been described as being a component of the primary tube 762, in other embodiments, the primary tube 762 can be considered as terminating at the nozzle end 774, with the mixing region 772 being formed or provided by a component apart from the primary tube 762.

The outer housing 764 includes an end wall 780, an interior guide structure 782 (referenced generally) and an optional side wall 784. A fluid passageway 786 is defined between the side wall 784 and the primary tube 762. The end wall 780 defines an exit orifice 788 that is axially aligned with a central axis C of the primary tube 762. In some embodiments, the exit orifice 788 can be or include the outlet end 778 of the mixing region 772. The interior guide structure 782 includes a guide surface 790 and a plurality of injection tubes 792 that are each fluidly open to the fluid passageway 786. Each of the injection tubes 790 form a bend in extension from the fluid passageway 786 to a dispensing end 794 (e.g., a ninety degree bend) such that in combination with the guide surface 790, fluid flow along the fluid passageway 786 experiences a change in direction (e.g., reverse direction) to the dispensing end 794. The dispensing end 794 of each of the injection tubes 792 is located downstream of (i.e., longitudinally spaced away from relative to the central axis C) the nozzle end 774. Further, in some embodiments, a radial position of the dispensing end 794 of each of the injection tubes 792 relative to the central axis C approximates or is slightly greater than a radial position of the nozzle end 774 relative to the central axis C.

Figure 17B:
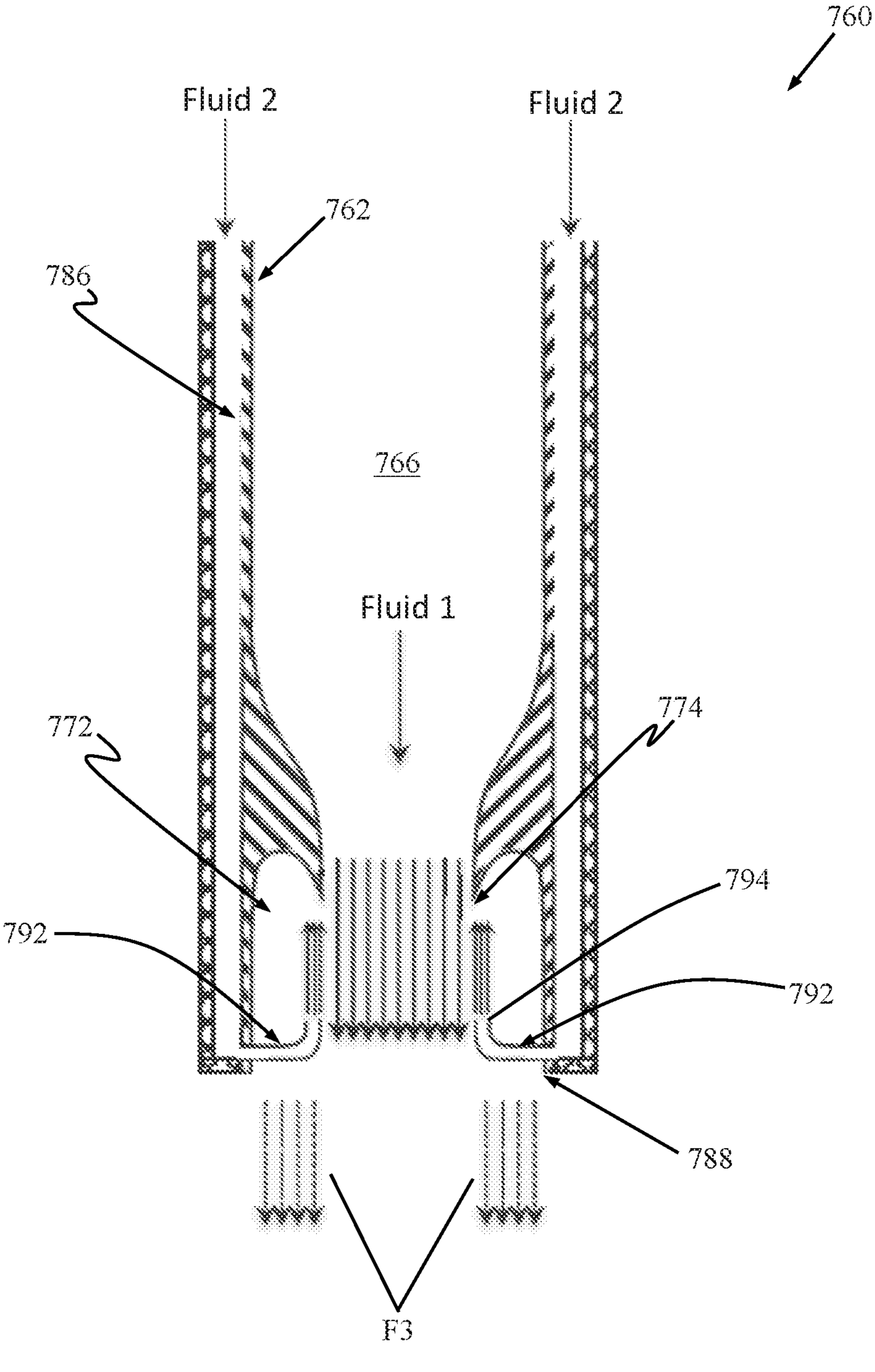
FIG. 17B illustrates use of the nozzle assembly of FIG. 17A in generating a mixed fluid flow.

During use, and as generally reflected by FIG. 17B, a first fluid flow "Fluid 1" (liquid or gas) is conveyed through the flow passage 766 of the primary tube 762 in a direction of the nozzle end 774. The first fluid flow Fluid 1 experiences an increase in velocity through the nozzle region 770, and is dispensed into the expanded area of the mixing region 772 via the nozzle end 774. A second fluid flow "Fluid 2" is conveyed through the fluid passageway 786, into each of the injection tubes 792, and then into the mixing region 772 via the corresponding dispensing end 794. A direction of the second fluid flow Fluid 2 as distributed from the corresponding dispensing end 794 is primarily opposite a direction of the first fluid flow Fluid 1. Turbulence can be generated between the opposing flow directions of the first and second fluid flows Fluid 1, Fluid 2 that can enhance mixing. A mixed fluid flow F3 is generated and is directed or dispensed or exhausted through the exit orifice 788 (or the outlet end 778 (FIG. 17A)). The optional curved surface 776 (FIG. 17A) can enhance counterflow in a direction of the exit orifice 788. In some embodiments, the first fluid flow Fluid 1 is a liquid, and the second fluid flow Fluid 2 is a gas.

Figure 18A:
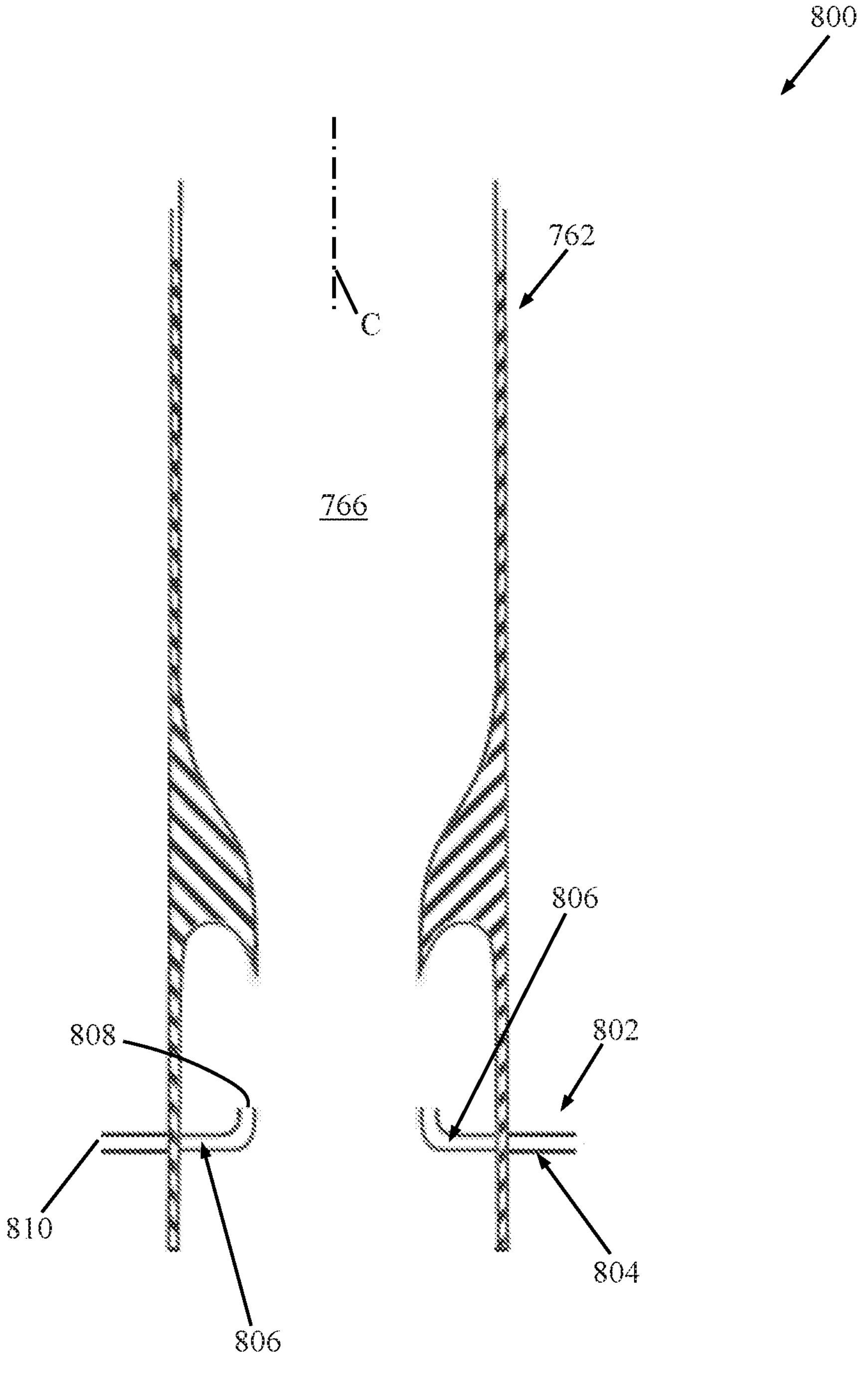
FIG. 18A is a simplified cross-sectional view of portions of another nozzle assembly in accordance with principles of the present disclosure.

Portions of another embodiment of a nozzle assembly 800 in accordance with principles of the present disclosure are shown in FIG. 18A. The nozzle assembly 800 is akin to the nozzle assembly 760 (FIG. 17A) and includes the inner or primary tube 762 as described above, along with an outer housing 802 (referenced generally). The outer housing 802 includes a manifold plate 804 forming or carrying a plurality of fluid passageways 806. The fluid passageways 806 as formed or carried by the manifold plate 804 are akin to the injection tubes 792 (FIG. 17A) described above. In particular, each of the fluid passageways 806 terminates in dispensing end 808, and are configured and arranged such that fluid from an inlet end 810 exits the corresponding dispensing end 808 in a direction generally opposite a flow direction of fluid flow in the flow passage 766.

Figure 18B:
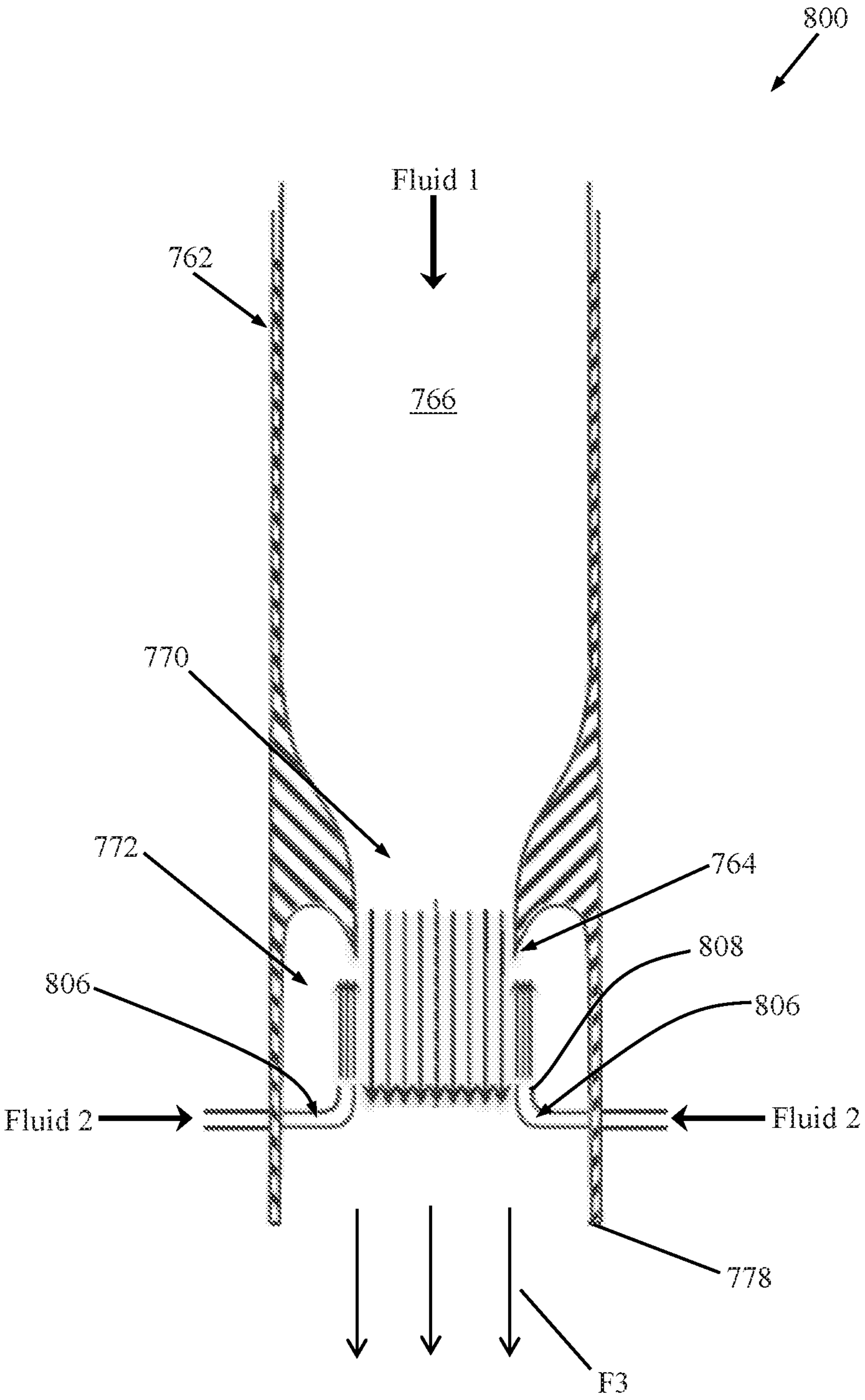
FIG. 18B illustrates use of the nozzle assembly of FIG. 18A in generating a mixed fluid flow.

During use, and as generally reflected by FIG. 18B, a first fluid flow "Fluid 1" (liquid or gas) is conveyed through the flow passage 766 of the primary tube 762 in a direction of the nozzle end 774. The first fluid flow Fluid 1 experiences an increase in velocity through the nozzle region 770, and is dispensed into the expanded area of the mixing region 772 via the nozzle end 774. A second fluid flow "Fluid 2" is conveyed through the fluid passageways 806 and into the mixing region 772 via the corresponding dispensing end 808. A direction of the second fluid flow Fluid 2 as distributed from the corresponding dispensing end 808 is primarily opposite a direction of the first fluid flow Fluid 1. Turbulence can be generated between the opposing flow directions of the first and second fluid flows Fluid 1, Fluid 2 that can enhance mixing. A mixed fluid flow F3 is generated and is directed or dispensed or exhausted through the outlet end 778. In some embodiments, the first fluid flow Fluid 1 is a liquid, and the second fluid flow Fluid 2 is a gas.

Figure 19A:
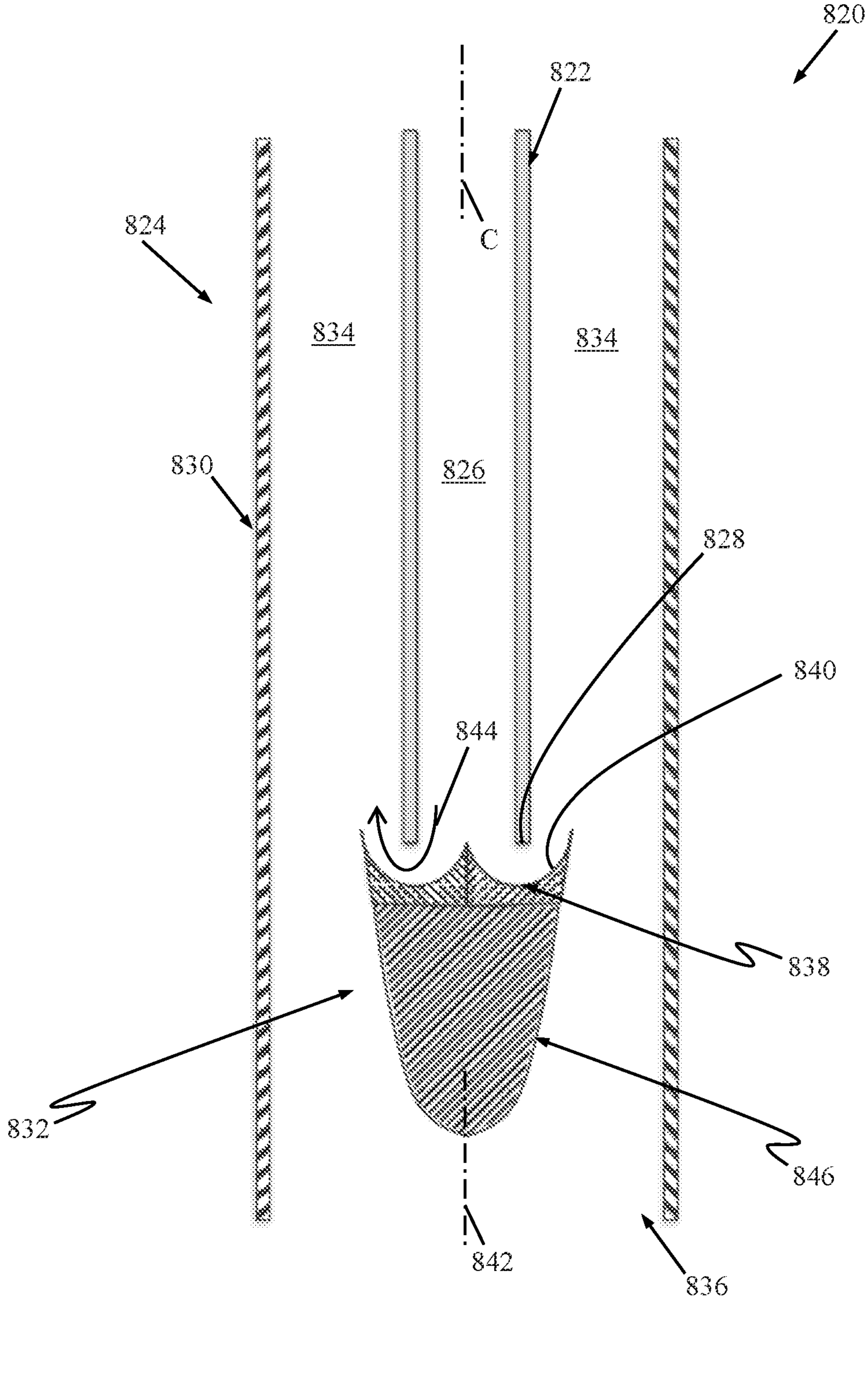
FIG. 19A is a simplified cross-sectional view of portions of another nozzle assembly in accordance with principles of the present disclosure.

Portions of another embodiment of a nozzle assembly 820 in accordance with principles of the present disclosure are shown in FIG. 19A. The nozzle assembly 820 includes an inner or primary tube 822 and an outer housing or outer tube 824. The primary tube 822 can have any of the forms described above, and in some embodiments has a circular shape in transverse cross-section. The primary tube 822 defines a flow passage 826 extending to, and open at, an outlet end 828.

The outer housing 824 includes a side wall 830 and an interior guide structure 832. A fluid passageway 834 is defined between the side wall 830 and the primary tube 822. The outer housing 824 defines an exit orifice 836 that is axially aligned with a central axis C of the primary tube 822. For example, the side wall 830 can be a tubular body that terminates at the exit orifice 836. Alternatively, the outer housing 824 can include an end wall in which the exit orifice 836 is formed. Regardless, the interior guide structure 832 is maintained upstream of the exit orifice 836, and includes or forms an upstream guide surface 838. The upstream guide surface 838 can assume various forms, and is generally configured to change a direction of fluid flow distributed from the outlet end 828 of the primary tube 822. For example, the upstream guide surface 838 can include a concave face 840 that revolves around a centerline 842. The interior guide structure 832 can be arranged relative to the primary tube 822 such that the centerline 842 is co-axial with the central axis C of the primary tube 822, and the upstream guide surface 838 is slightly spaced from the outlet end 828 in the downstream direction. With this construction, fluid flow exiting the outlet end 828 encounters the upstream guide surface 838 and is caused to experience a change in flow direction (e.g., approximately a 180 degree turn), including toward the fluid passageway 834 as represented by arrow 844. A downstream surface 846 of the interior guide structure 832 can have a tapering shape (in the downstream direction) as shown.

Figure 19B:
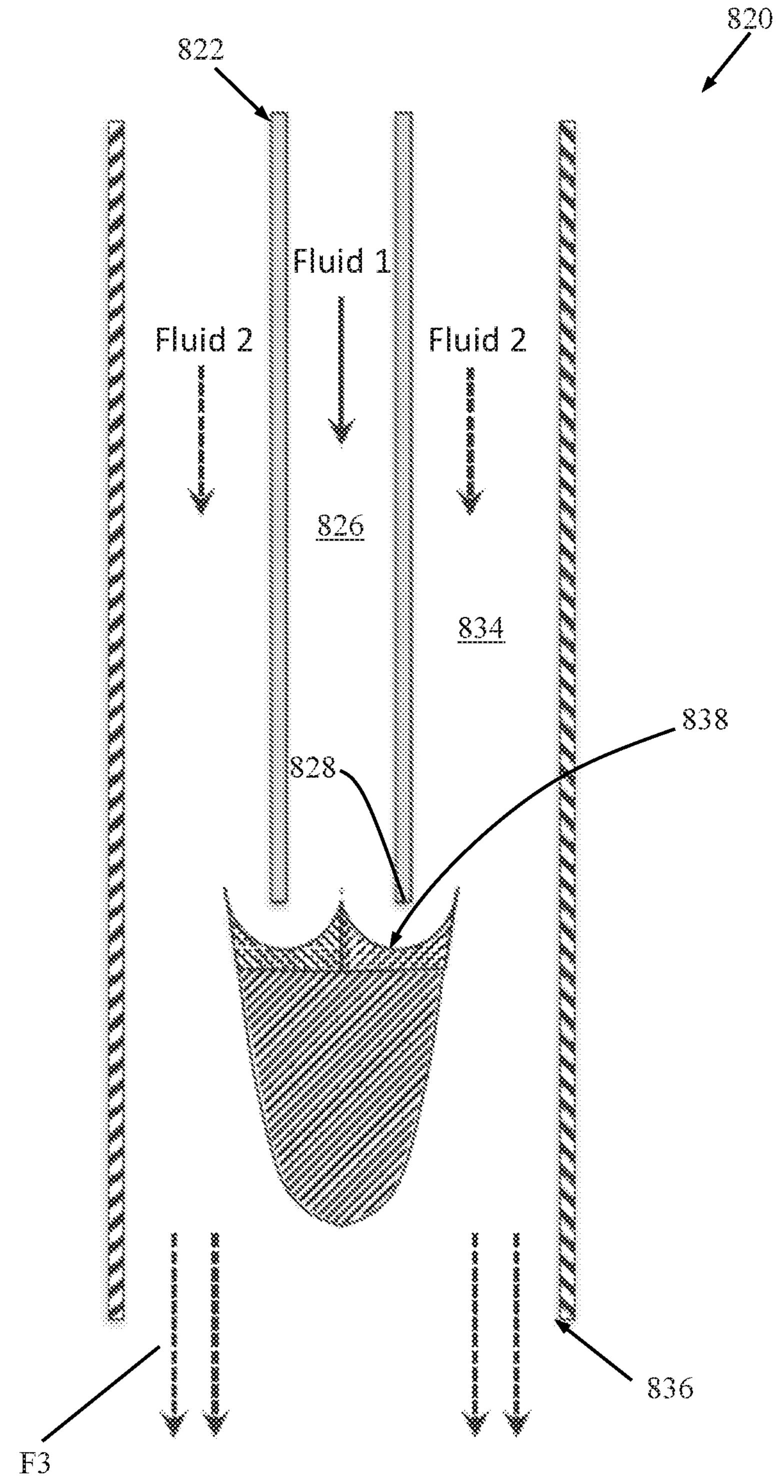
FIG. 19B illustrates use of the nozzle assembly of FIG. 19A in generating a mixed fluid flow.

During use, and as generally reflected by FIG. 19B, a first fluid flow "Fluid 1" (liquid or gas) is conveyed through the flow passage 826 of the primary tube 822 in a direction of the outlet end 828. A second fluid flow "Fluid 2" is conveyed through the fluid passageway 834 in a direction of the exit orifice 836. The first fluid flow Fluid 1 exits the outlet end 828 and is then directed by the upstream guide surface 838 toward the fluid passageway 834 at which the first and second fluid flows Fluid 1, Fluid 2 mix. A direction of the first fluid flow Fluid 1 at the region of interface with the second fluid flow Fluid 2 is primarily opposite a direction of the second fluid flow Fluid 2. Turbulence can be generated between the opposing flow directions of the first and second fluid flows Fluid 1, Fluid 2 that can enhance mixing. A mixed fluid flow F3 is generated and is directed or dispensed or exhausted through the exit orifice 836. In some embodiments, the first fluid flow Fluid 1 is a gas, and the second fluid flow Fluid 2 is a liquid, with the nozzle assembly 820 facilitating a two phase flow.

Figure 20A:
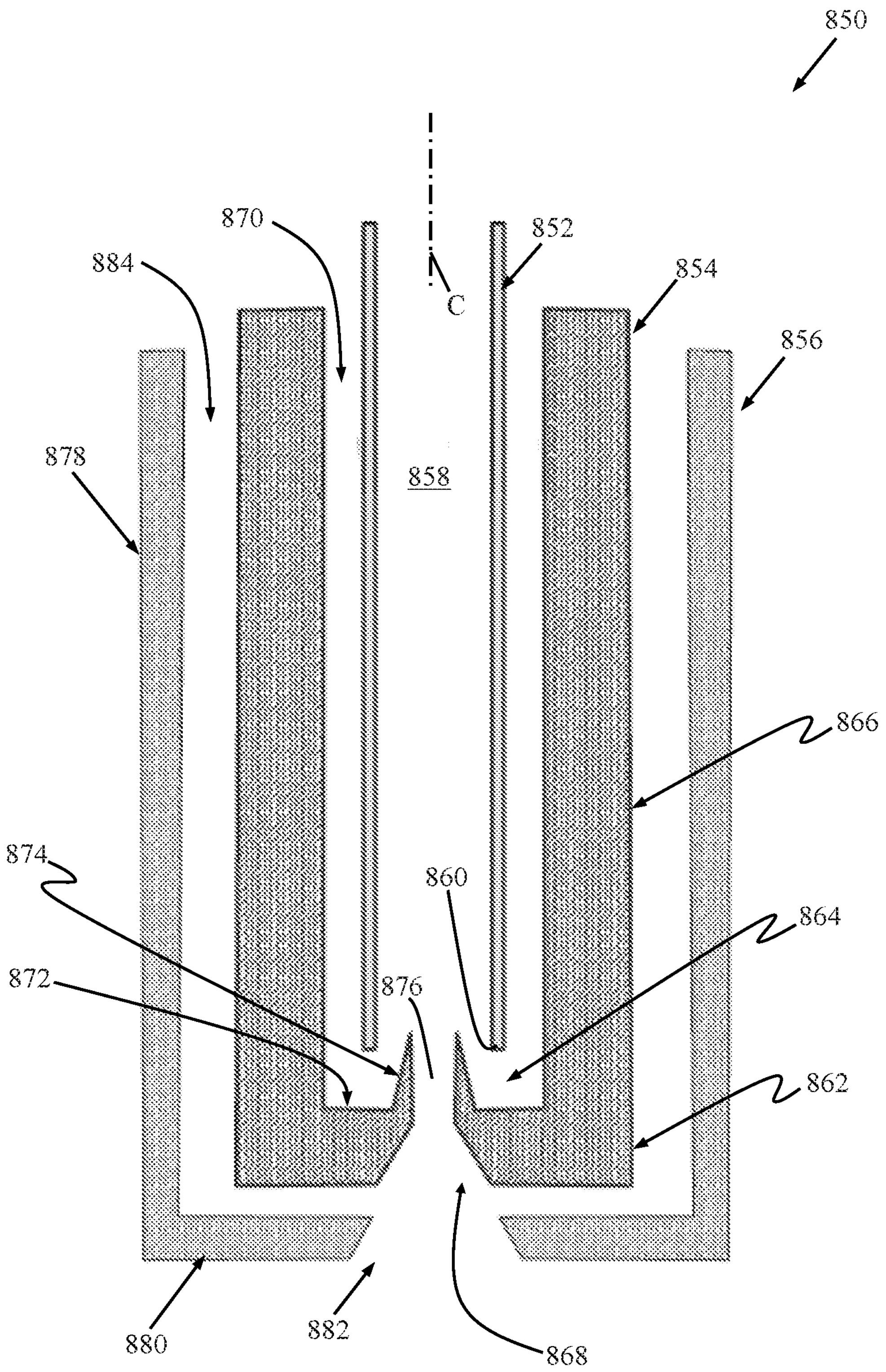
FIG. 20A is a simplified cross-sectional view of portions of another nozzle assembly in accordance with principles of the present disclosure.

Portions of another embodiment of a nozzle assembly 850 in accordance with principles of the present disclosure are shown in FIG. 20A. The nozzle assembly 850 includes an inner or primary tube 852, an intermediate housing or intermediate tube 854, and an exterior frame 856. In general terms, the primary tube 852 can have any of the forms described in the present disclosure, and in some embodiments has a circular shape in transverse cross-section. The primary tube 852 defines a flow passage 858 extending to, and open at, an outlet end 860.

The intermediate housing 854 can be akin to the outer housing associated with other embodiments of the present disclosure, and can assume any of the outer housing formats described above. In general terms, the intermediate housing 854 includes an end wall 862, an interior guide structure 864 (referenced generally), and an optional tubular side wall 866. The end wall 862 defines an exit orifice 868. The primary tube 852 is mounted relative to the intermediate housing 854 such that a central axis C of the primary tube 852 is axially aligned with the exit orifice 868. Further, a fluid passageway 870 is defined between the side wall 866 and the primary tube 852.

The interior guide structure 864 includes or defines a guide surface 872 and a guide post 874. The guide surface 872 projects or extends radially outwardly from the guide post 874. In some embodiments, the guide surface 872 can be highly flat or planar (e.g., within 10% of a truly flat surface) and defines a plane substantially perpendicular (e.g., within 10% of a truly perpendicular relationship) to the central axis C. The guide surface 872 can have other constructions that may or may not be highly flat or planar, for example a curved configuration. The guide post 874 can have any of the forms described in the present disclosure and projects from the guide surface 872 optionally upstream of the outlet end 860 of the primary tube 852. The guide post 874 forms a lumen 876 that is axially aligned with the exit orifice 868. A cross-sectional shape or structure of the guide post 874 can assume any of the forms described in the present disclosure.

The exterior frame 856 includes a hub portion 878 and an end panel 880. The hub portion 878 is sized and shaped to receive the intermediate housing 854 (e.g., an inner diameter of the hub portion 878 is greater than an outer diameter of the side wall 866). The end panel 880 extends radially from the hub portion 878 and defines a dispensing aperture 882. Upon final assembly, a flow channel 884 is defined between the hub 878 and the side wall 866 of the intermediate housing 854, and between the end panel 880 and the end wall 862. As shown, the flow channel 884 is fluidly open to the exit orifice 868 and the dispensing aperture 882.

Figure 20B:
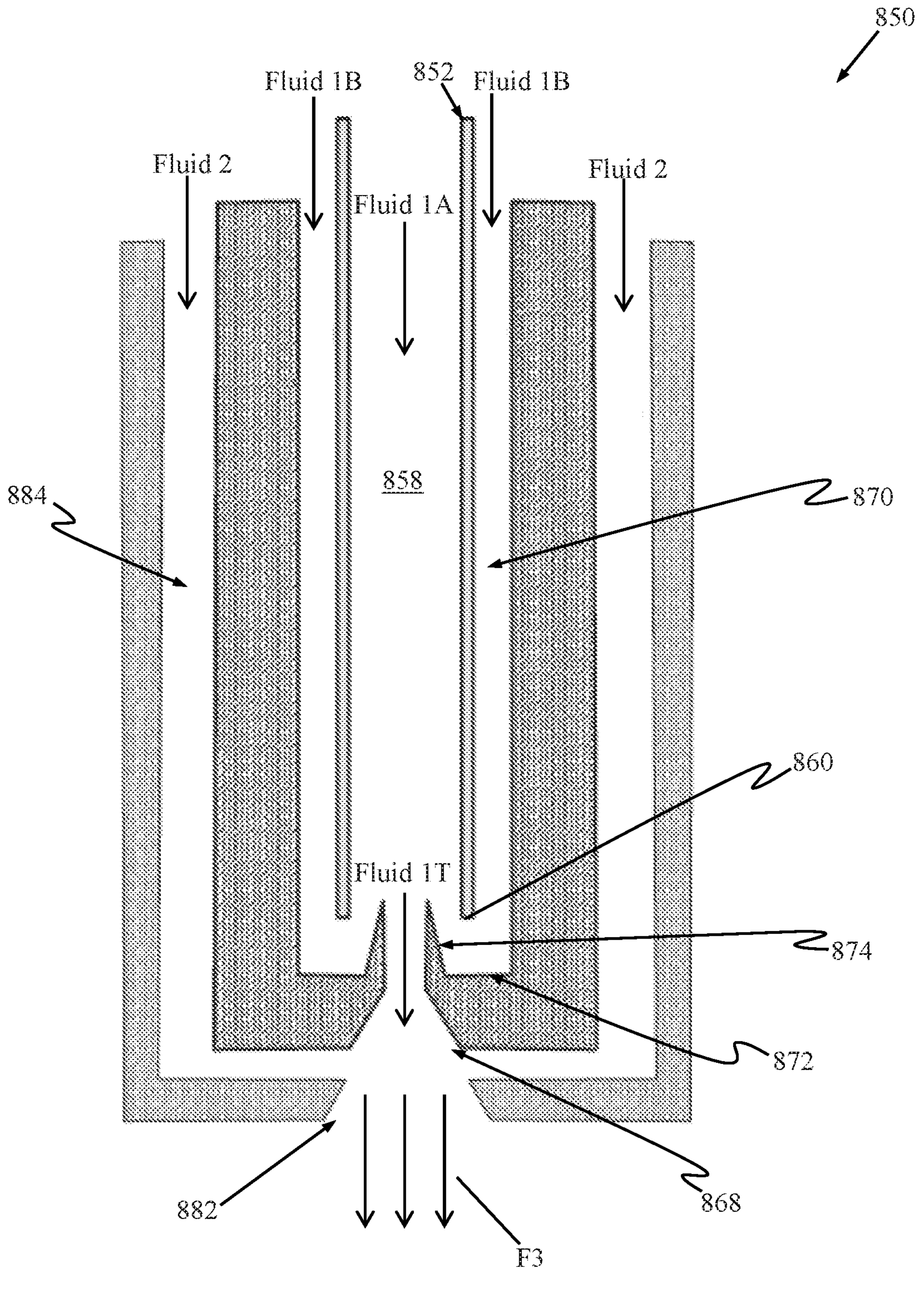
FIG. 20B illustrates use of the nozzle assembly of FIG. 20A in generating a mixed fluid flow.

During use, and as generally reflected by FIG. 20B, a first flow of a first fluid "Fluid 1A" (liquid or gas) is conveyed through the flow passage 858 of the primary tube 852 in a direction of the outlet end 860. A second fluid flow of the first fluid "Fluid 1B" is conveyed through the fluid passageway 870 in a direction of the guide surface 872. Commensurate with the descriptions above, the second flow of the first fluid Fluid 1B is then directed by the guide post 874 toward the flow passage 858 at which the first and second flows Fluid 1A, Fluid 1B mix and generate a turbulent flow of the first fluid "Fluid 1T" that is directed through the exit orifice 868. A flow of second fluid "Fluid 2" is conveyed through the flow channel 884 and interacts with the turbulent flow of the first fluid Fluid 1T resulting in a mixed fluid flow F3. The mixed fluid flow F3 is directed or dispensed through the dispensing aperture 882. In some embodiments, the first fluid Fluid 1A, Fluid 1B is a liquid, and the second fluid Fluid 2 is a gas.

The nozzle assemblies and corresponding methods of mixing fluid flows (e.g., atomizing liquid flow) of the present disclosure provide a marked improvement over previous designs. By counterflowing two fluid flows, a highly unstable velocity profile within the flow column of the nozzle is generated, resulting in rapid mixing. Pulsed mixed fluid flow is also optionally available, and can, in some embodiments, be selected or fine-tuned by a user. The nozzle assemblies and methods of the present disclosure are useful in multiple different mixing scenarios (e.g., gas-gas systems, liquid-liquid systems, and liquid-gas systems), including, but not limited to, atomizing a plethora of different liquids for virtually any spraying application, and are well-suited, for example, for atomizing higher viscosity liquids such as bio-oils. By way of further non-limiting example, the nozzle assemblies and methods of the present disclosure can be incorporated into a combustion engine; the nozzle assembly may improve the combustion of bio-oils to the point that the bio-oil could be used as a drop-in fuel for the combustion engine. This optional application could be highly important as it reduces the overall energy and cost in biofuel refining. Also, engine durability and fuel economy could be improved. Other non-limiting examples of liquids useful with the nozzle assemblies and methods of the present disclosure include conventional fuels, paints, insecticides, herbicides, etc.

Although the present disclosure has been described with reference to preferred embodiments, workers skilled in the art will recognize that changes can be made in form and detail without departing from the spirit and scope of the present disclosure.

What is claimed is:

1. A method of mixing fluid flows, the method comprising:

conveying a first fluid flow along a first flow passage of a primary tube from an inlet end of the tube toward an outlet end of the primary tube, the outlet end of the primary tube being open to an end wall defining an exit orifice, the exit orifice defining a central axis and a primary flow direction of the first fluid flow along the first flow passage being substantially parallel with the central axis;

while conveying the first fluid flow along the first flow passage, conveying a second fluid flow along a second flow passage;

altering a flow direction of the second fluid flow from the second flow passage to a plurality of nozzle openings in an injection cap mounted to the outlet end of the primary tube such that the second fluid flow mixes with the first fluid flow within the first flow passage to generate a mixed fluid flow; and dispensing the mixed fluid flow through the exit orifice.

2. The method of claim 1, wherein the step of altering includes directing the second fluid flow toward a post of an interior guide structure.

3. The method of claim 2, wherein the post defines a lumen fluidly open to the exit orifice, and further wherein the step of dispensing the mixed fluid flow includes the mixed fluid flow progressing through the lumen to the exit orifice.

4. The method of claim 2, wherein the injection cap is disposed between the post and the primary tube.

5. The method of claim 4, wherein the injection cap is sealed between the post and the primary tube.

6. The method of claim 1, wherein the mixed fluid flow is an atomized liquid flow.

7. The method of claim 1, wherein a velocity of the second fluid flow exiting the plurality of nozzles is greater than a velocity of the second fluid flow along the second flow passage.

8. The method of claim 1, wherein at a region of interface within the primary tube, a flow direction of the second fluid flow is primarily opposite a flow direction of the first fluid flow.

9. A nozzle assembly comprising:

an end wall defining an exit orifice, the exit orifice defining a central axis;

a first flow passage for a first fluid flow, the first flow passage defined by a primary tube having an outlet end, wherein the first flow passage is fluidly open to the exit orifice and defines a primary flow direction that is substantially parallel with the central axis;

a second flow passage for a second fluid;

an injection cap mounted to the outlet end of the primary tube, the injection cap defining a plurality of nozzle openings;

wherein the nozzle assembly establishes a redirected flow direction for the second fluid flow from the second flow passage to the injection cap and then through the nozzle openings for mixing of the first and second fluid flows within the first flow passage.

10. The nozzle assembly of claim 9, further comprising a post extending from the end wall in a direction of the outlet end of the primary tube, the post defining a lumen that is fluidly open to the exit orifice.

11. The nozzle assembly of claim 10, wherein the injection cap is disposed between the post and the primary tube.

12. The nozzle assembly of claim 11, wherein the injection cap is sealed between the post and the primary tube.

13. The nozzle assembly of claim 9, wherein the plurality of nozzle openings are configured to establish a jet flow in the second fluid flow.

* * * * *